United States Patent [19]

Boone et al.

[11] 4,242,675

[45] Dec. 30, 1980

[54] DISPLAY AND KEYBOARD SCANNING FOR ELECTRONIC CALCULATION OR THE LIKE

[75] Inventors: Gary W. Boone; Michael J. Cochran, both of Houston, Tex.

[73] Assignee: Texas Instruments Incorporated, Dallas, Tex.

[21] Appl. No.: 856,932

[22] Filed: Dec. 2, 1977

Related U.S. Application Data

[63] Continuation of Ser. No. 420,999, Dec. 3, 1973, abandoned, which is a continuation of Ser. No. 163,565, Jul. 19, 1971, abandoned.

[51] Int. Cl.[2] .................... G06F 3/14

[52] U.S. Cl. .................... 340/711; 340/365 R; 340/756; 340/802; 364/700; 364/712; 364/900

[58] Field of Search ... 364/200 MS File, 900 MS File, 364/700, 706, 712, 754; 340/711, 365 R, 365 S

[56] References Cited

U.S. PATENT DOCUMENTS

| | | | |
|---|---|---|---|
| 3,492,656 | 1/1970 | Hildebrandt | 340/711 X |
| 3,715,746 | 2/1973 | Hatano | 340/711 X |
| 4,014,013 | 3/1977 | McElroy | 340/711 X |

OTHER PUBLICATIONS

"MOS/LSI TMS 1802 NC One-Chip Calculator Circuit"; Texas Instruments Bulletin, CB-143; 21pp; (undated).

*Primary Examiner*—David L. Trafton
*Attorney, Agent, or Firm*—John G. Graham

[57] ABSTRACT

A variable function calculator utilizes a fixed program memory array such as a programmed read only memory in which a number of programs are stored depending upon the desired functions of the calculator. The calculator also incudes a program counter, an instruction register, control decoders, jump-condition circuits, a clock generator, a timing generator, digit and FLAG mask decoders, key input logic, a register and FLAG data storage array, a decimal and FLAG arithmetic logic unit, an output decoder, and a digit scanner which scans both the keyboard and display outputs. Aside from providing basic desk top calculator functions, the read only memory may be programmed so that the system provides metering functions, arithmetic teaching functions, control functions, etc. A preferred embodiment of the invention is capable of being fabricated as a monolithic integrated semiconductor system utilizing contemporary metal insulator-semiconductor techniques.

27 Claims, 72 Drawing Figures

Fig. 3
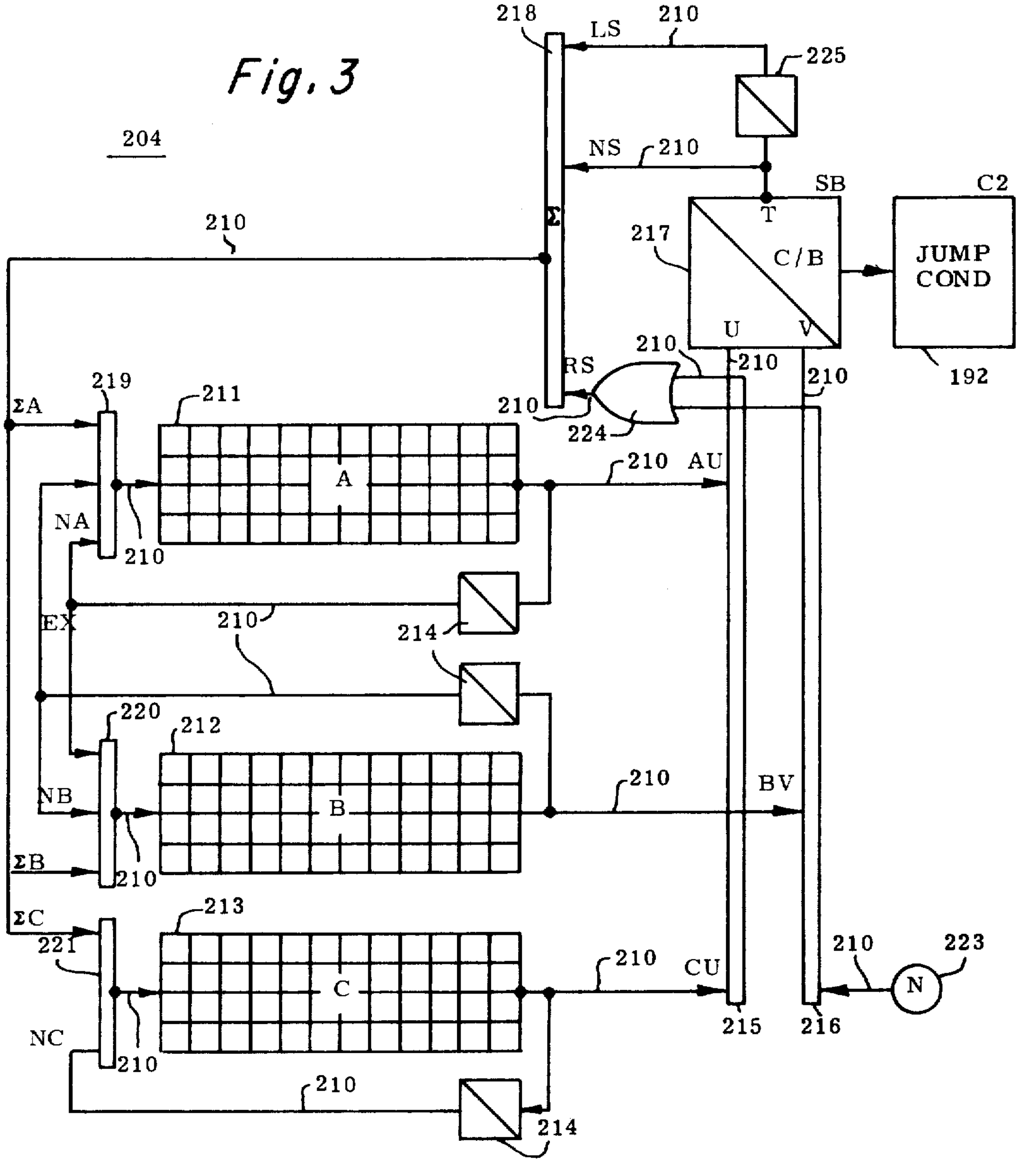
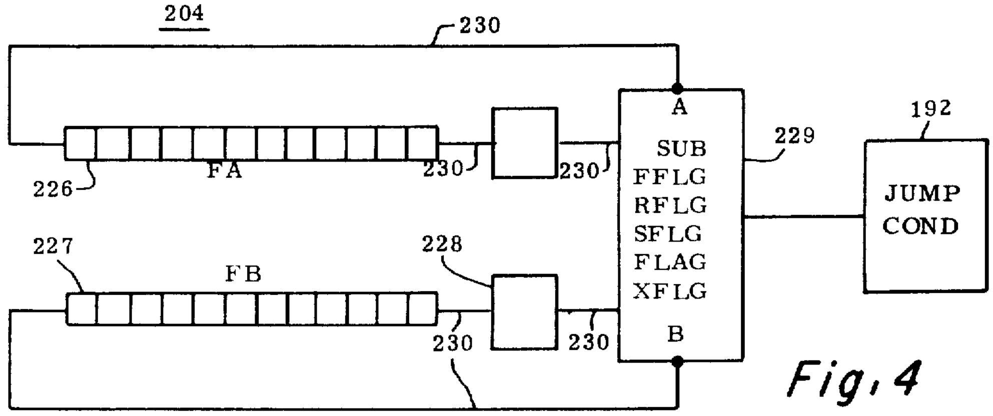
Fig. 4

203

| Fig.17A | Fig.17B | Fig.17C | Fig.17D |
|---------|---------|---------|---------|
| Fig.17E | Fig.17F | Fig.17G | Fig.17H |
| Fig.17I | Fig.17J | Fig.17K | Fig.17L |
| Fig.17M | Fig.17N | Fig.17O | Fig.17P |
| Fig.17Q | Fig.17R | Fig.17S | Fig.17T |
| Fig.17U | Fig.17V | Fig.17W | Fig.17X |
| Fig.17Y | Fig.17Z | | |

207

285
216
218
524
566
RS
NS
LS
Σ
220
221
219
1,2

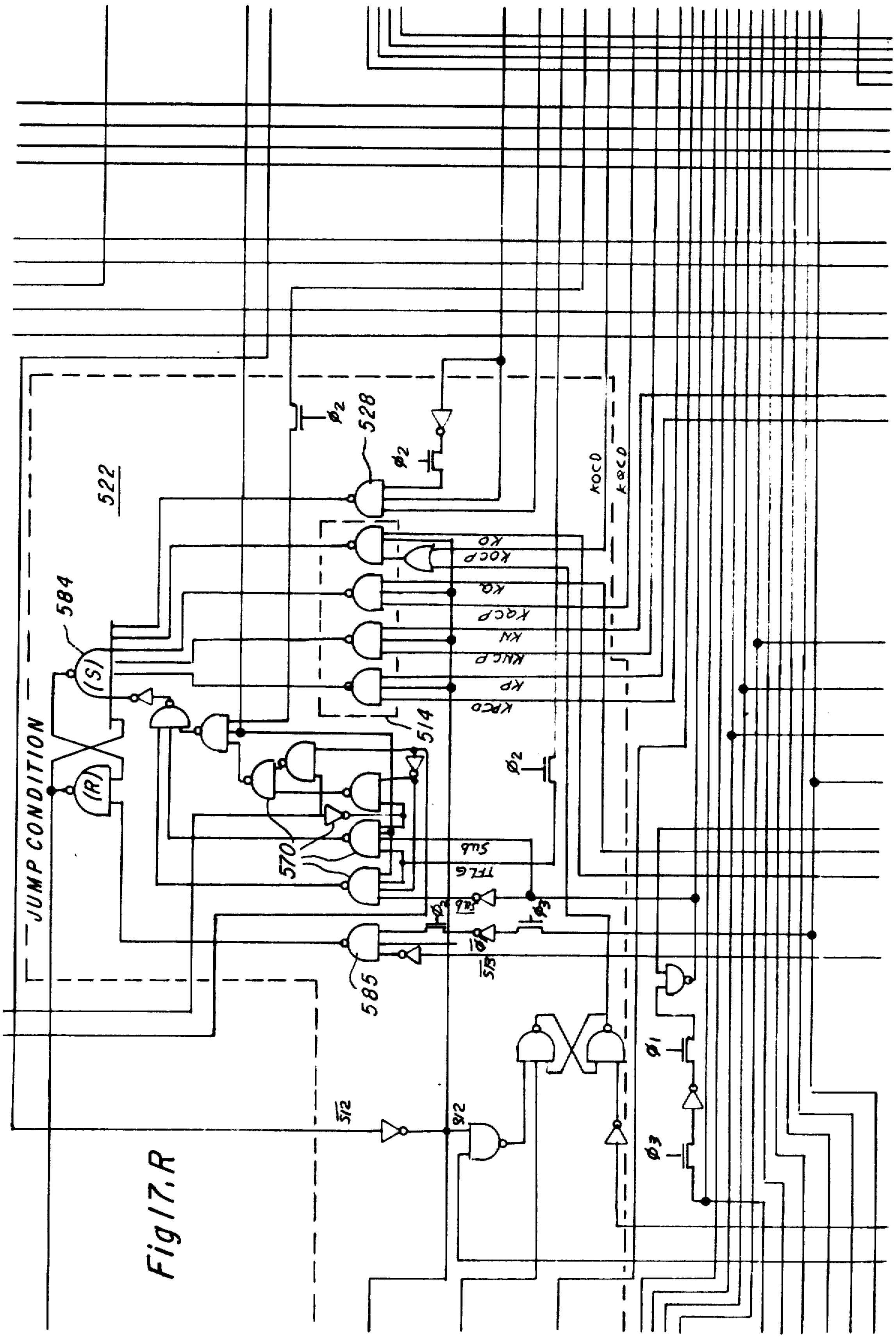
Fig17.R

525
ø3
519
517
513

PLA
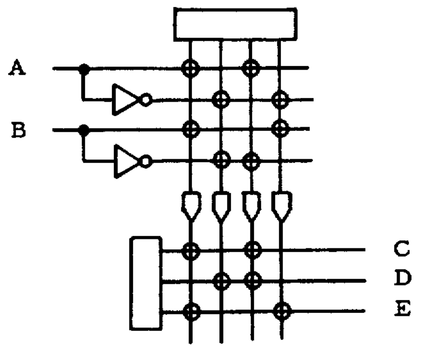
Fig. 21
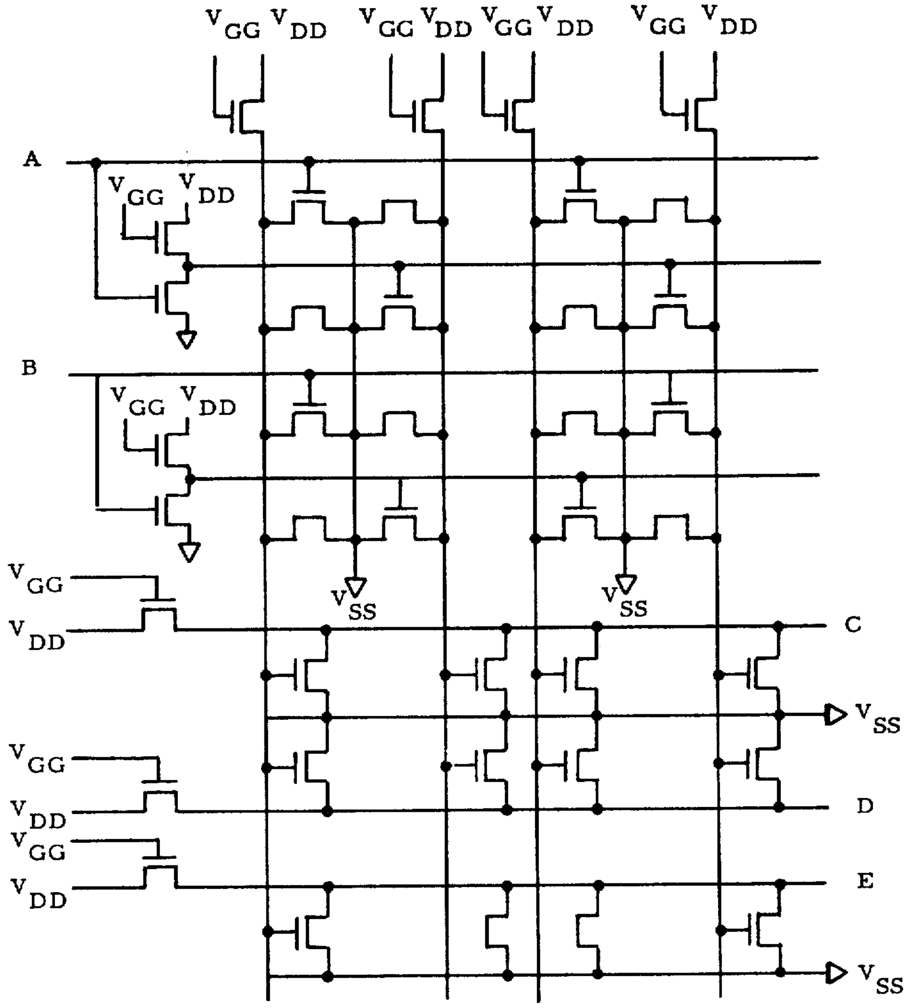

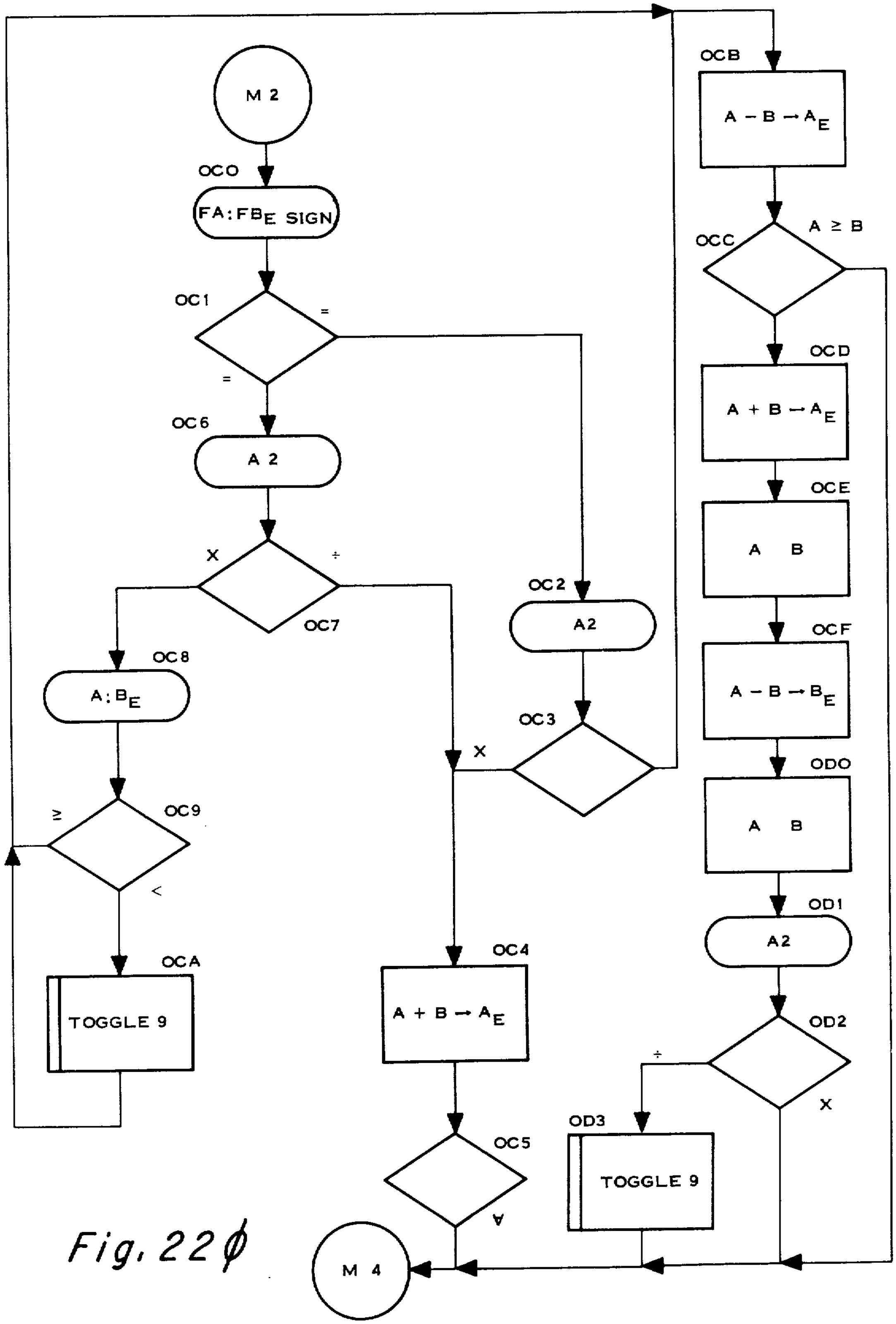
*Fig. 22ϕ*

DISPLAY AND KEYBOARD SCANNING FOR ELECTRONIC CALCULATION OR THE LIKE

This is a continuation of Ser. No. 420,999 filed Dec. 3, 1973, and now abandoned, which was a continuation of Ser. No. 163,565, filed July 19, 1971, and now abandoned.

Related Cases: The subject matter of this application is related to the subject matter disclosed in U.S. Pat. No. 4,074,351, issued Feb. 14, 1978 to Gary W. Boone and Michael J. Cochran, assigned to Texas Instruments.

This invention relates to calculators and, more particularly, to a variable function fixed program calculator capable of being fabricated as a monolithic integrated semiconductor system utilizing contemporary semiconductor technology.

It is an object of the present invention to provide a system which functions as a basic desk top calculator. More particularly, it is an object of the invention to provide such calculator function including primitive decimal operations, such as add, subtract, multiply and divide with floating decimal point entry and either floating or fixed decimal point results on multi-digit operands. This object is accomplished in accordance with the present invention by providing, for example, a dynamic charge storage random access memory shifting array for registration of numeric and control data. The calculator includes a control memory such as a programmable logic array (PLA), a program memory such as a read only memory (ROM) and means for performing arithmetic and logic modification of registered data including binary coded decimal (BCD), bit-parallel digit-serial decimal arithmetic, and set-reset-toggle (SRT) FLAG data modification.

Another object of the invention is to provide a calculator system which is capable of being fabricated as a monolithic integrated semiconductor system. More particularly, it is an object of the invention to provide such calculator system which is capable of being fabricated as a monolithic integrated metal-insulator-semiconductor system utilizing contemporary metal-insulator-semiconductor technology. This object is accomplished in accordance with the present invention by providing a random access memory shift register system which requires approximately one-third the area of conventional shift register systems, providing internal generation of multiphase clocks from a single phase input clock which is included in the calculator but which is external to the monolithic structure and by providing a common programmed scanning system in the monolithic structure to provide both keyboard encoding and display decoding with minimum external connections between the monolithic system and the keyboard and display. The total number of connections from the monolithic structure to other calculator subsystems such as the keyboard, display and power supply are therefore minimized so that the monolithic structure is capable of being packaged in a conventional twenty-eight or forty pin package.

It is a further object of the present invention to provide a versatile calculator system in which the calculator function and input and output interfaces can be varied without changing the basic calculator structure, and particularly without changing the basic calculator structure as an integrated semiconductor system. This object is accomplished with the present invention by providing a programmable read only memory which provides a fixed program for the calculator system in accordance with the desired function of the calculator system and by providing programmable logic arrays for decoding and encoding the input, output and operating data by masking such data to any desired format. The programmable read only memory and the programmable logic arrays are easily modified by changing only the gate-insulator mask for the metal-insulator-semiconductor integrated system embodiment during the fabrication process.

Yet another object of the invention is to provide a calculator with improved means for encoding keyboard commands and status information and which also functions as a direct interface means between a display decoder and a display for segmented and/or individual-decimal-numerical displays. This object is accomplished in accordance with the invention by providing a programmed scanning system to service both the keyboard input and display output, thereby minimizing hardware requirements for the key input system. Four keyboard input pins combine with eleven scanner output pins to allow a total of forty-four distinct keys and/or switches. The programmed routine residing in the read-only memory encodes the input from the keyboard array under program control. The scanning system operates at a slow enough rate to eliminate the need for any external keyboard drive circuitry and allows direct drive of large capacitance loads with response consistent to the scan rate. The scan program includes an encoding routine to effectively defeat transient noise and key bounce types of interference from the keyboard. An additional advantage of the keyboard scanning system then is that it requires few diodes, no amplifiers and simple switches which need not be low resistance or low bounce time switches. The display output includes internal segment or digit decoding, digit-blanking and zero suppression logic and utilizes the same scanning system as the keyboard. The display itself may be comprised of light-emitting diodes, liquid crystal, cold cathode gas discharge display elements, fluorescent display elements, multi-digit single-envelope cold-cathode gas-discharge tubes, incandescent display elements, etc. The multiple display capability is provided by the generally defined digit scanning and segment or numeral decoding system and by providing for an inter-digit blanking signal which is variable in terms of leading and trailing edge blanking intervals and in terms of its application to either the segment drivers or the digit drivers or both. The output decoder is comprised of a programmable logic array segment decoder circuit which can be programmed to accommodate any seven, eight, nine, ten segment or ten digit numerical display font plus a right or left decimal point. In this manner the calculator system of the present invention is essentially insensitive to the selection of a display which is utilized in conjunction with it.

It is still a further object of the invention to provide internal means for suppression of insignificant leading zeros in the calculator display. This object is accomplished by the programmed scanning system which provides scanning of the most significant output digits first and minimizes hardware means for detecting and suppressing leading zeros.

Another object of the invention is to allow both constant-operand and chained-intermediate-result type of calculations in a fully algebraic manner. This object is accomplished by providing an operator selectable control or mode switch to distinguish the constant-operand mode from the chained-intermediate-result mode of operation and by providing a fixed program decision routine in the read only memory array to detect the desired mode and effect it.

It is yet a further object of the invention to provide a calculator system which includes means for providing an automatic round-off solution for high accuracy in calculation. This object is accomplished in accordance with the present invention by utilizing a fixed program routine stored in the read only memory which adds the numeral five to the least significant digit which is to be lost. In this manner, a one is added to the second least significant digit which is to be kept when the least significant digit which is to be lost is greater than or equal to five.

Another object of the invention is to provide a calculator system with minimum power dissipation in order to provide a uniquely portable desk top calculator with good battery life. This object is accomplished in accordance with the present invention by provision of special control circuits to turn off dissipating functional elements except when such functional elements are actually being used and by provision of special pre-charge ratioless circuits within an metal-insulator-semiconductor embodiment of the read only memory, programmable logic array and arithmetic logic unit functional subsystems. For example, the instruction output from the read only memory need be detected only once per instruction cycle; a power control is applied to the read only memory decoder effecting a duty cycle of 2/13ths of the nominal static power dissipation to eliminate DC currents so that only transient $CV^2f$ power is disipated.

Still further objects and advantages of the invention will be apparent from the following detailed description and claims and from the accompanying drawings illustrative of the invention wherein:

FIG. 3 is a block diagram functionally describing data block 204 of one embodiment of the calculator system of the invention;

FIG. 4 is a block diagram of the FLAG registers illustrating the operation thereof;

Figure 17:
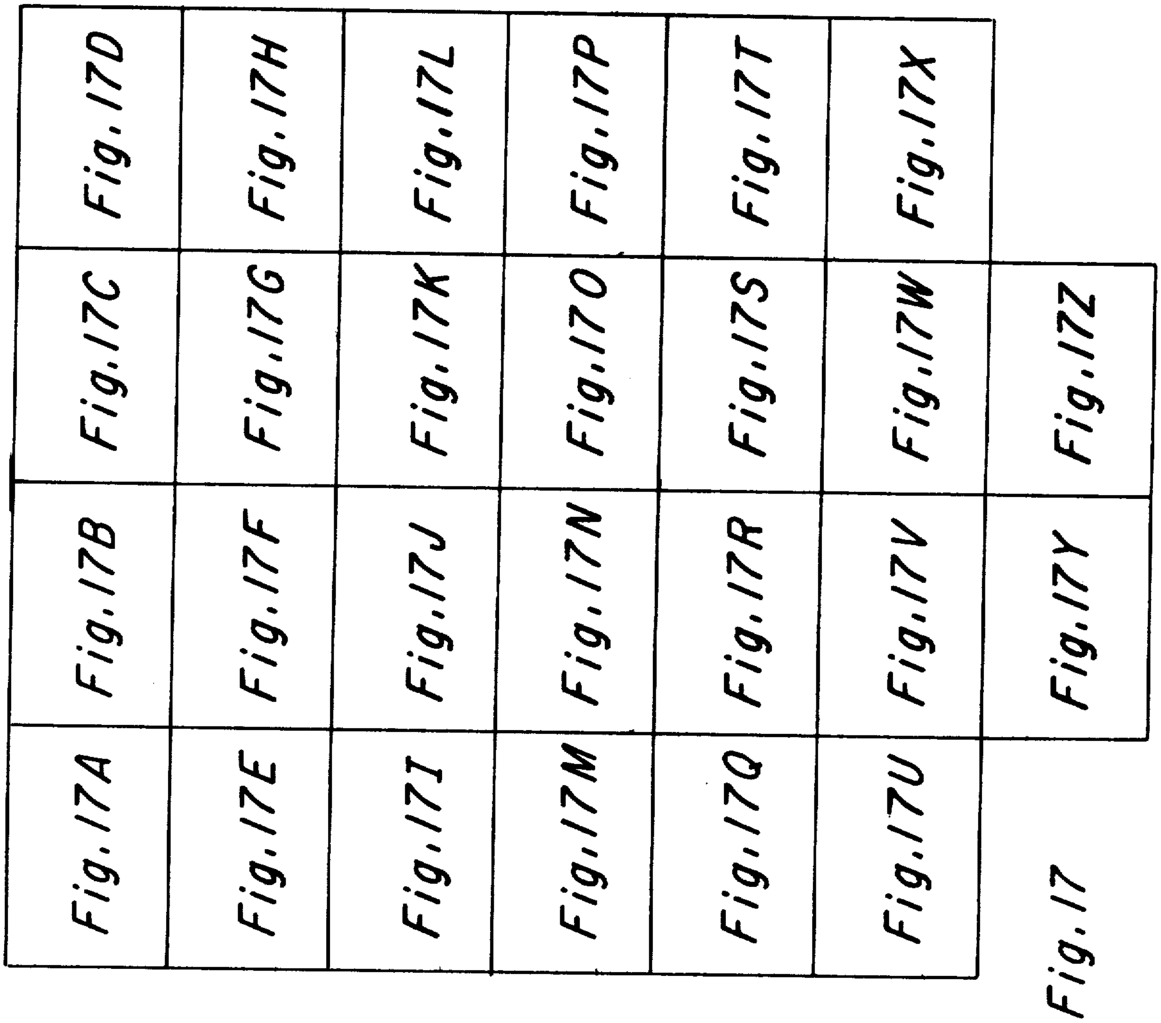
FIG. 17 is a composite drawing showing the combination of FIGS. 17A–Z.
Figure 17A:
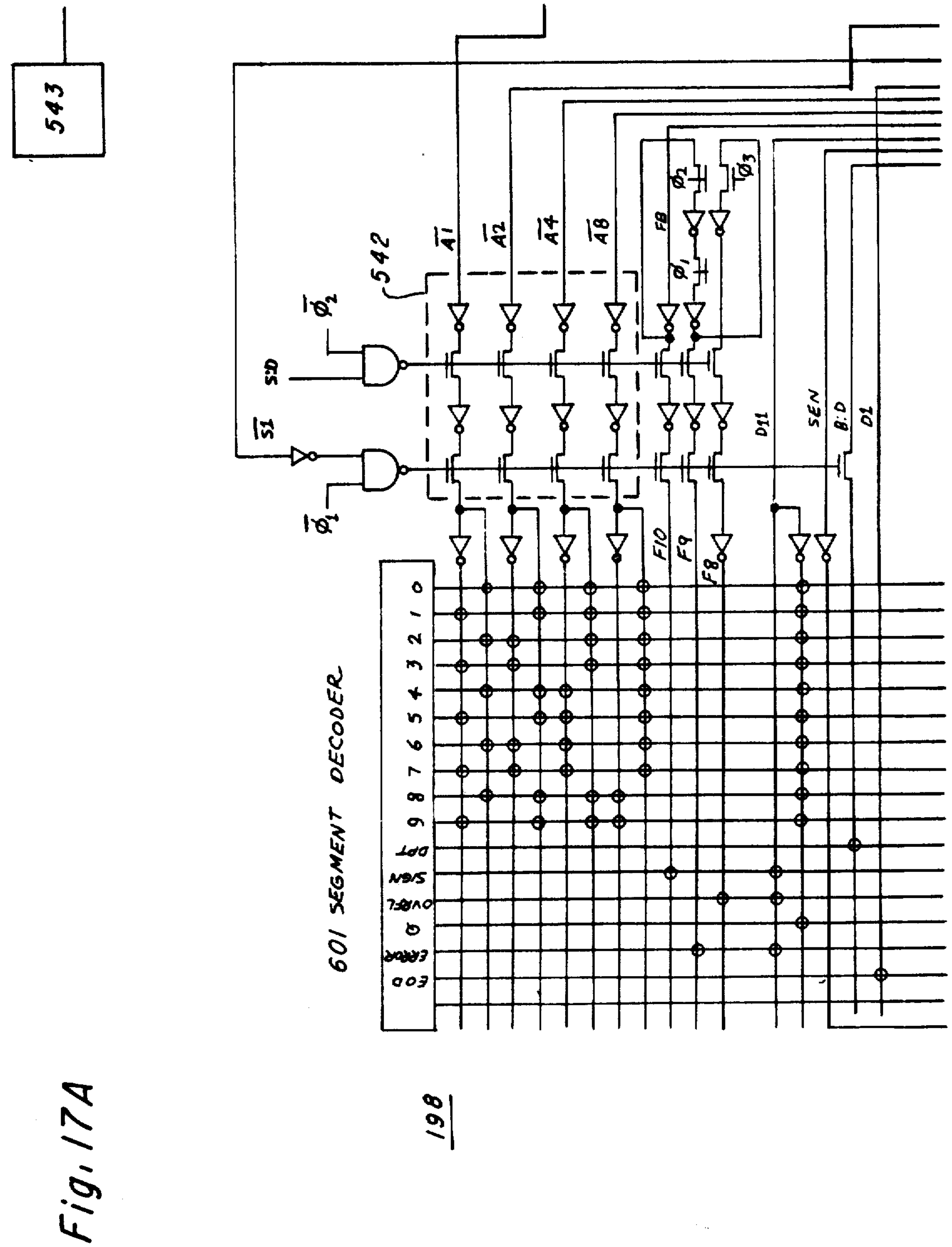
Figure 17B:
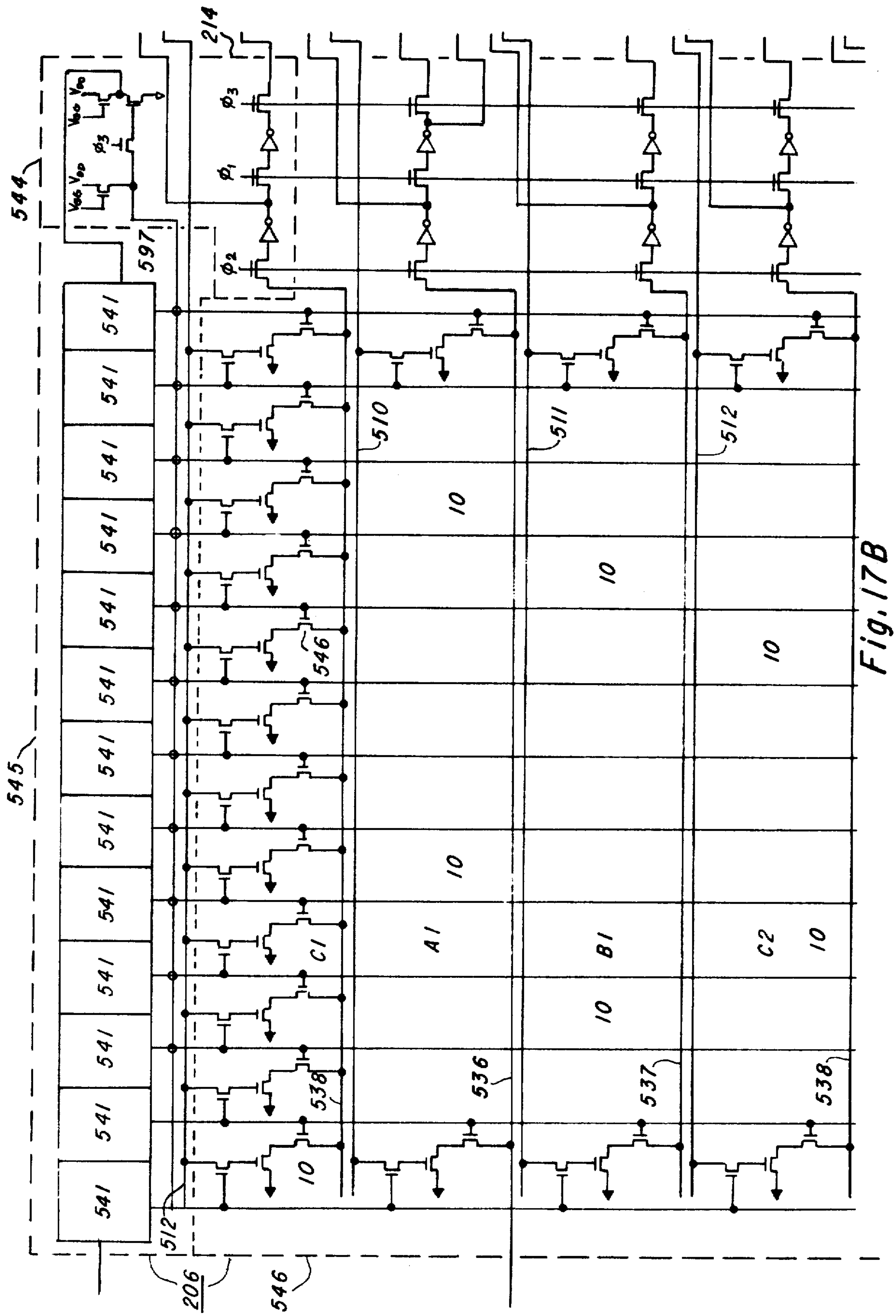
Figure 17C:
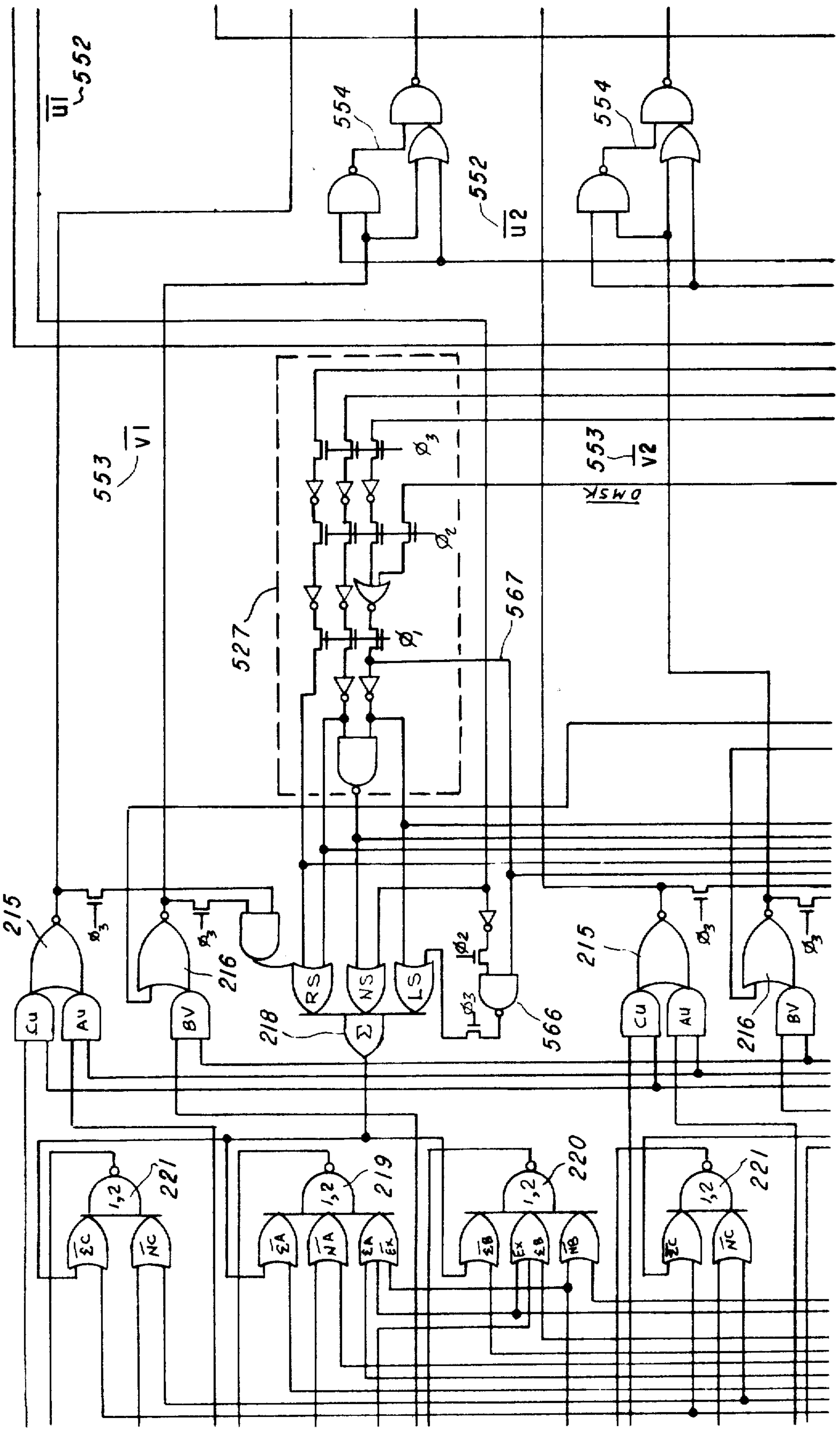
Figure 17D:
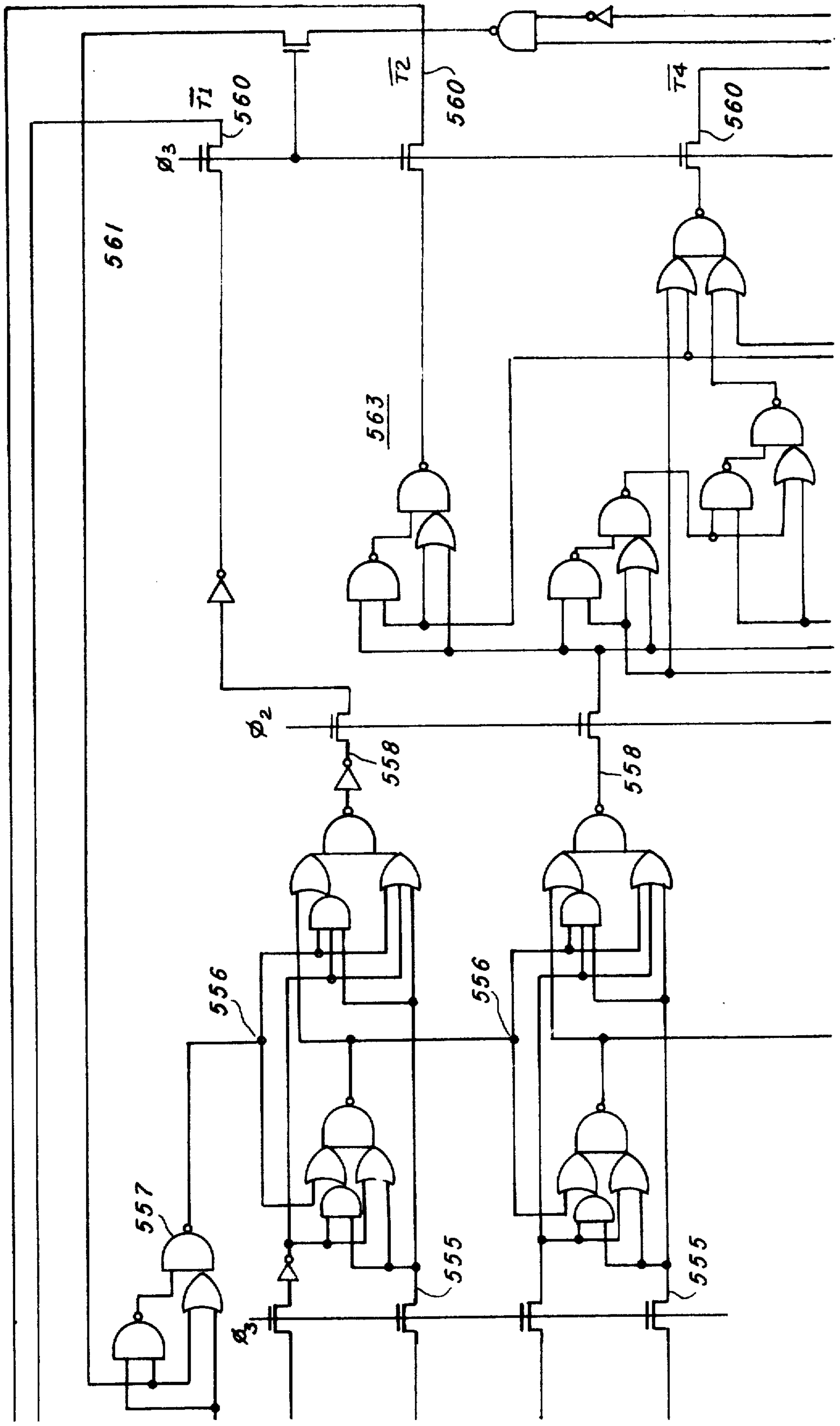
Figure 17E:
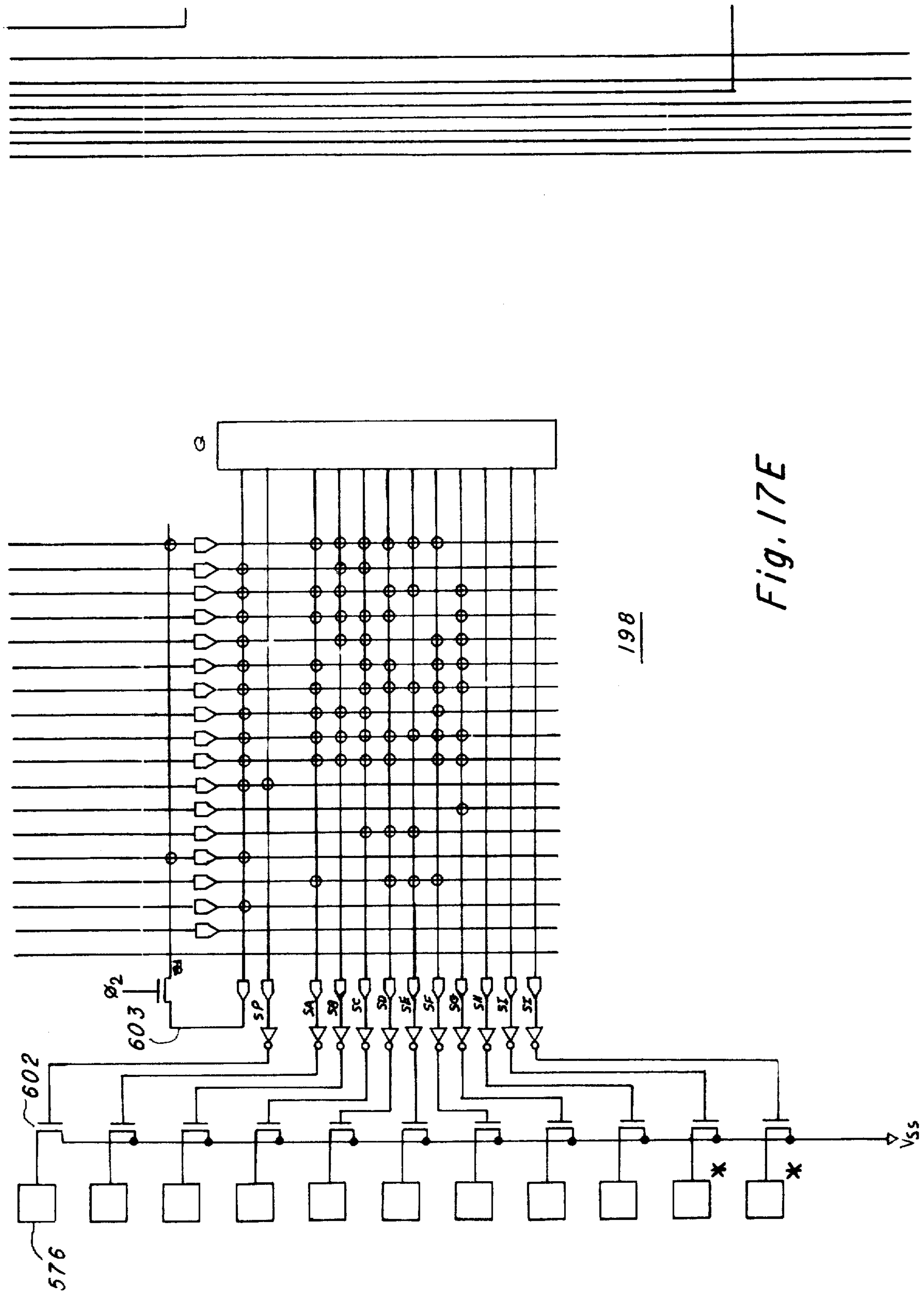
Figure 17F:
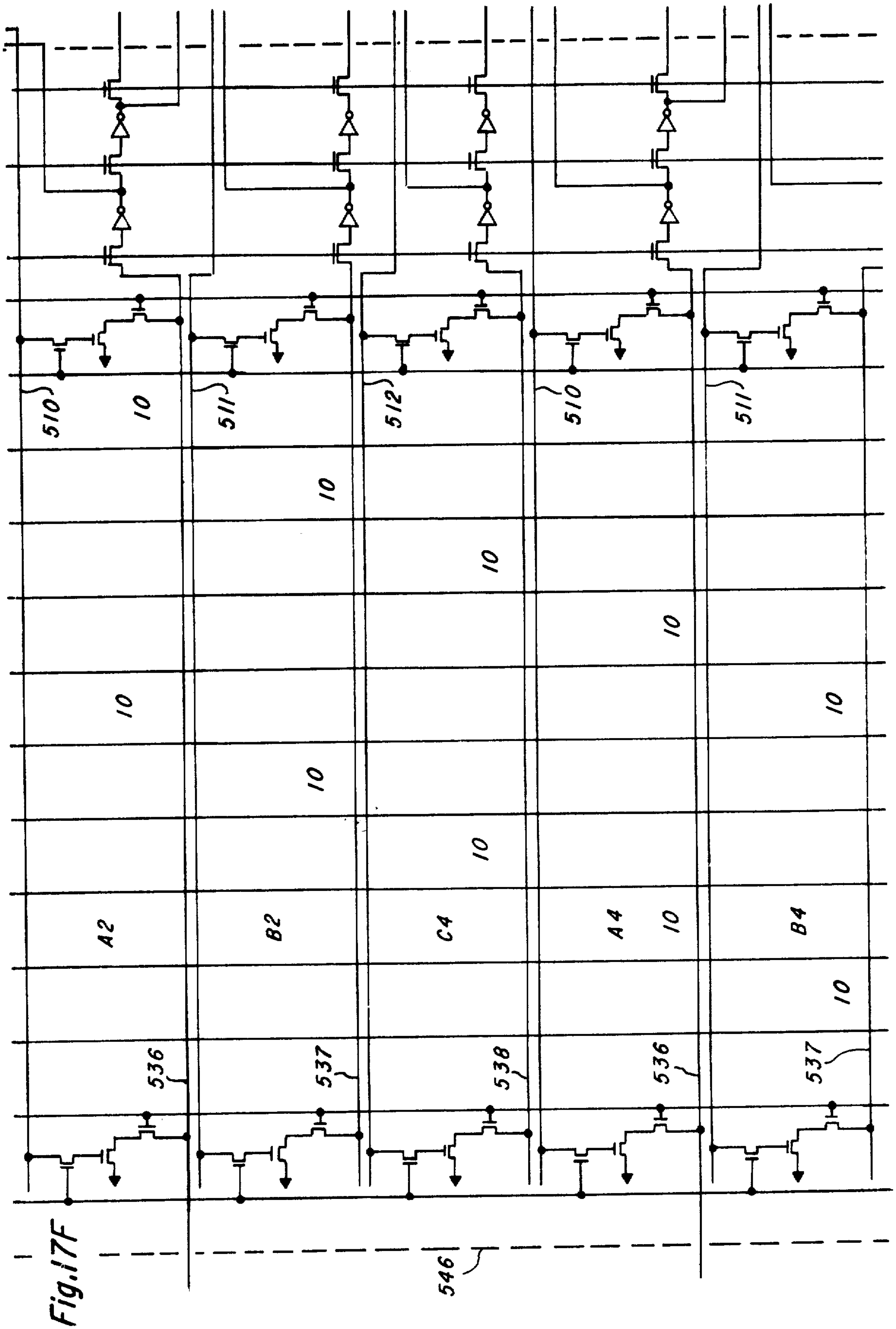
Figure 17G:
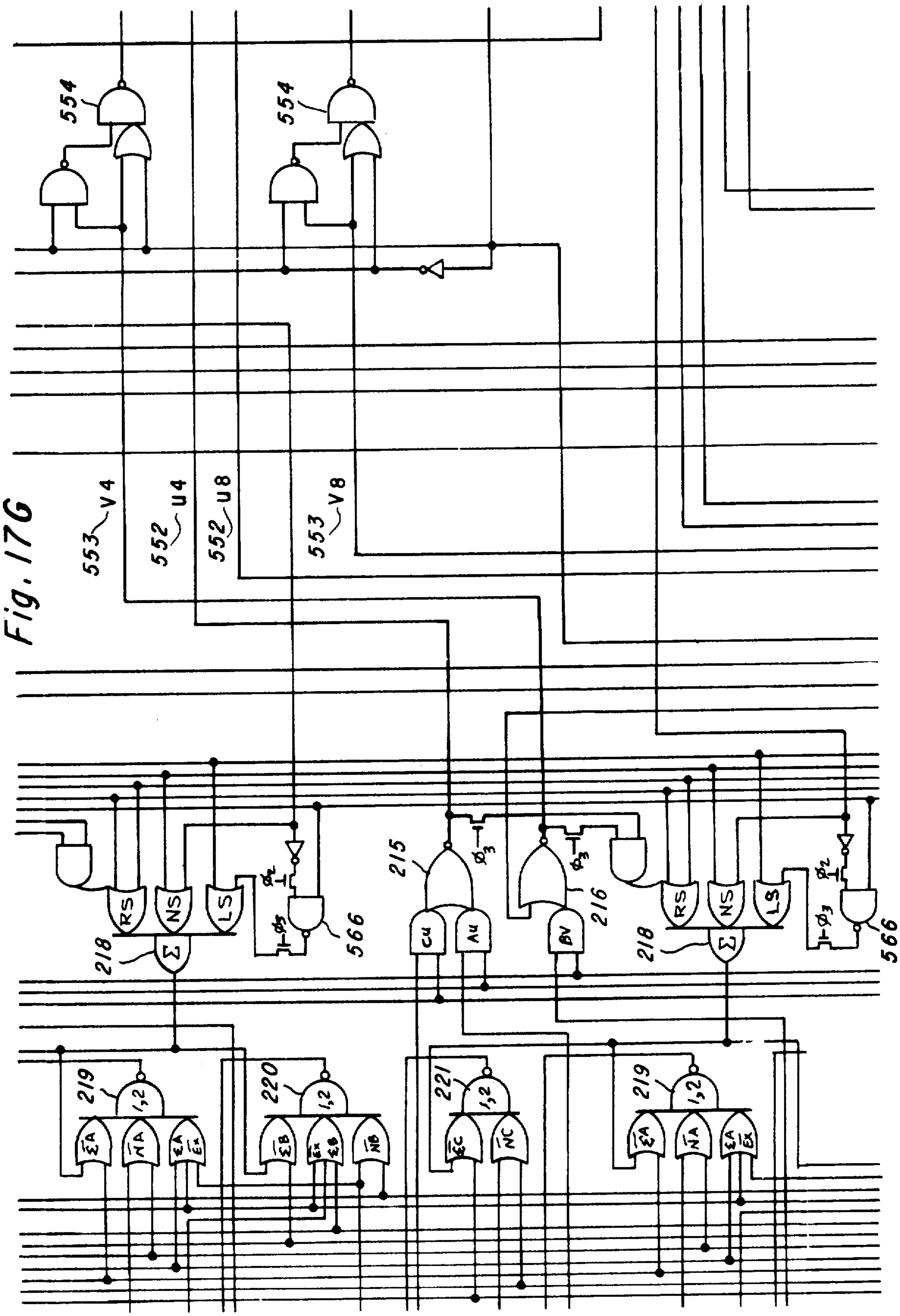
Figure 17H:
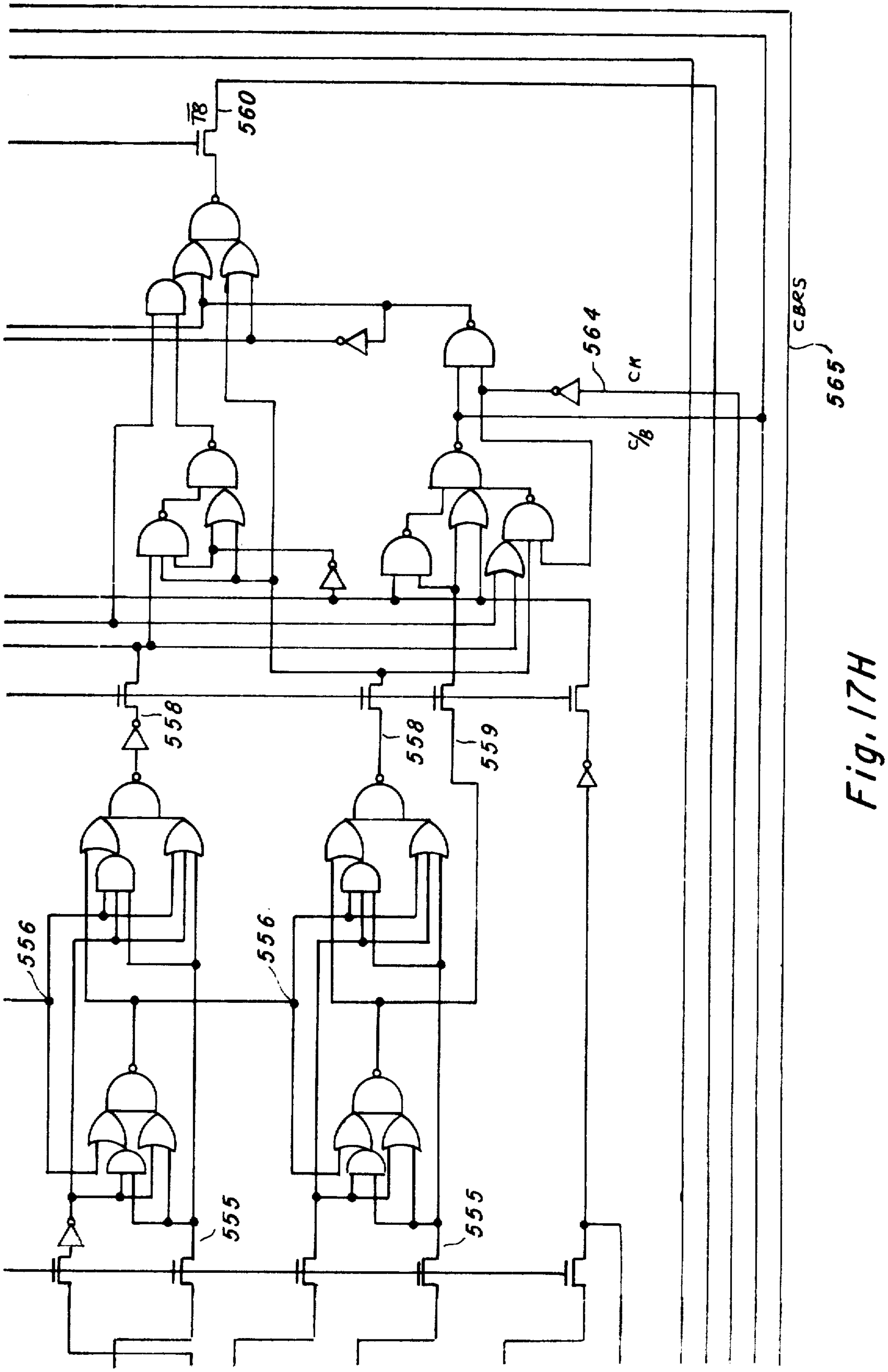
Figure 17I:
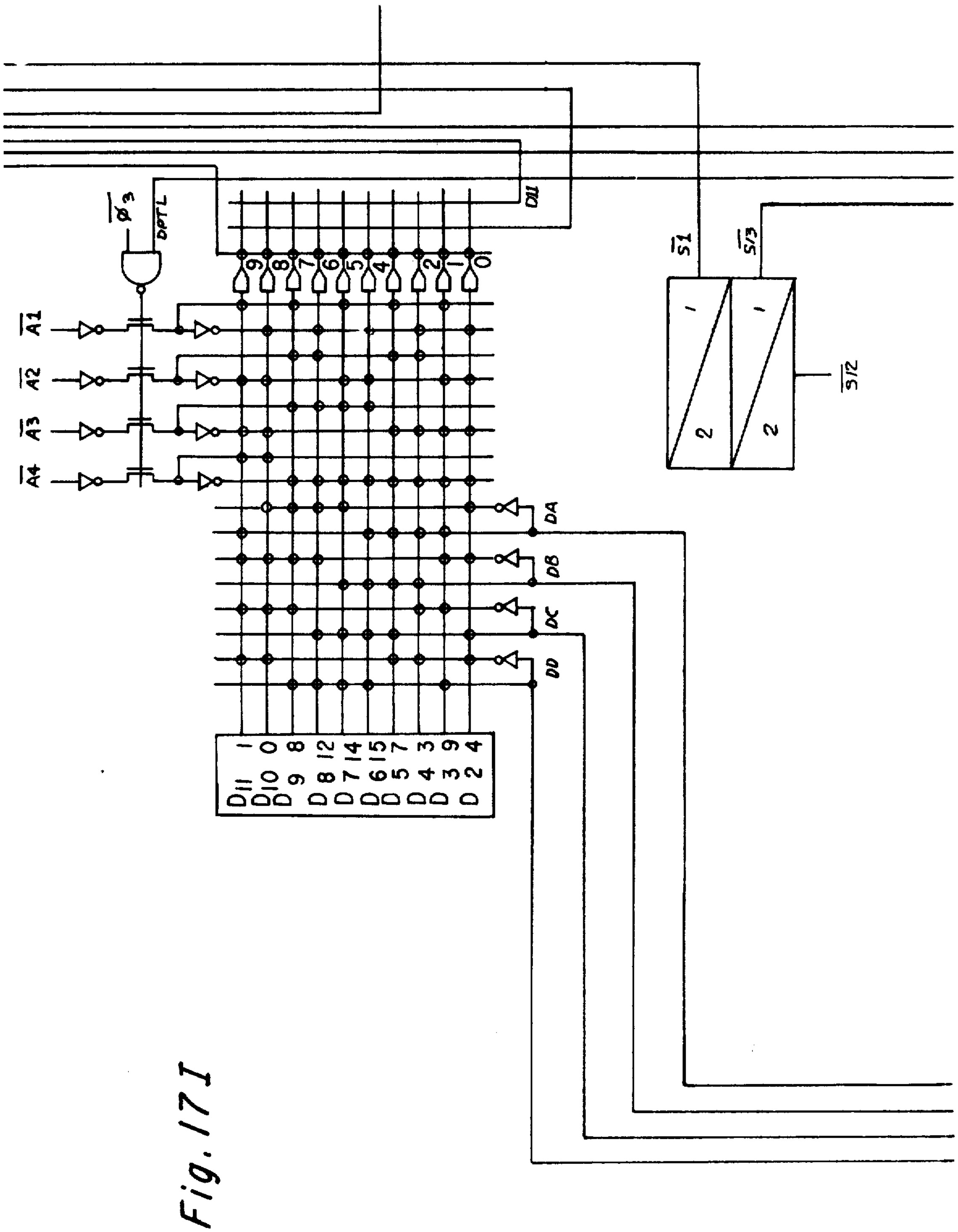
Figure 17J:
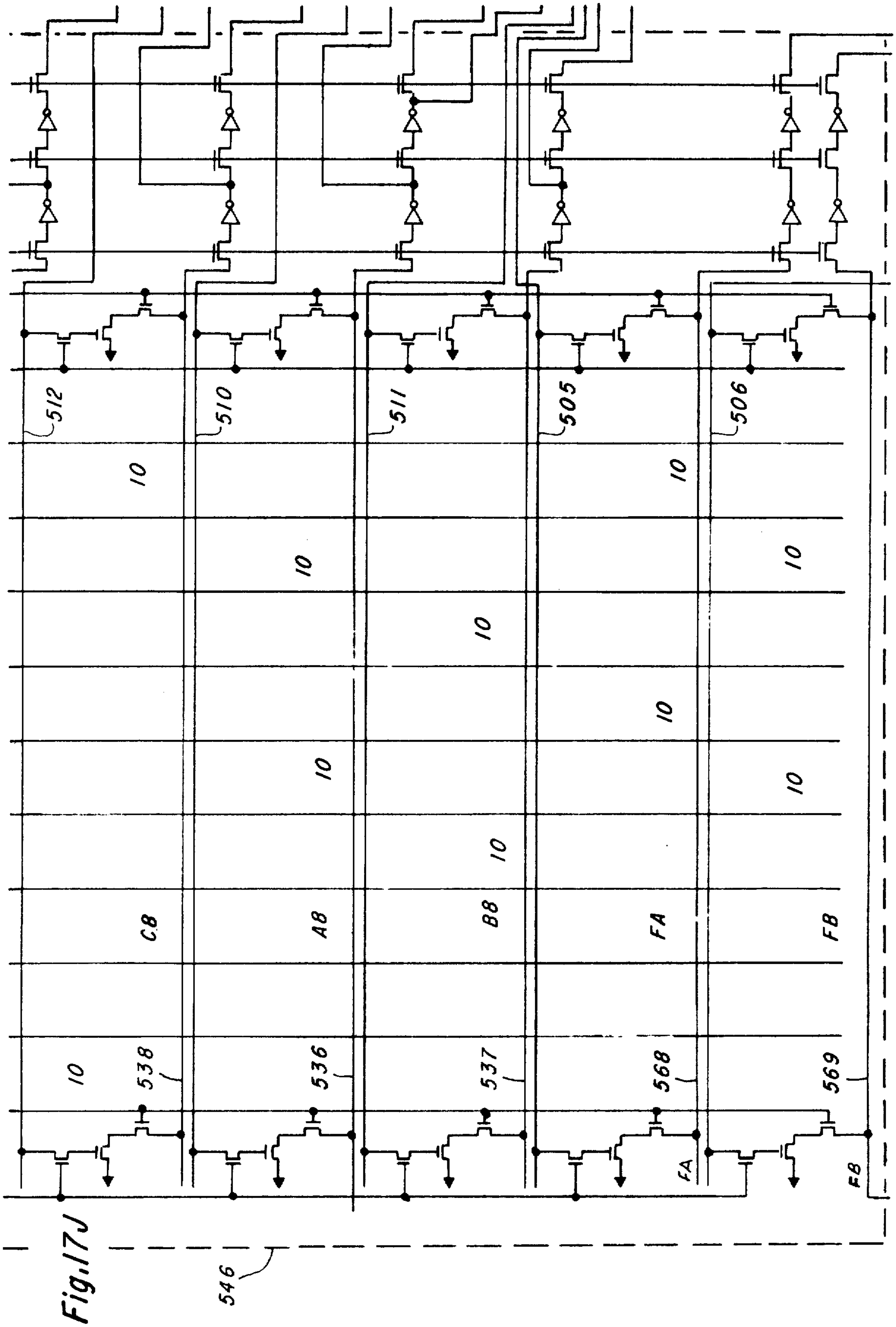
Figure 17K:
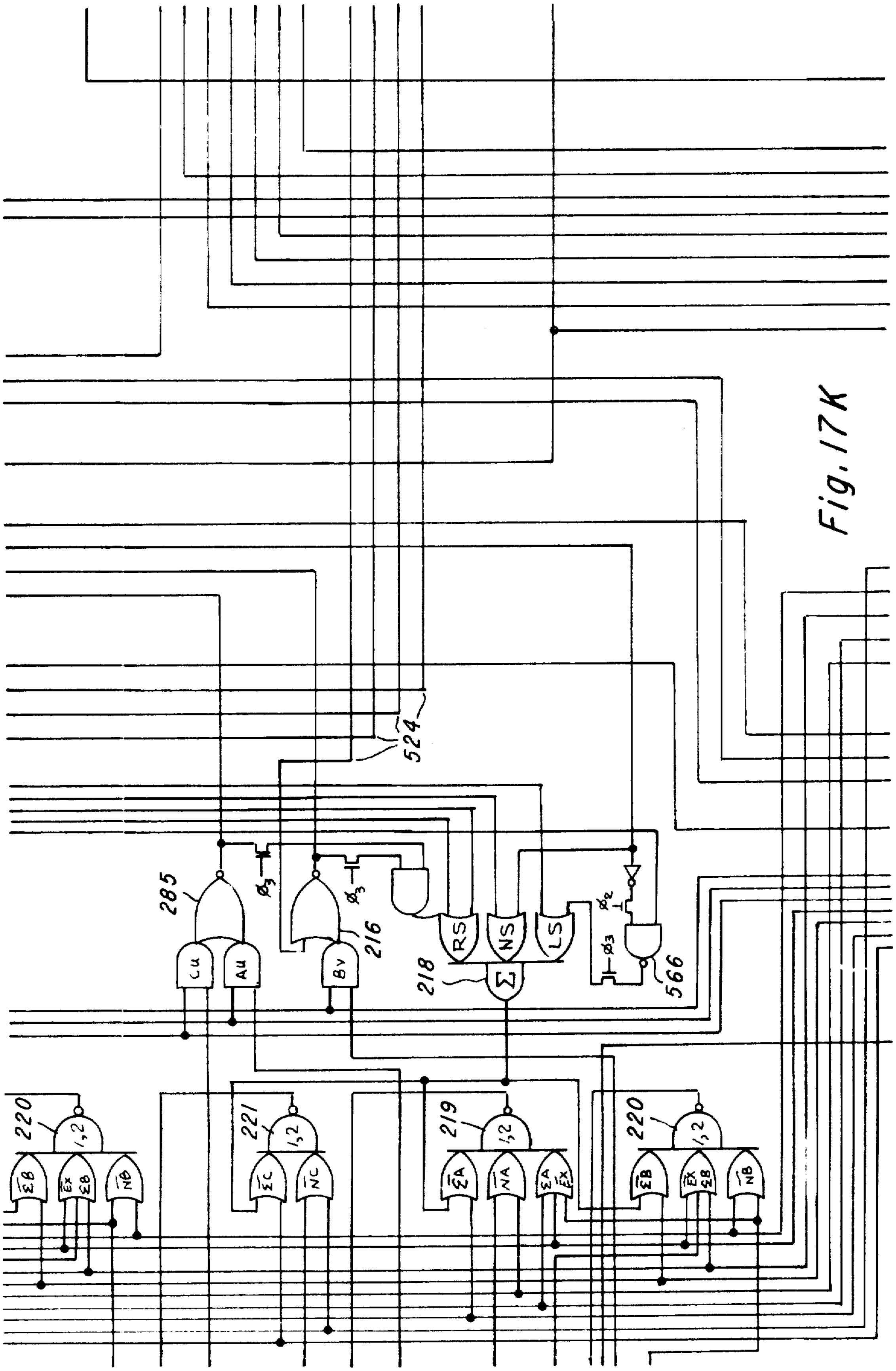
Figure 17L:
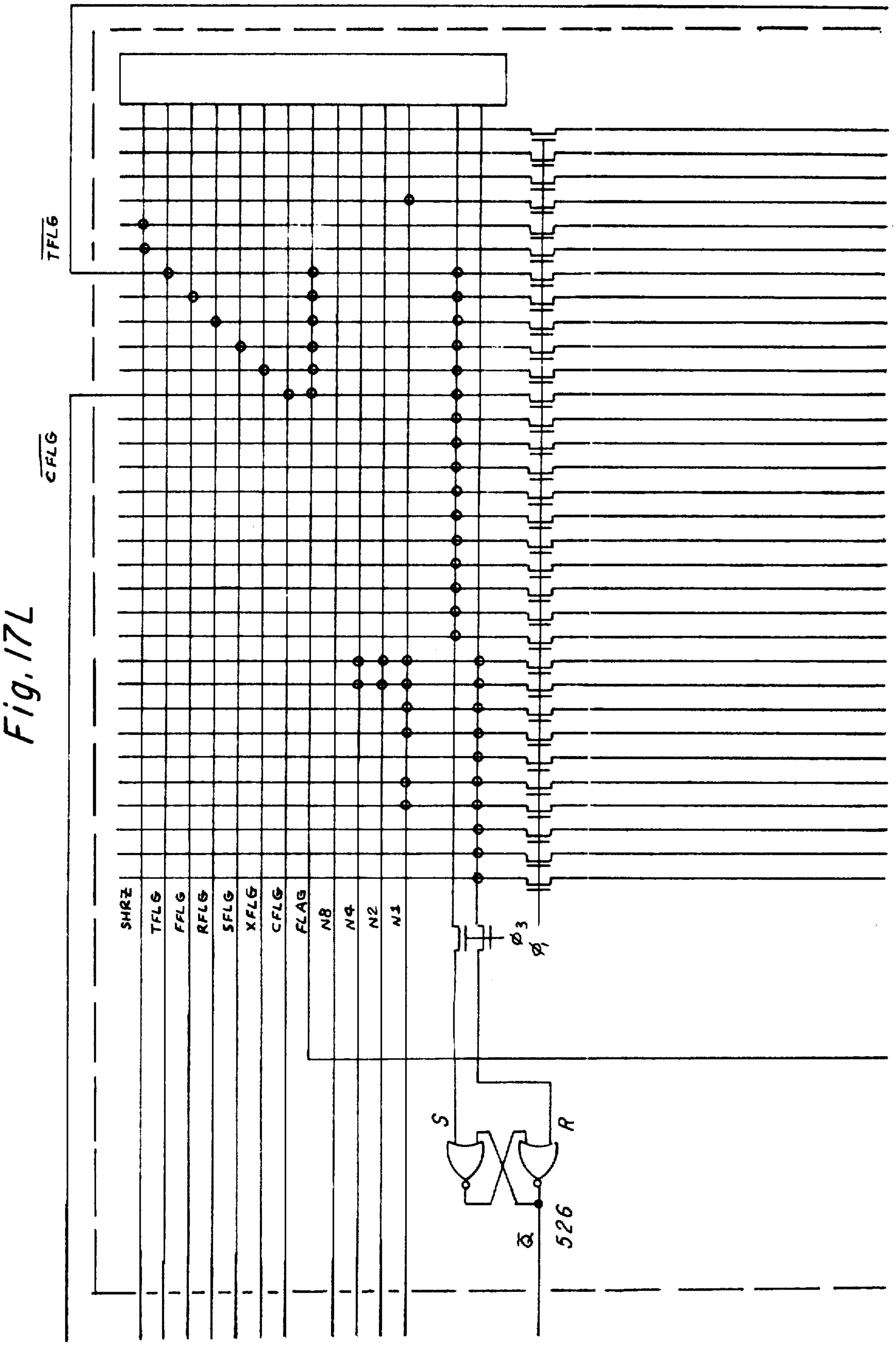
Figure 17M:
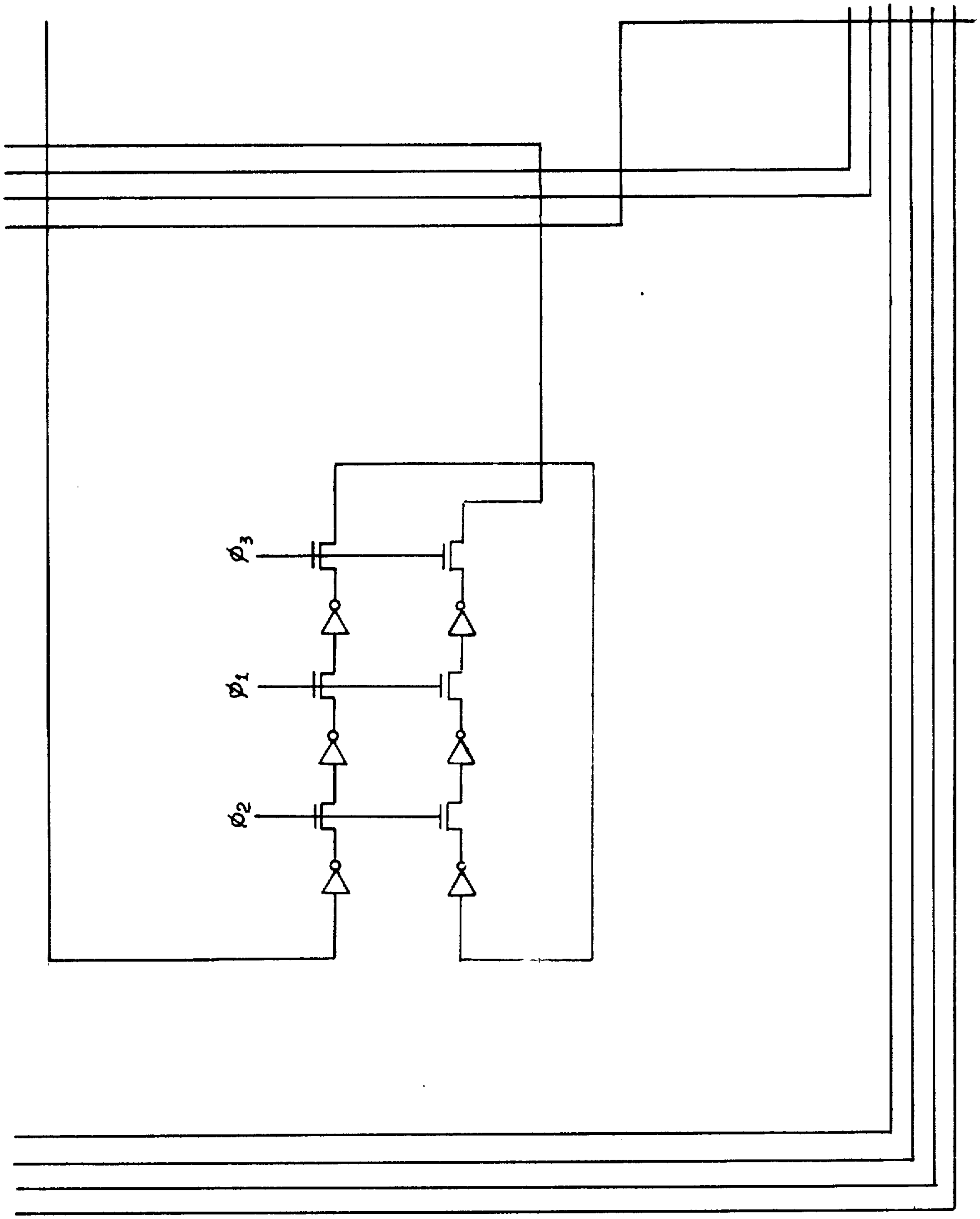
Figure 17N:
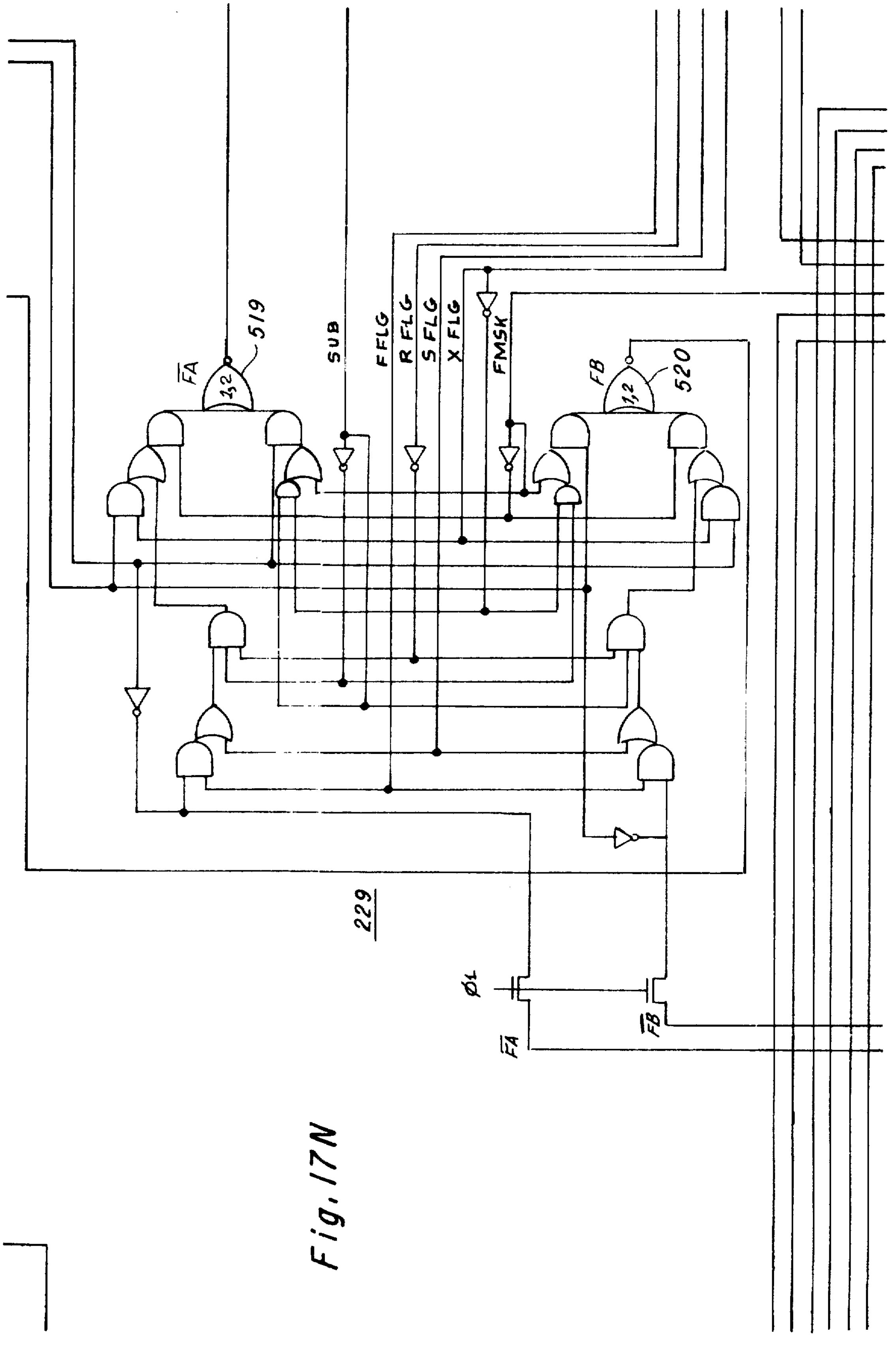
Figure 170:
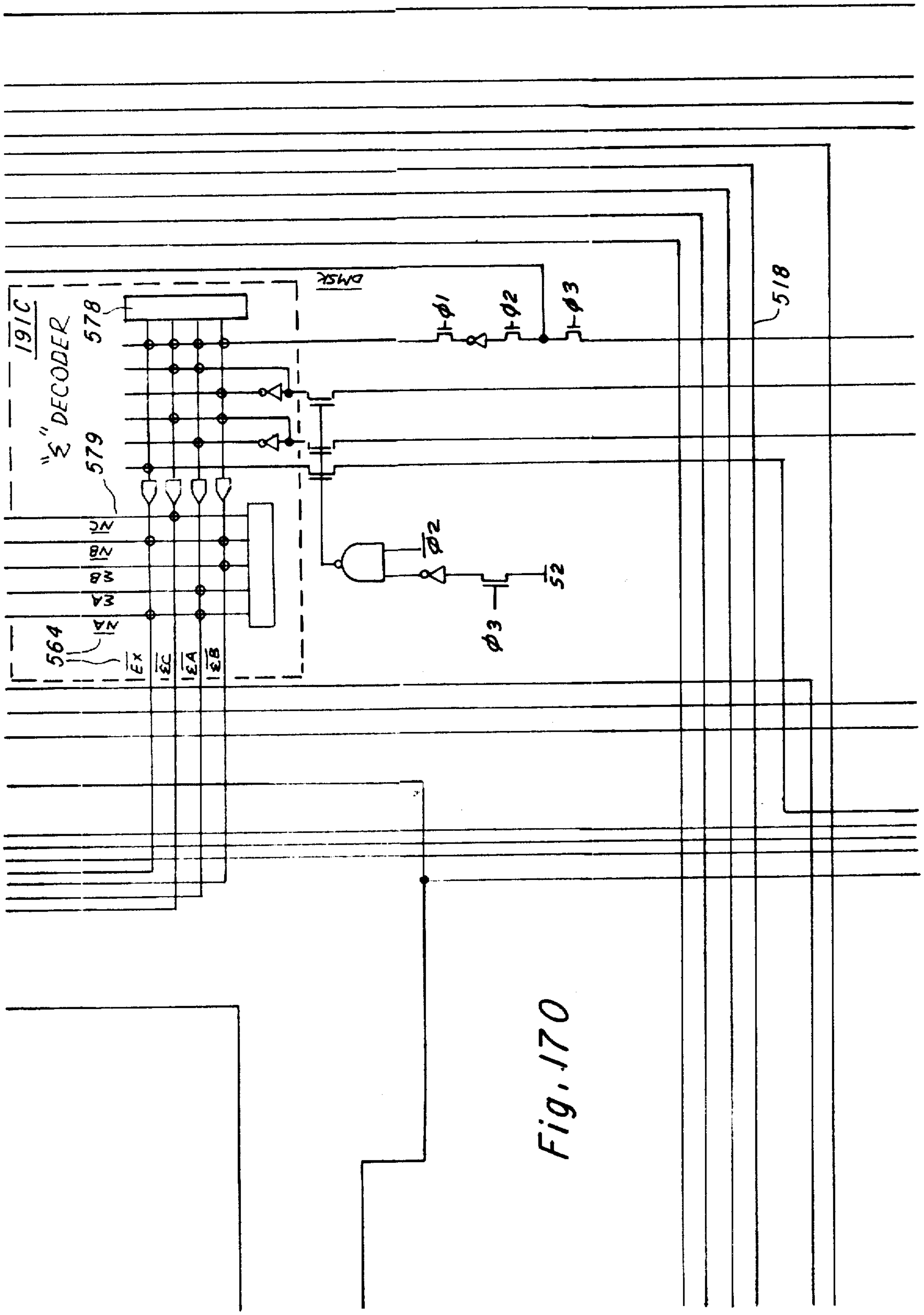
Figure 17P:
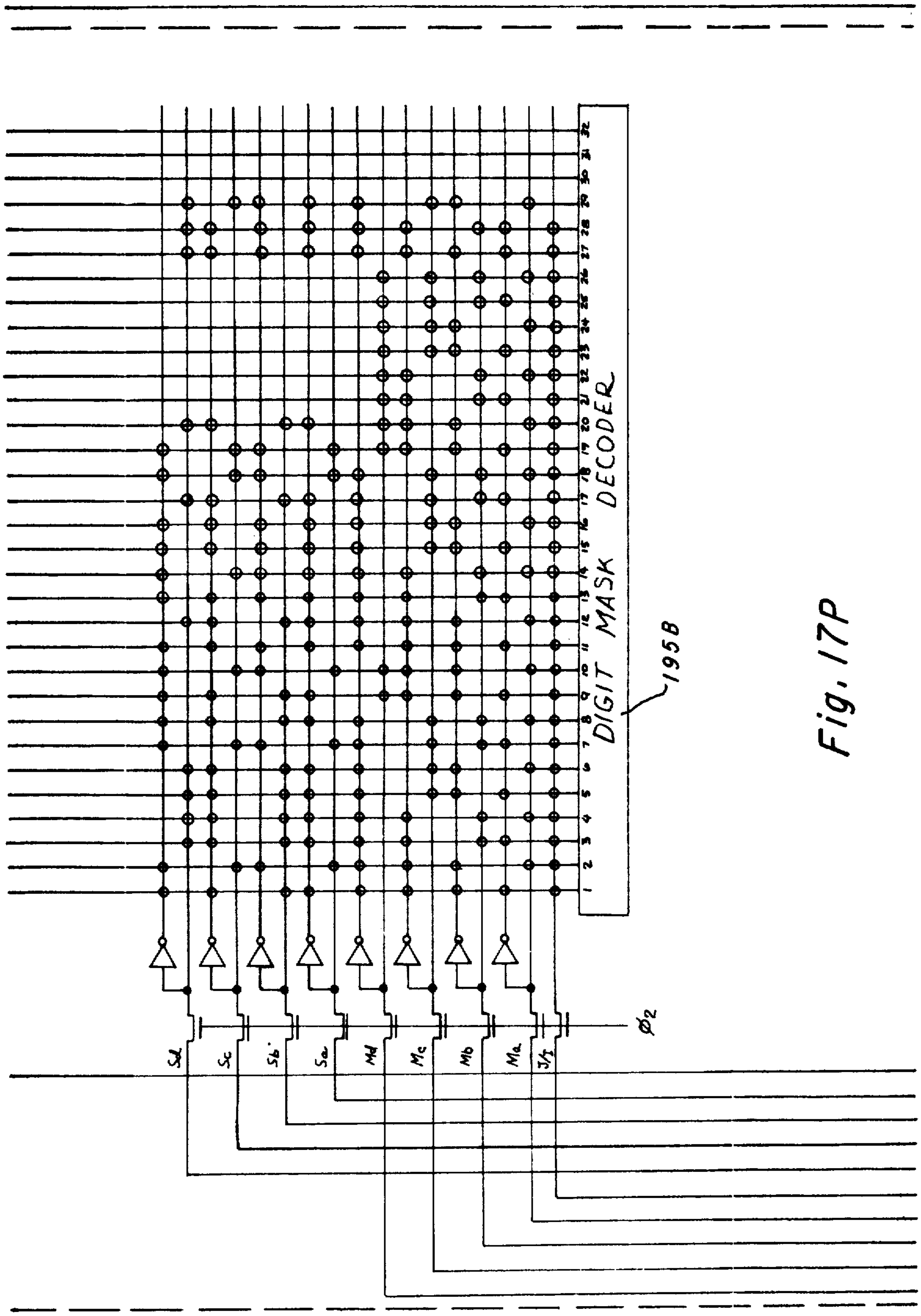
Figure 17Q:
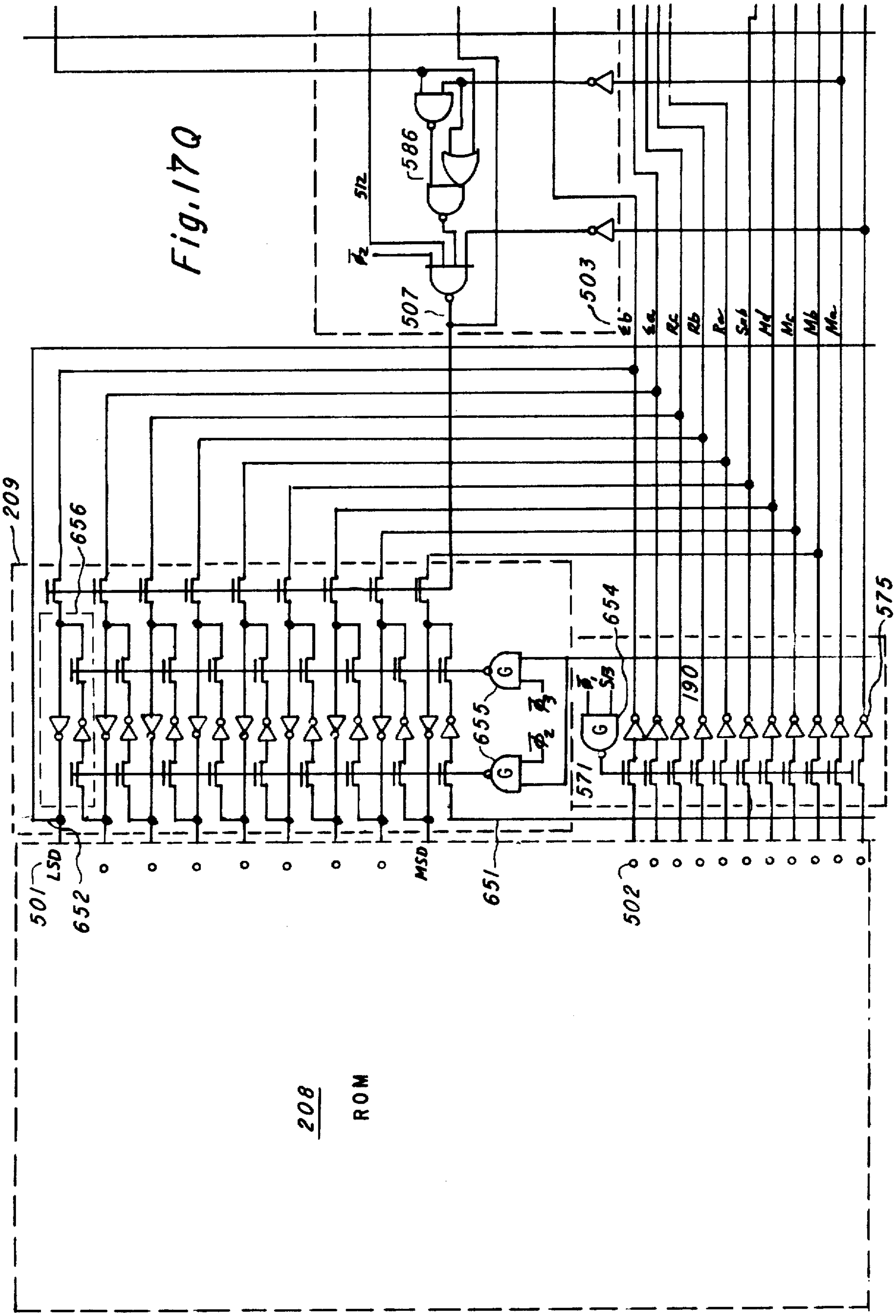
Figure 17S:
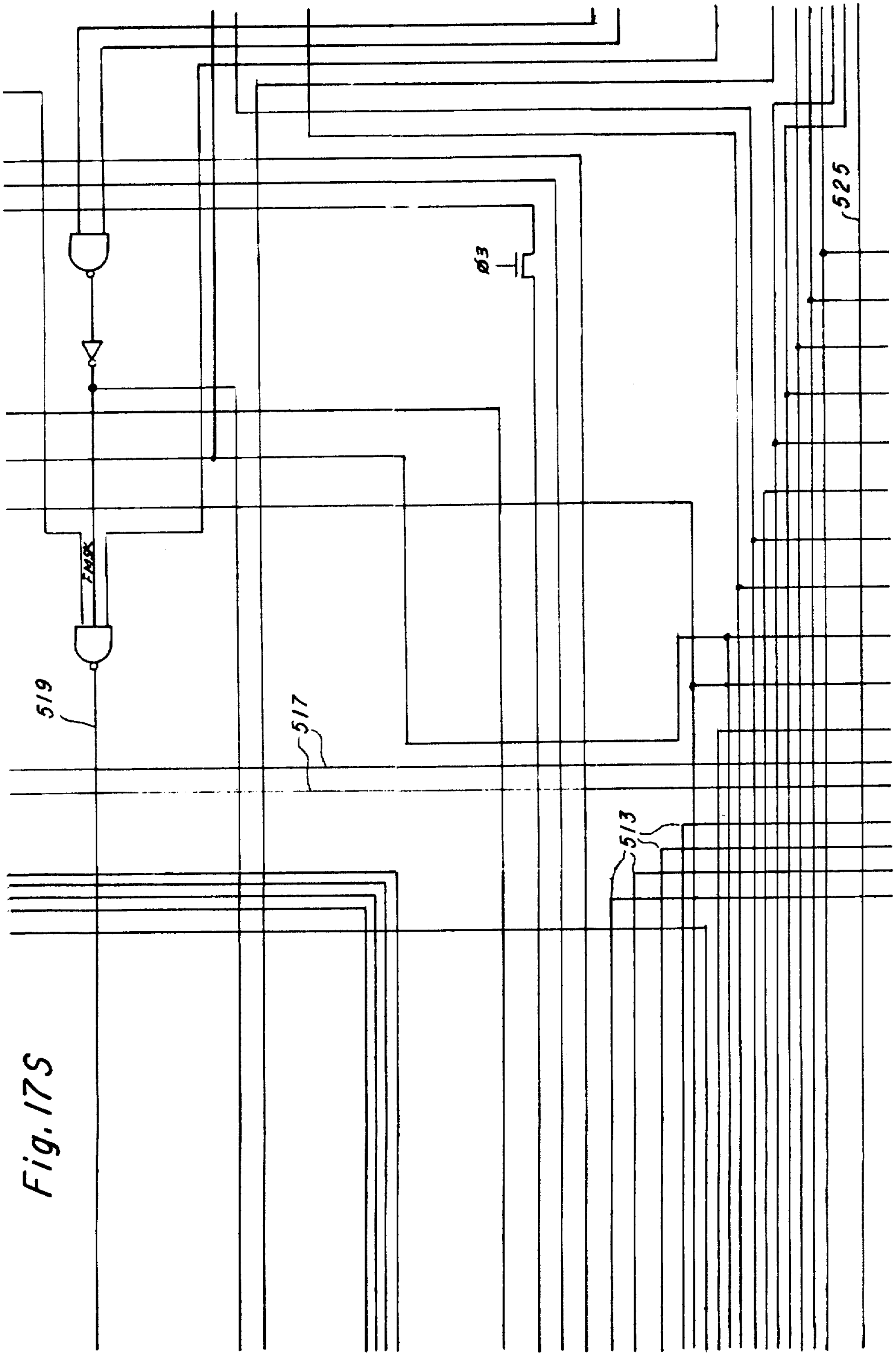
Figure 17T:
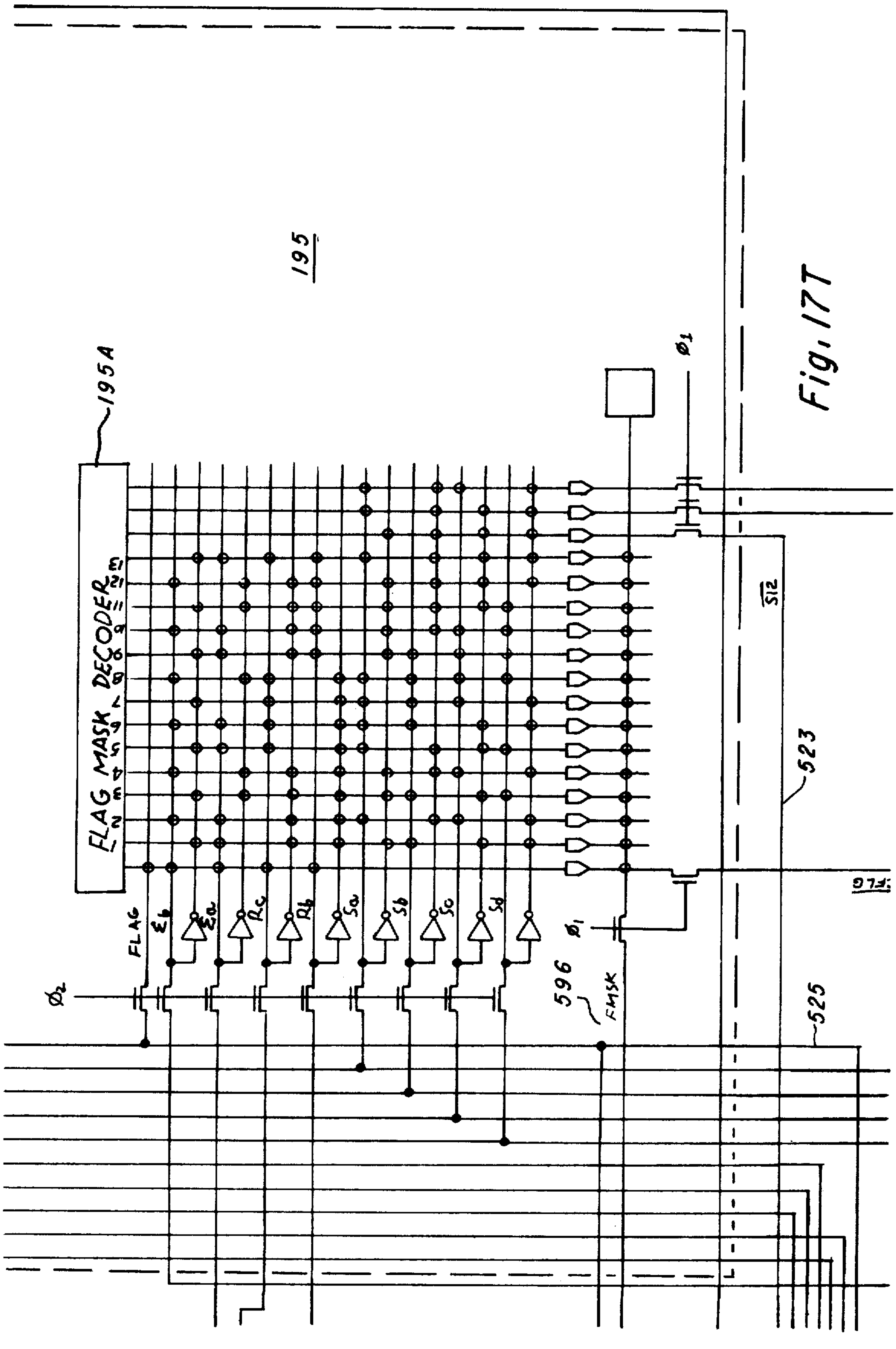
Figure 17U:
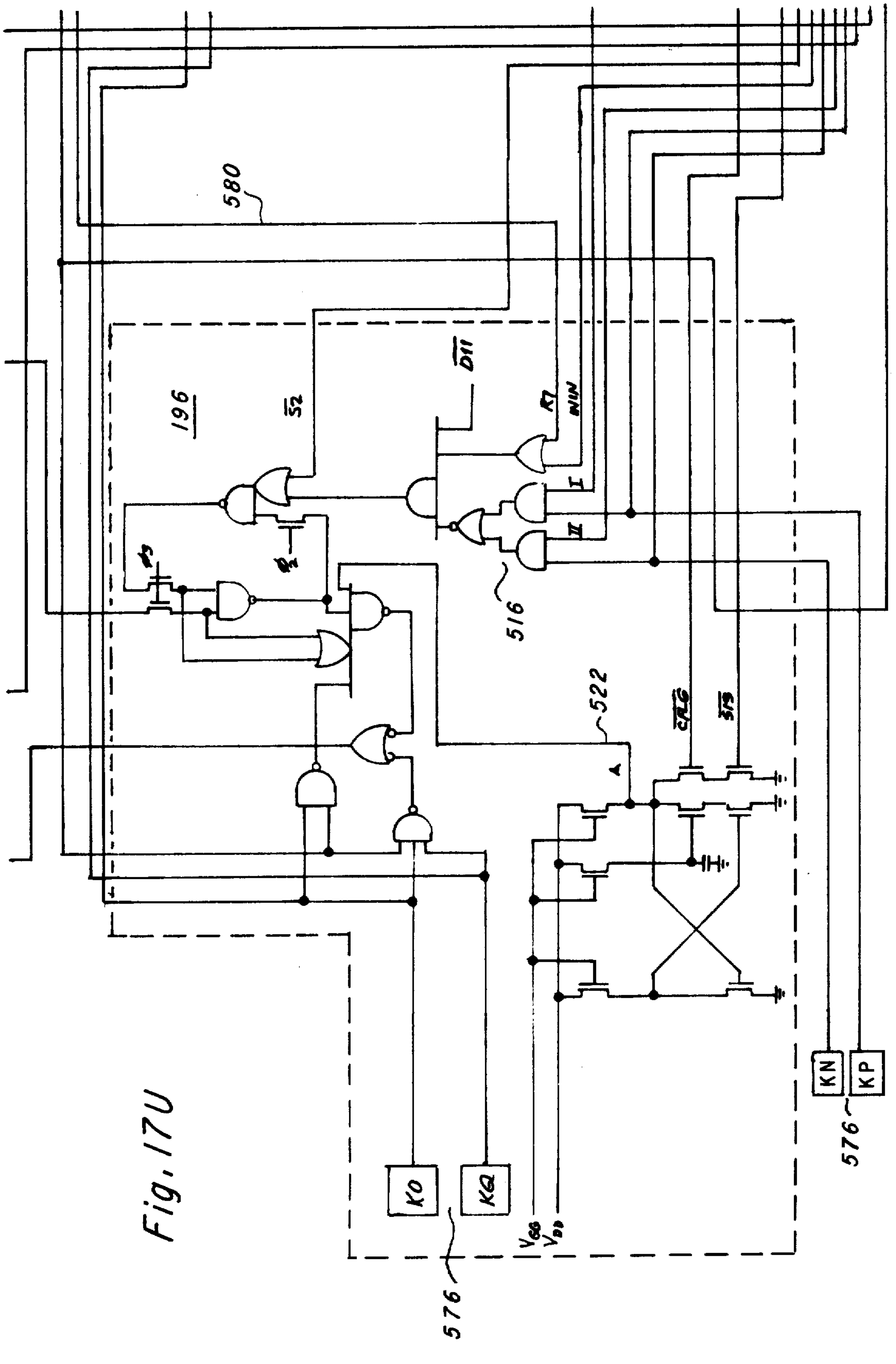
Figure 17V:
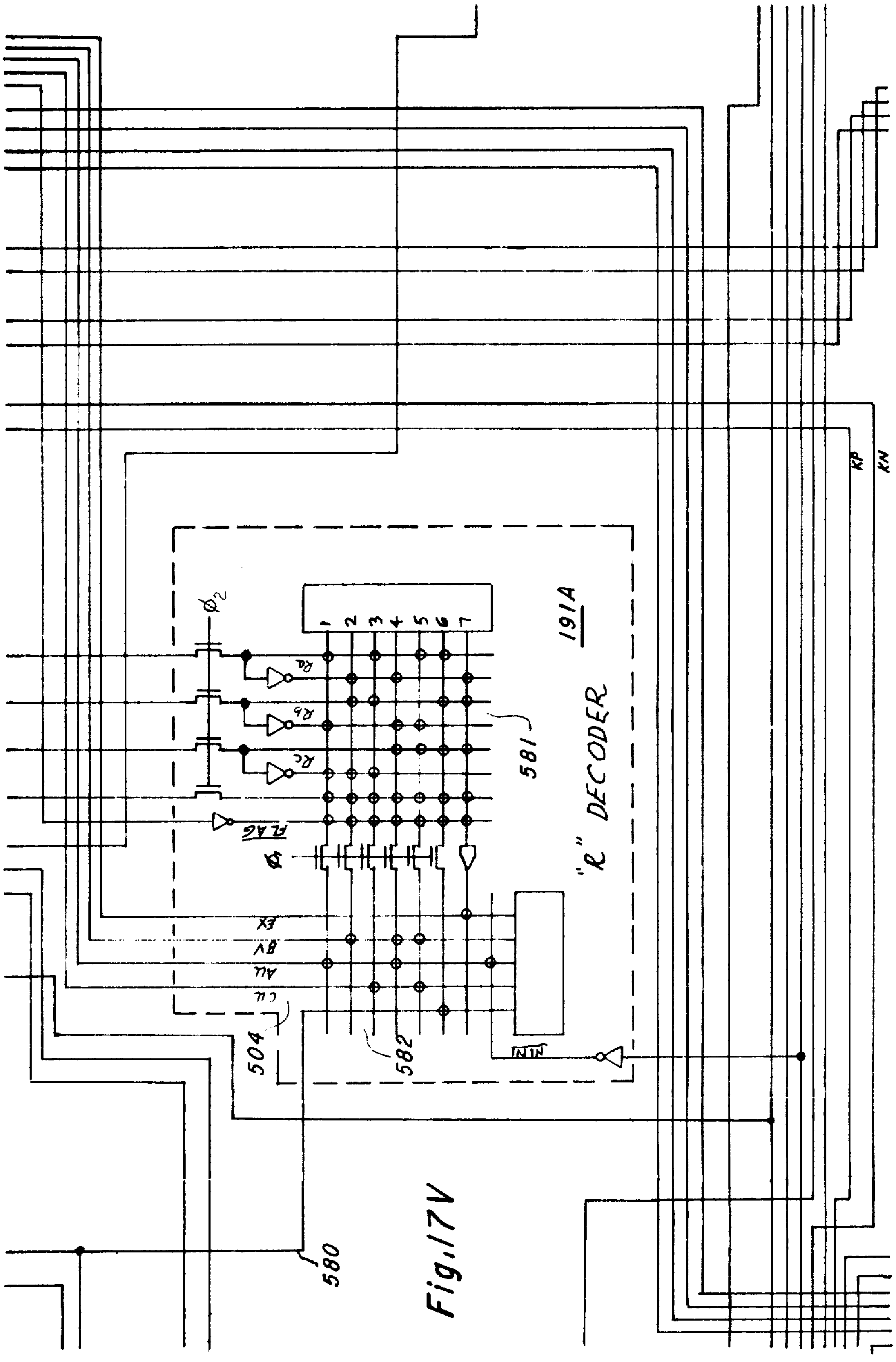
Figure 17W:
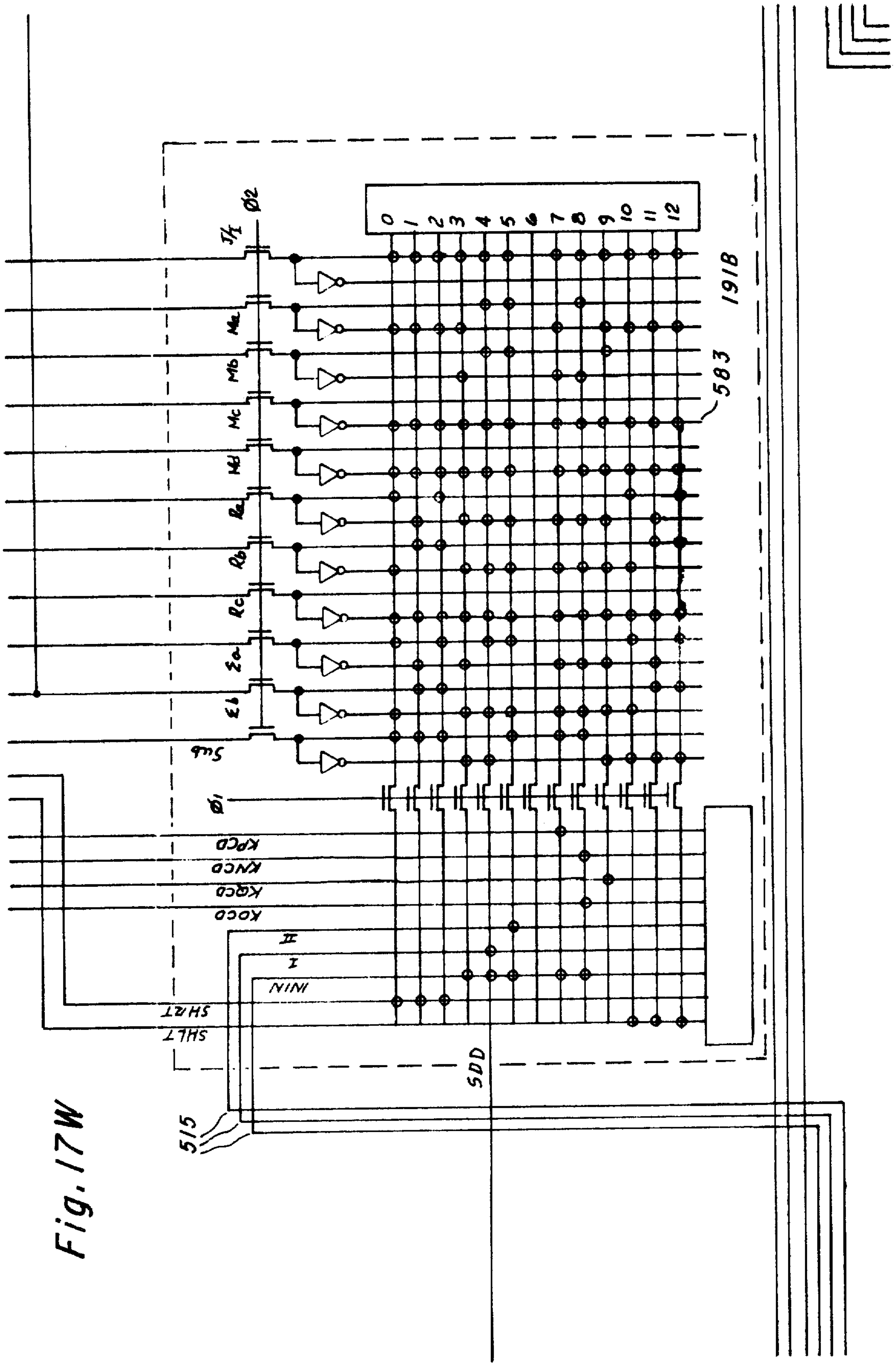
Figure 17X:
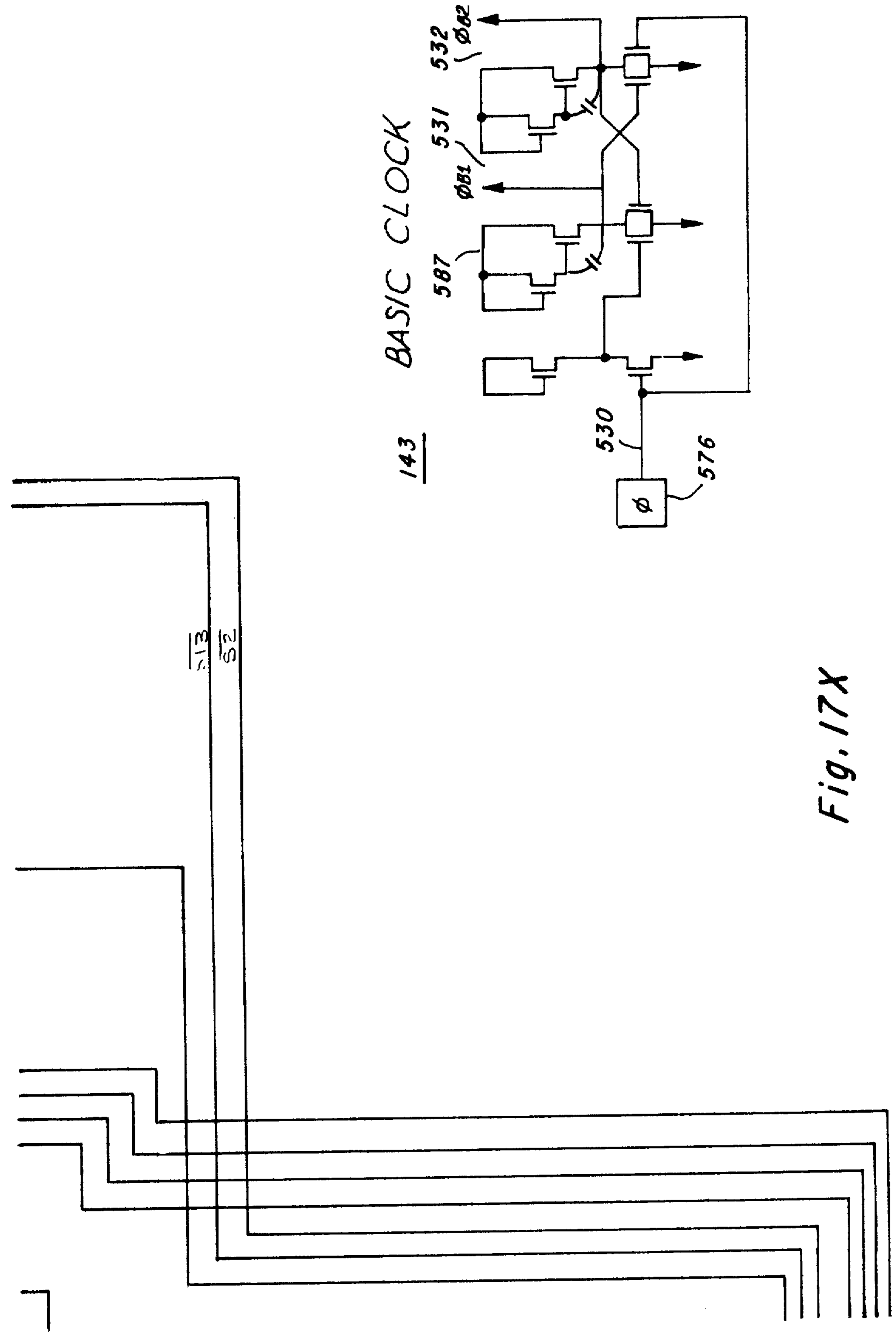
Figure 17Y:
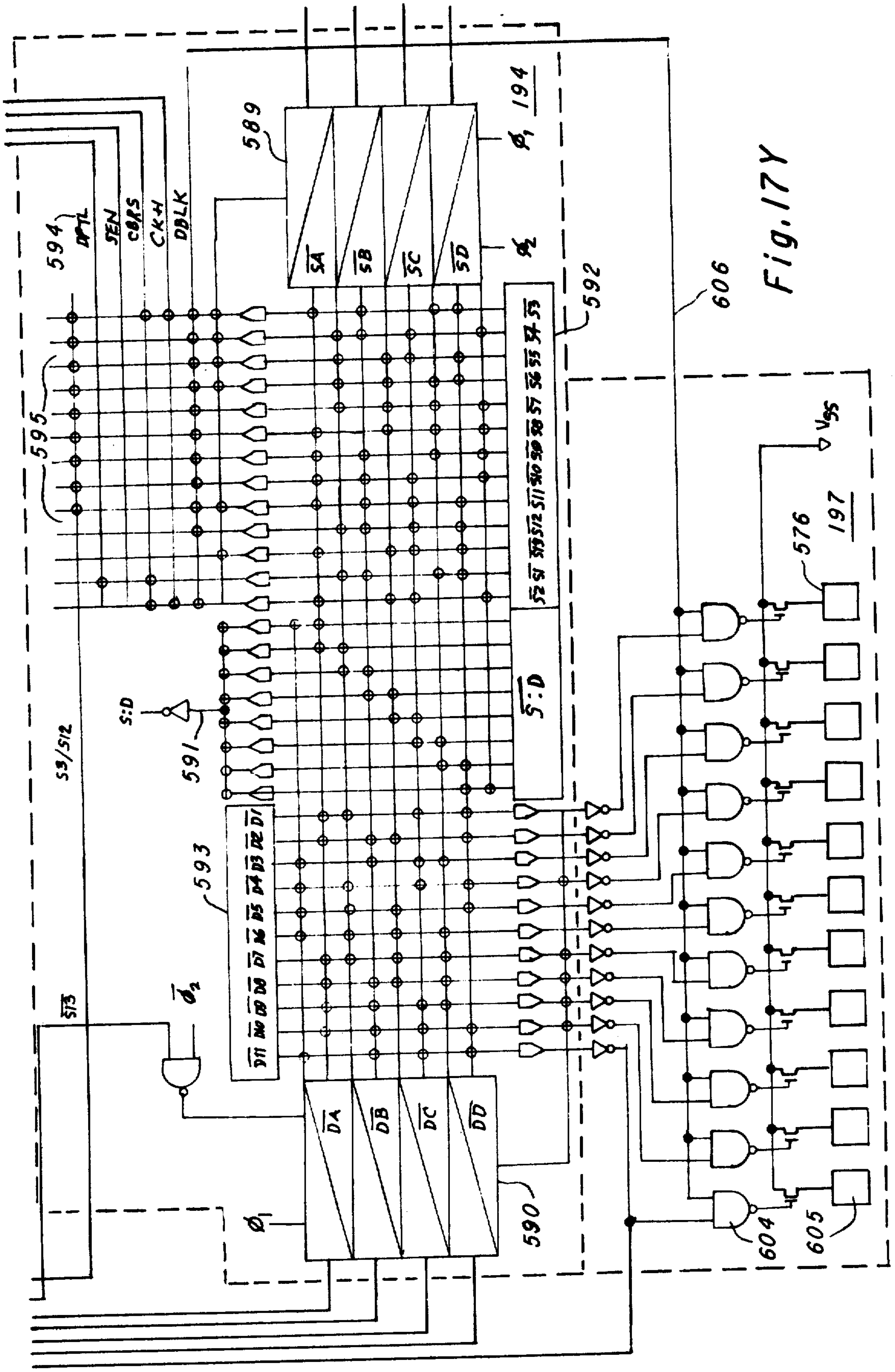
Figure 17Z:
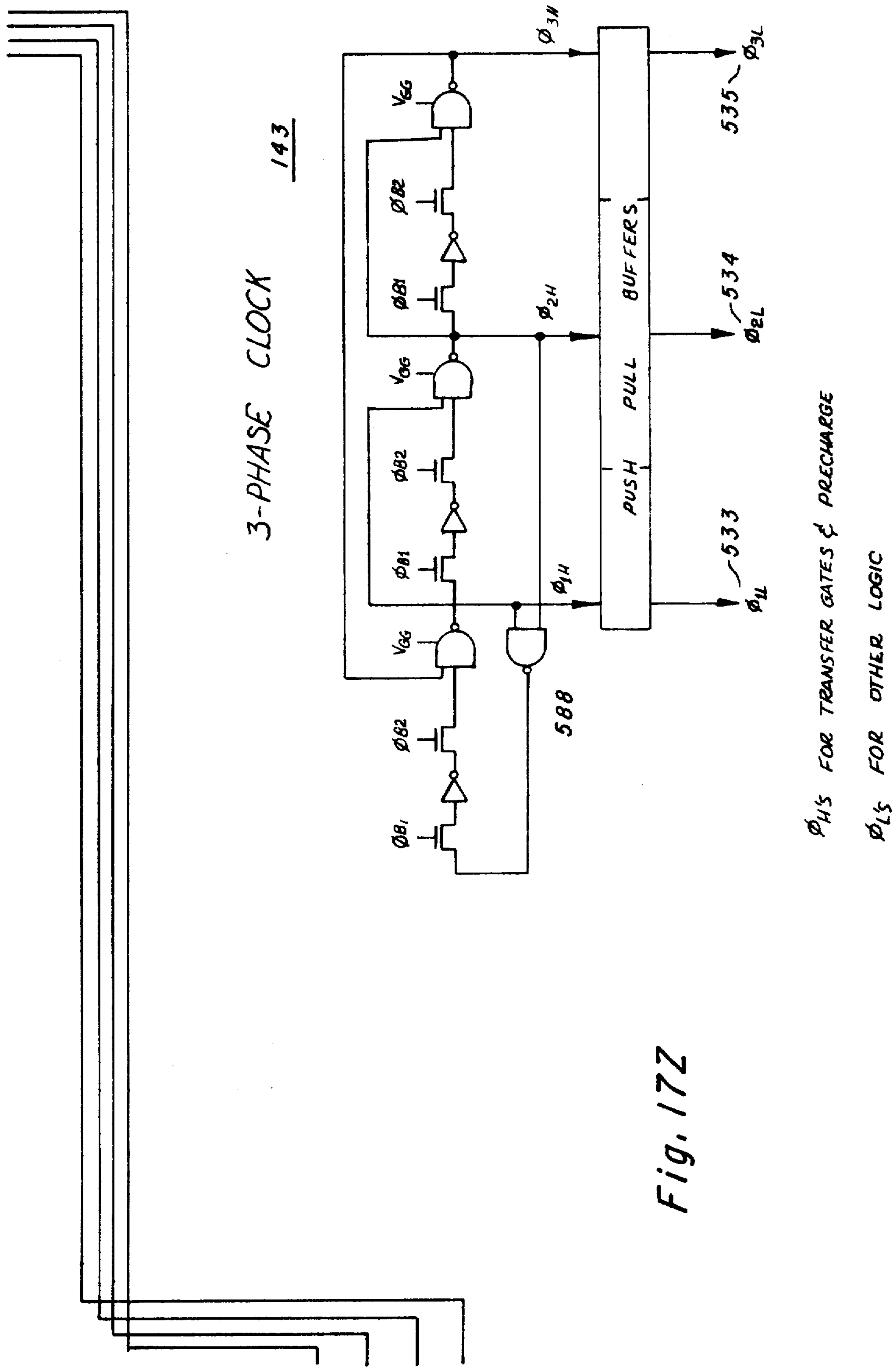
Figure 20:
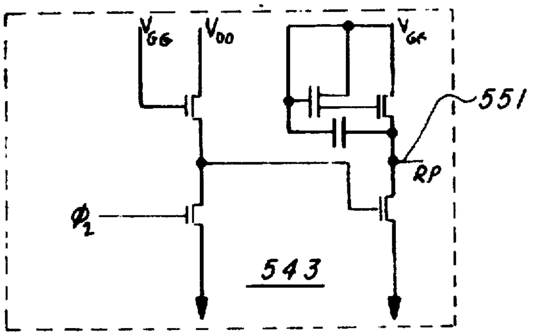
Figure 19:
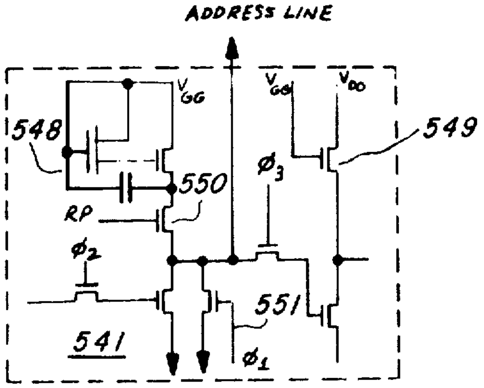
Figure 22A:
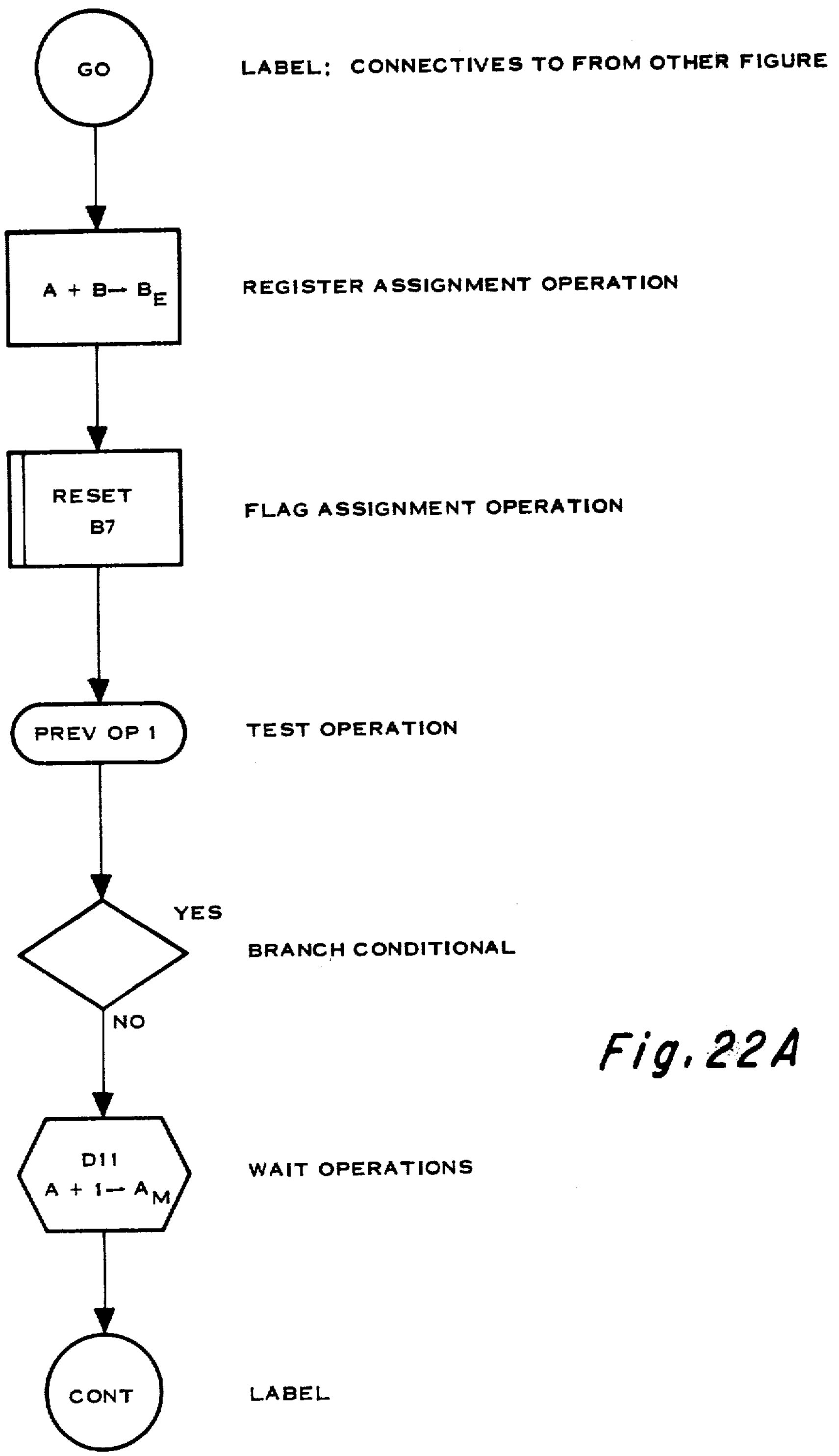
Figure 22B:
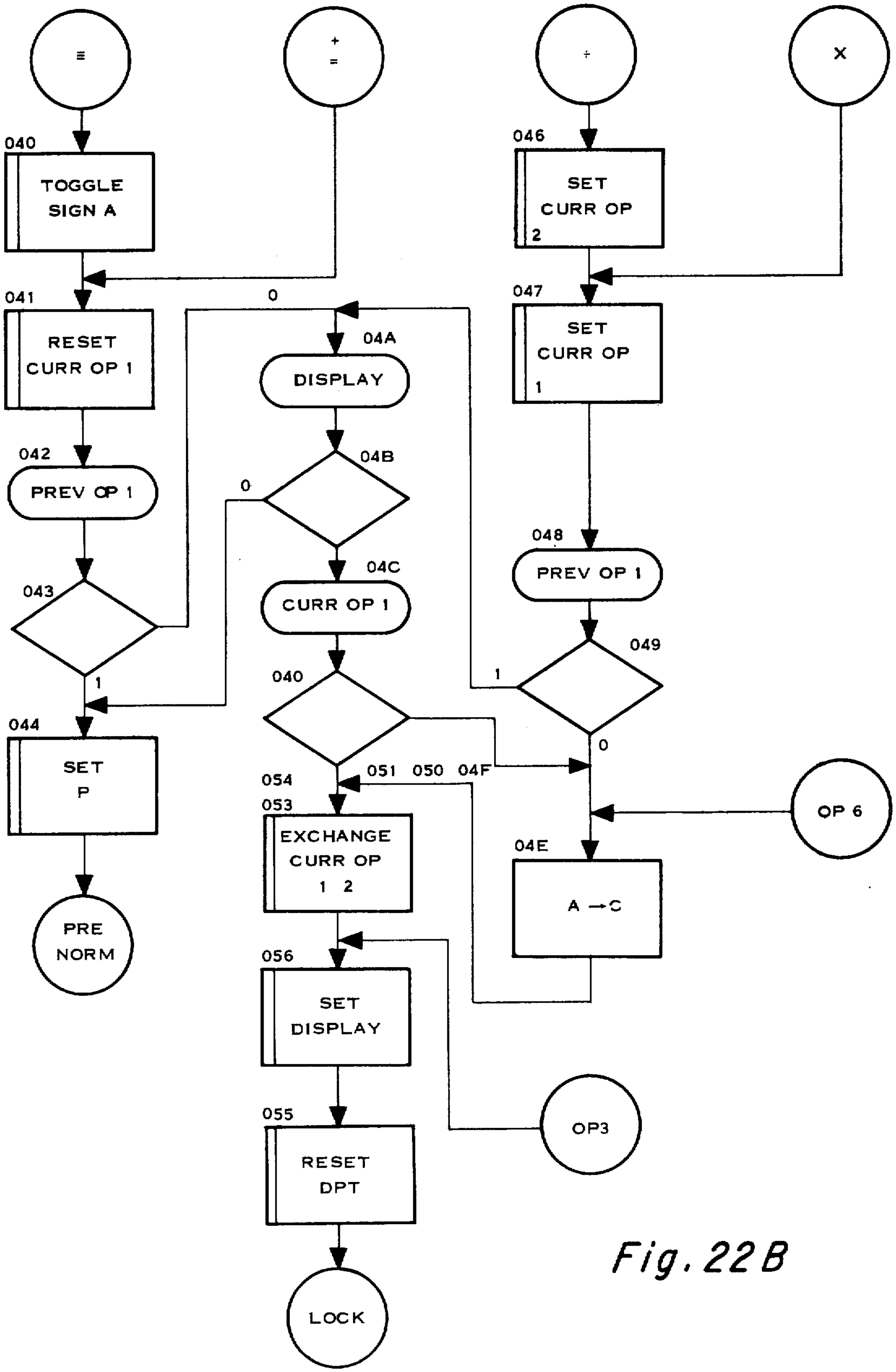
Figure 22C:
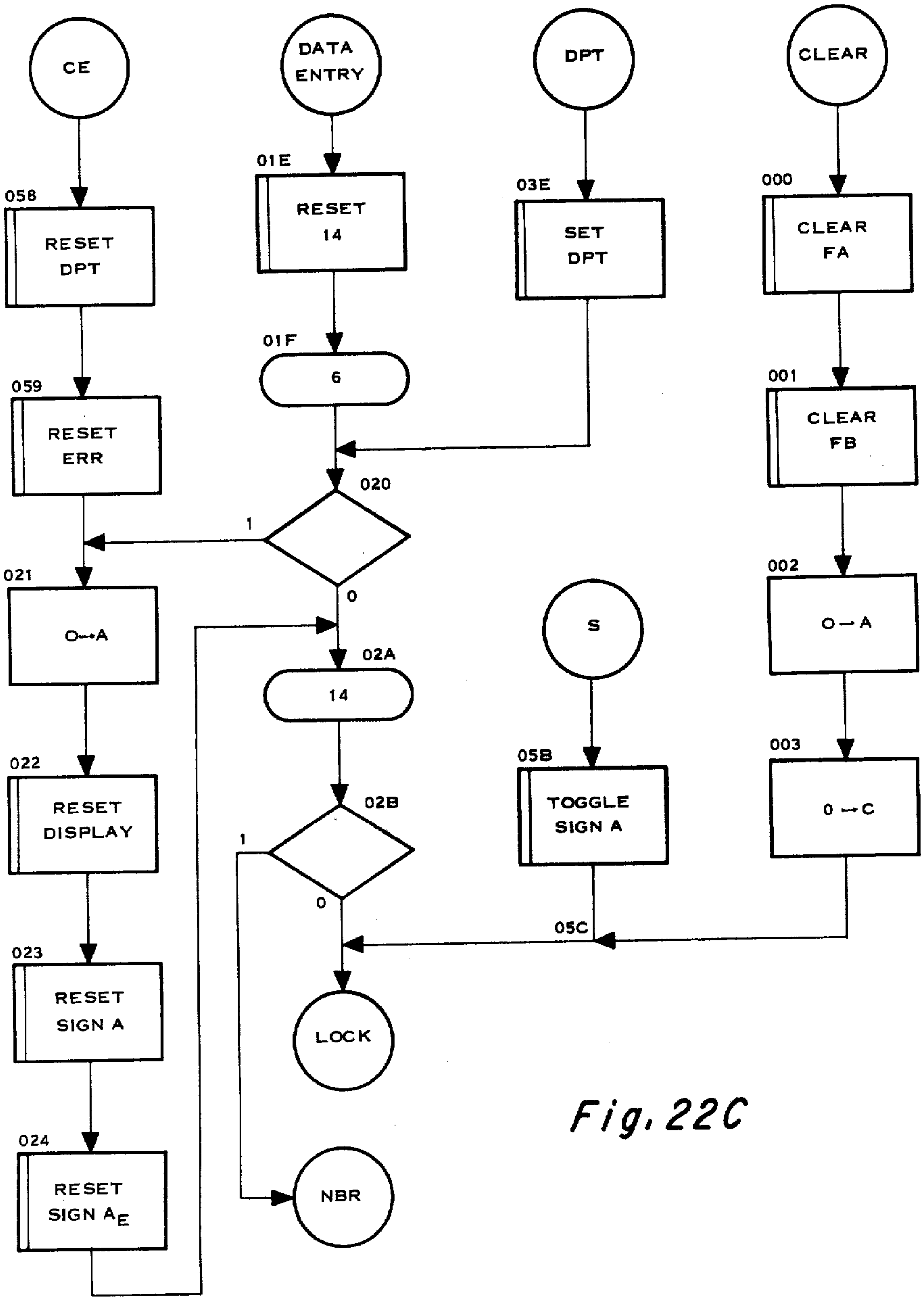
Figure 22D:
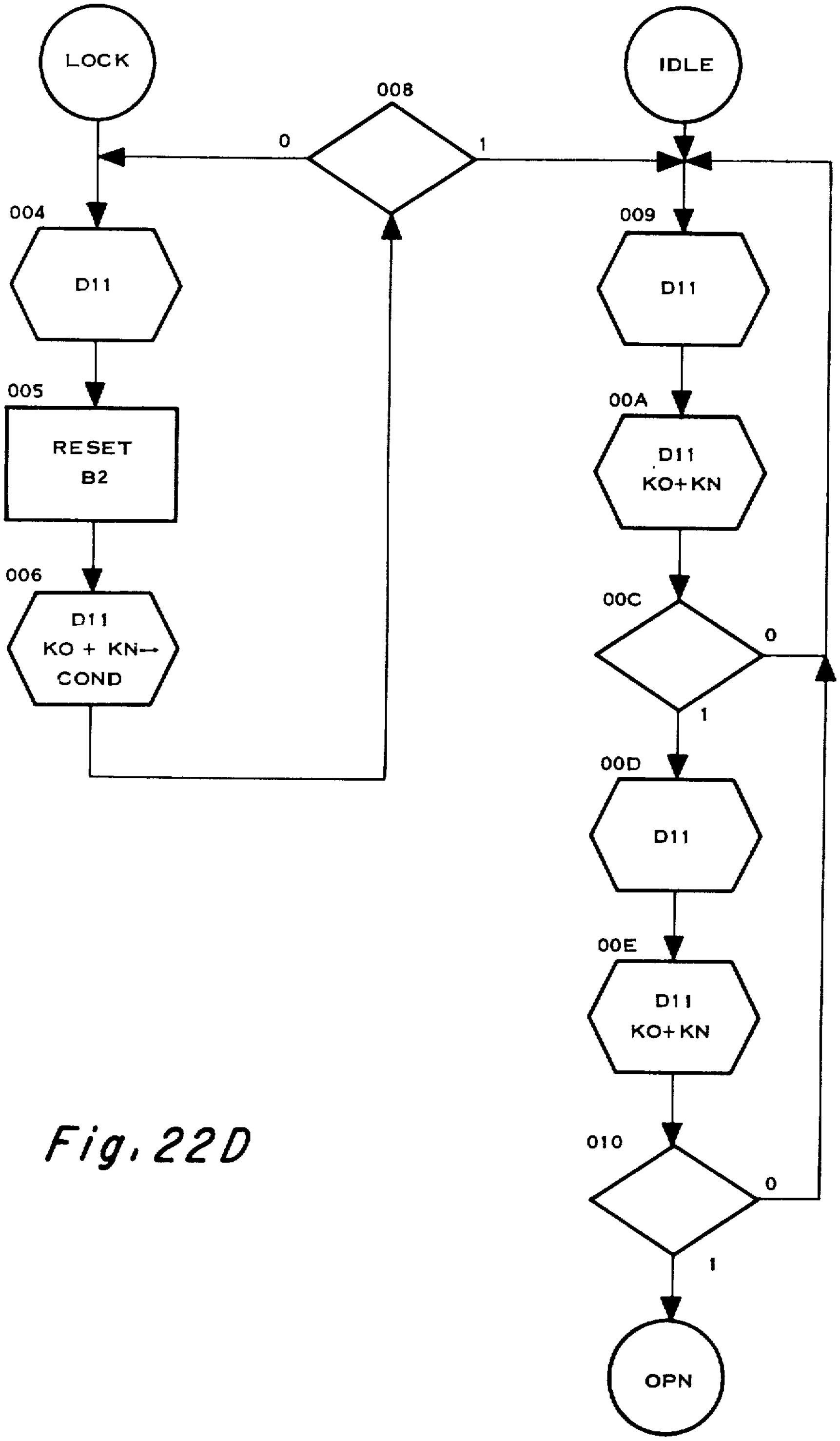
Figure 22E:
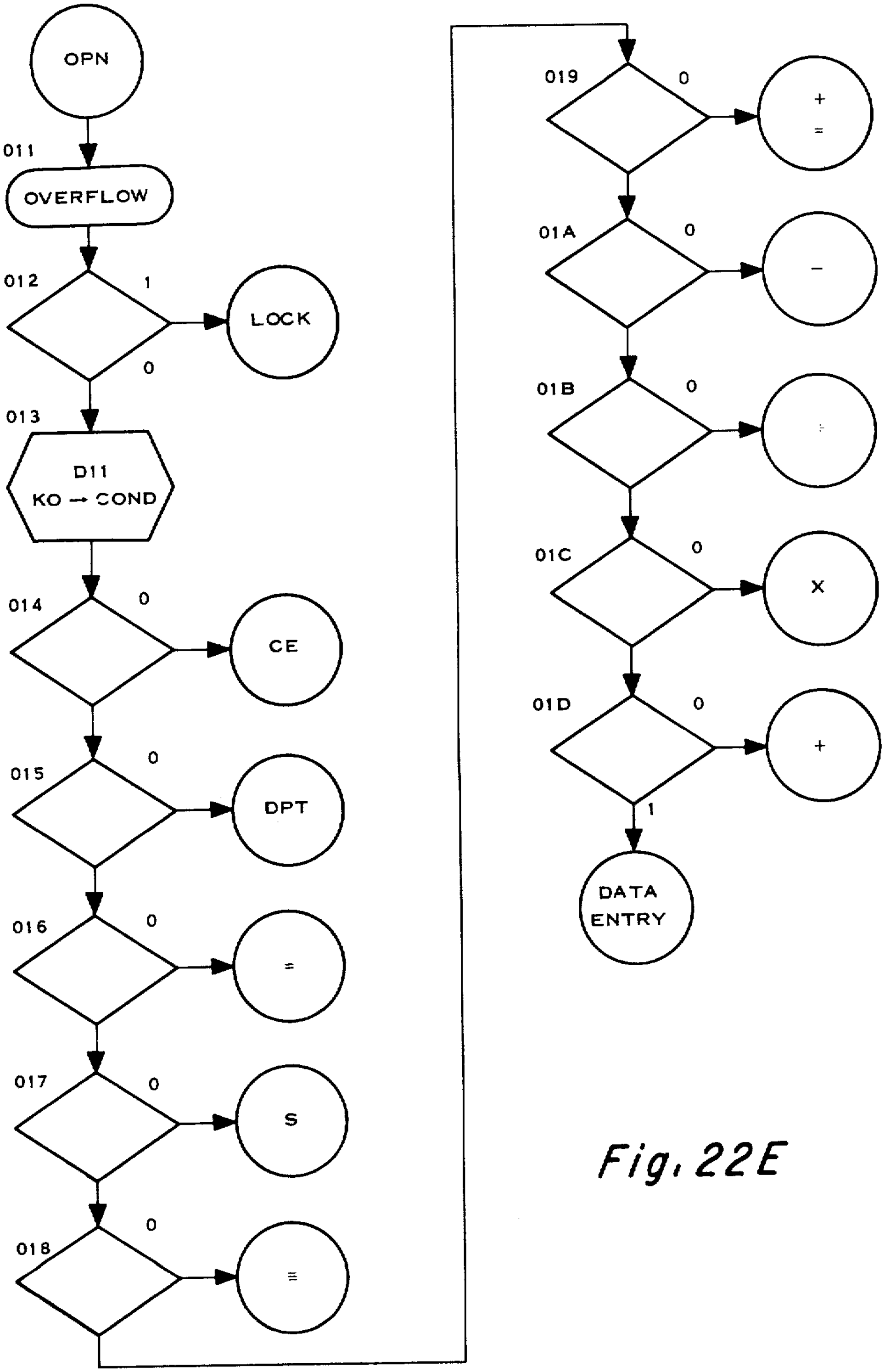
Figure 22F:
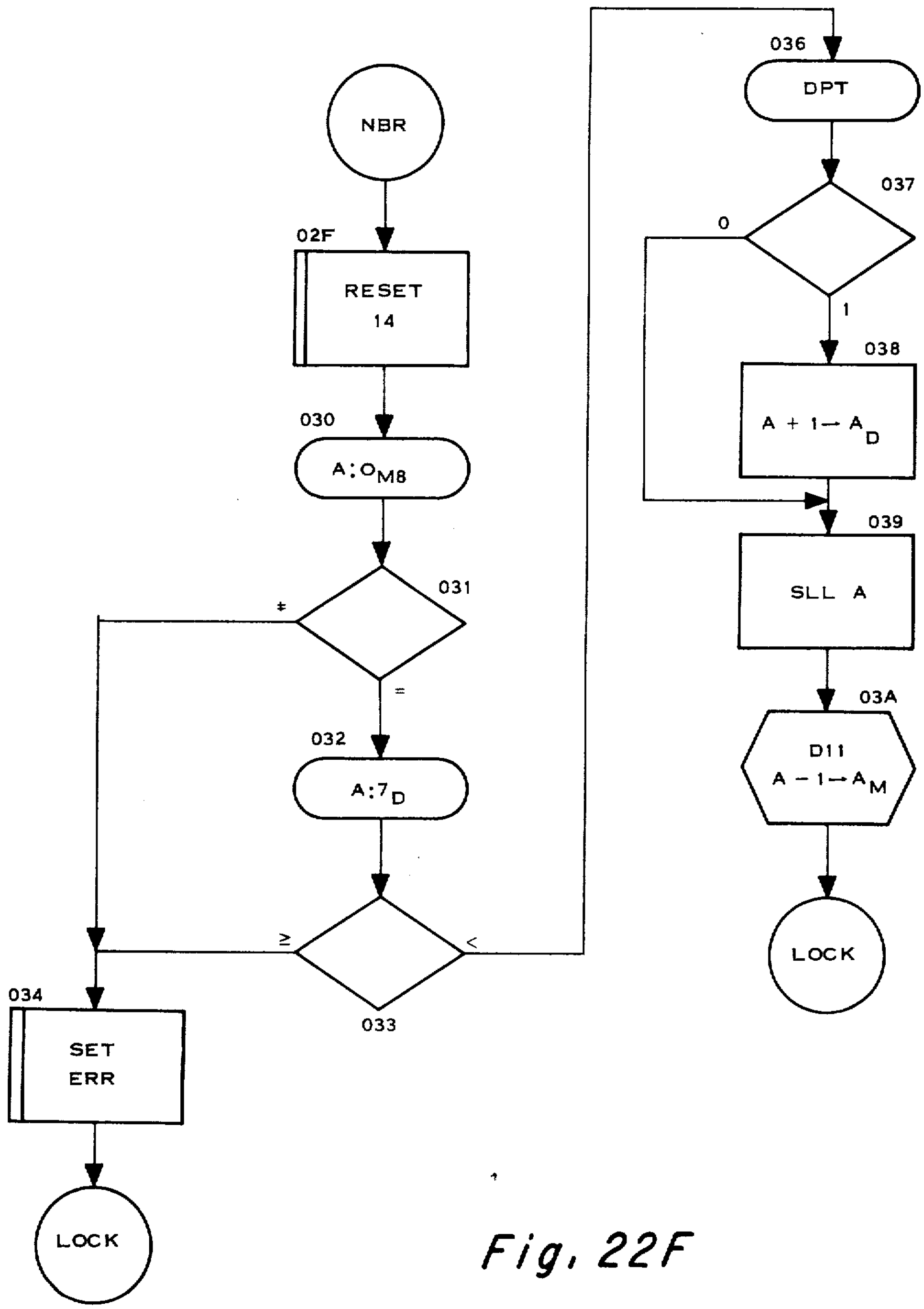
Figure 22G:
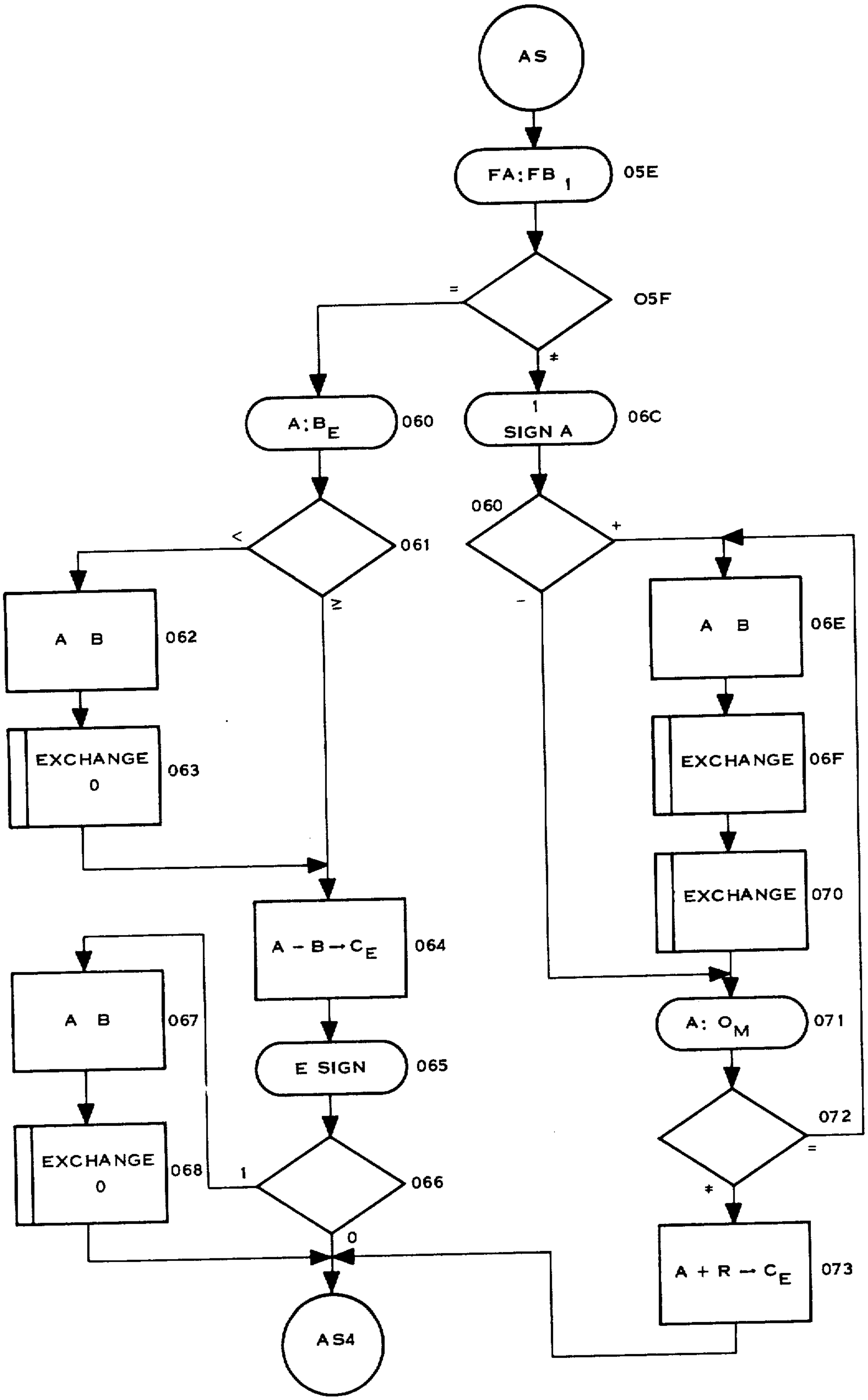
Figure 22H:
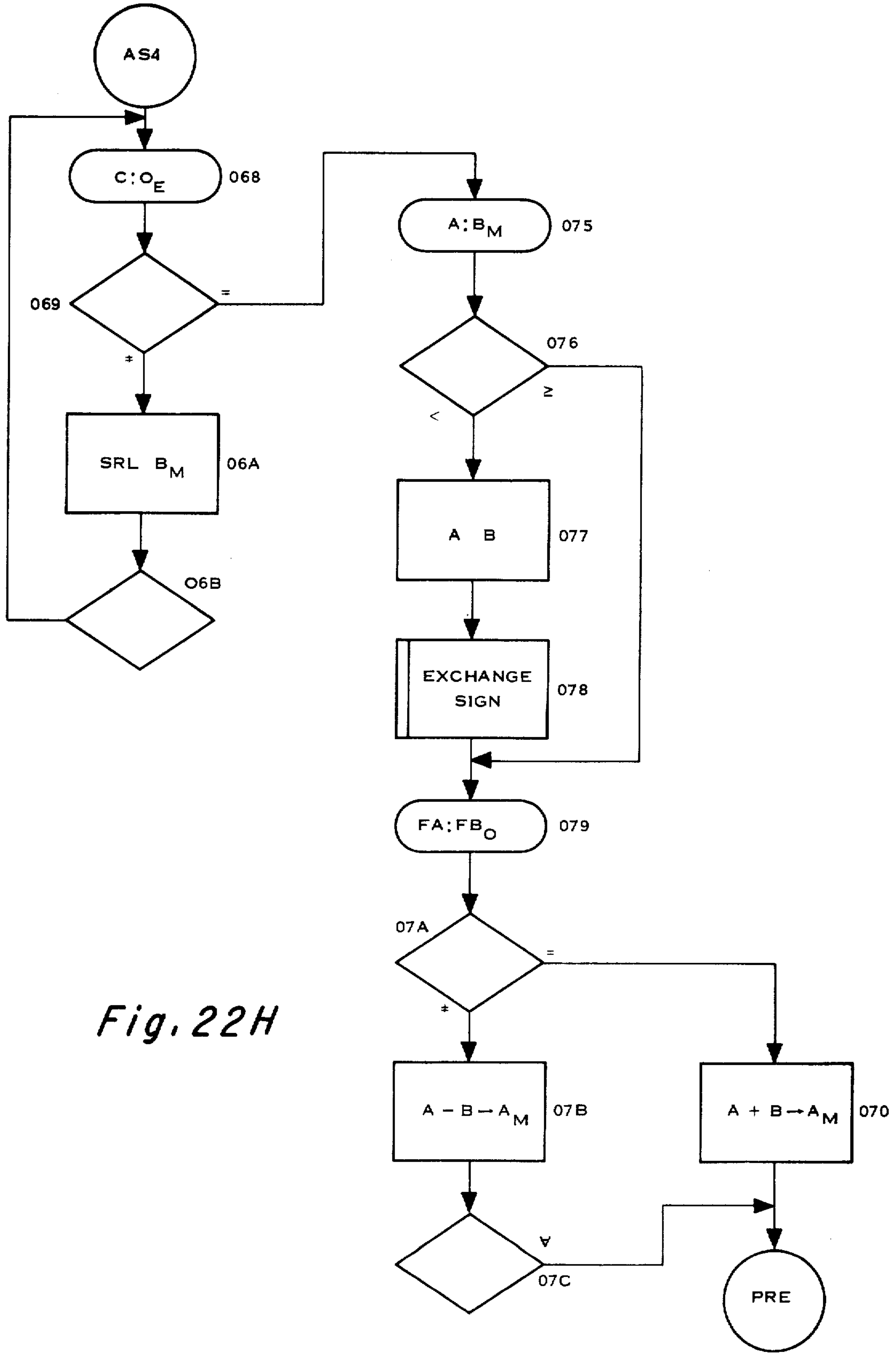
Figure 22I:
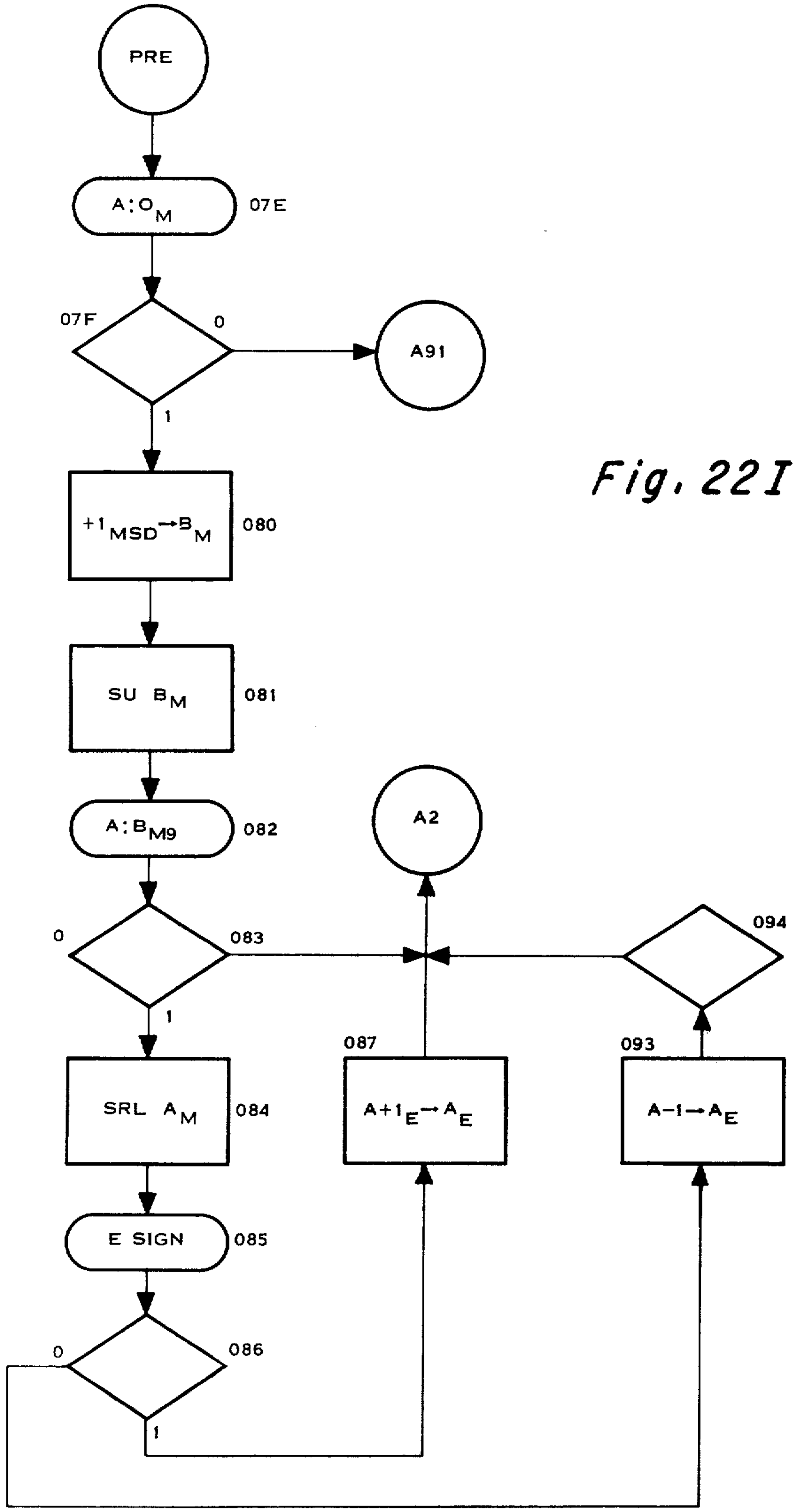
Figure 22J:
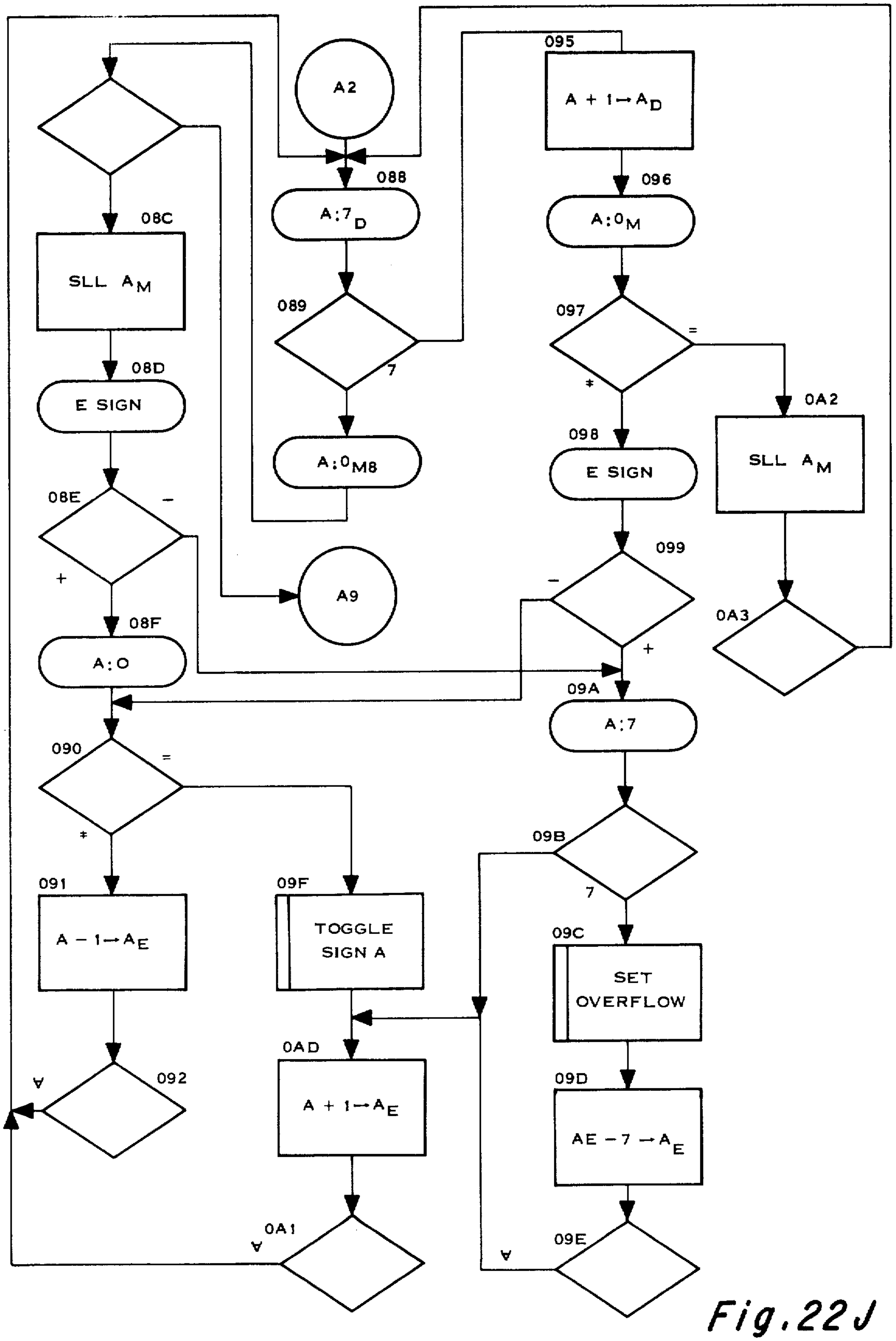
Figure 22K:
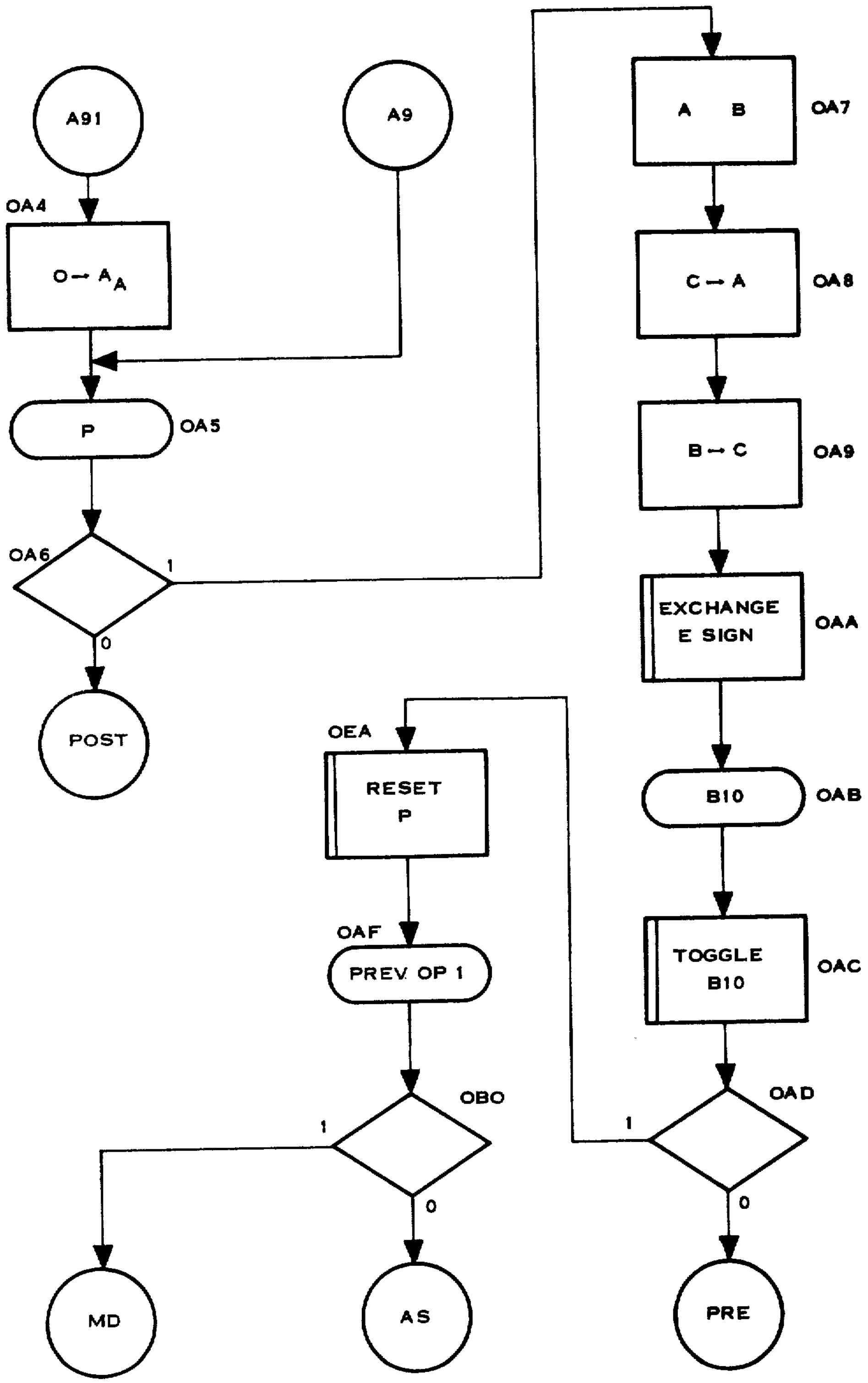
Figure 22L:
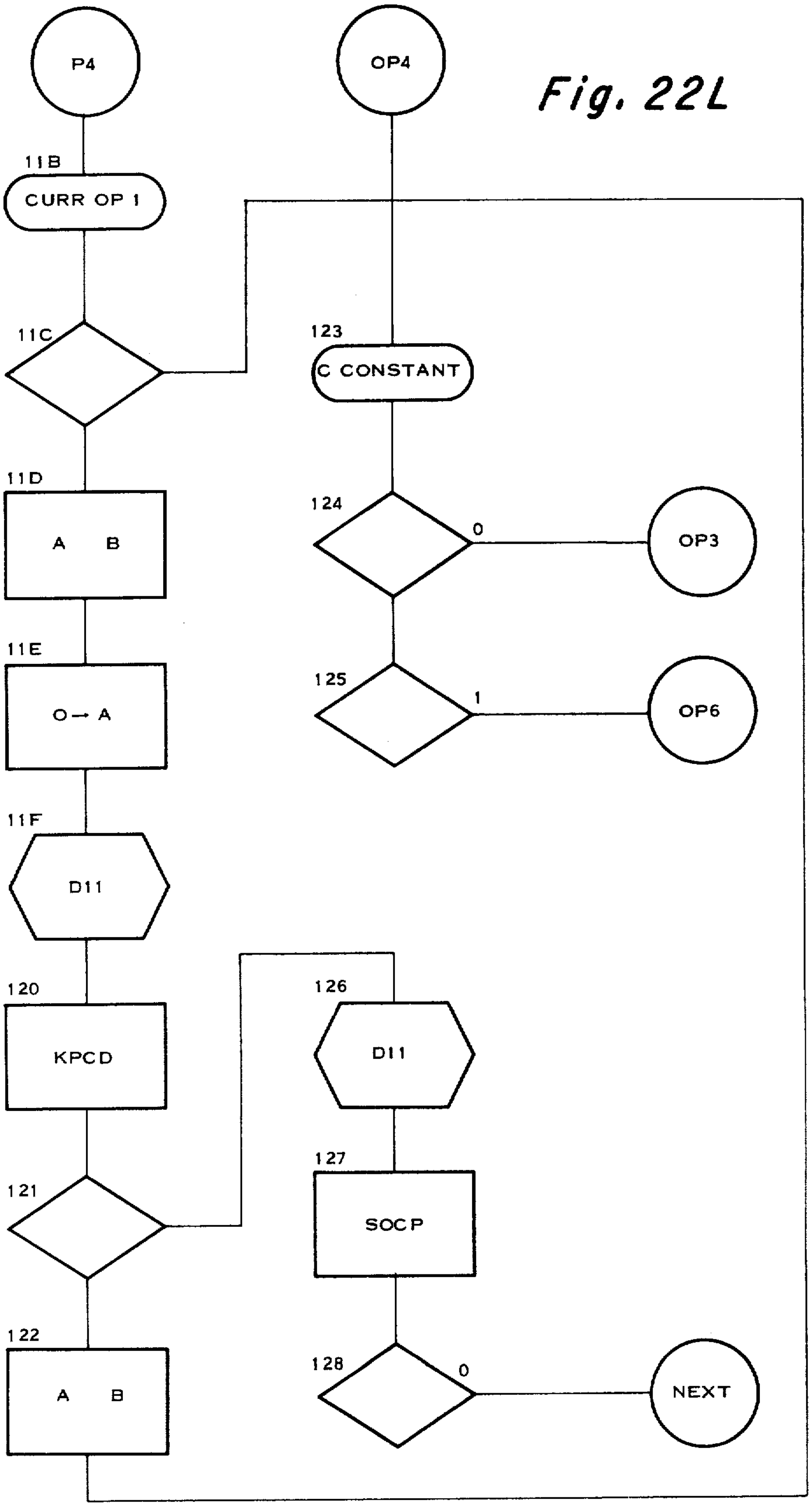
Figure 22M:
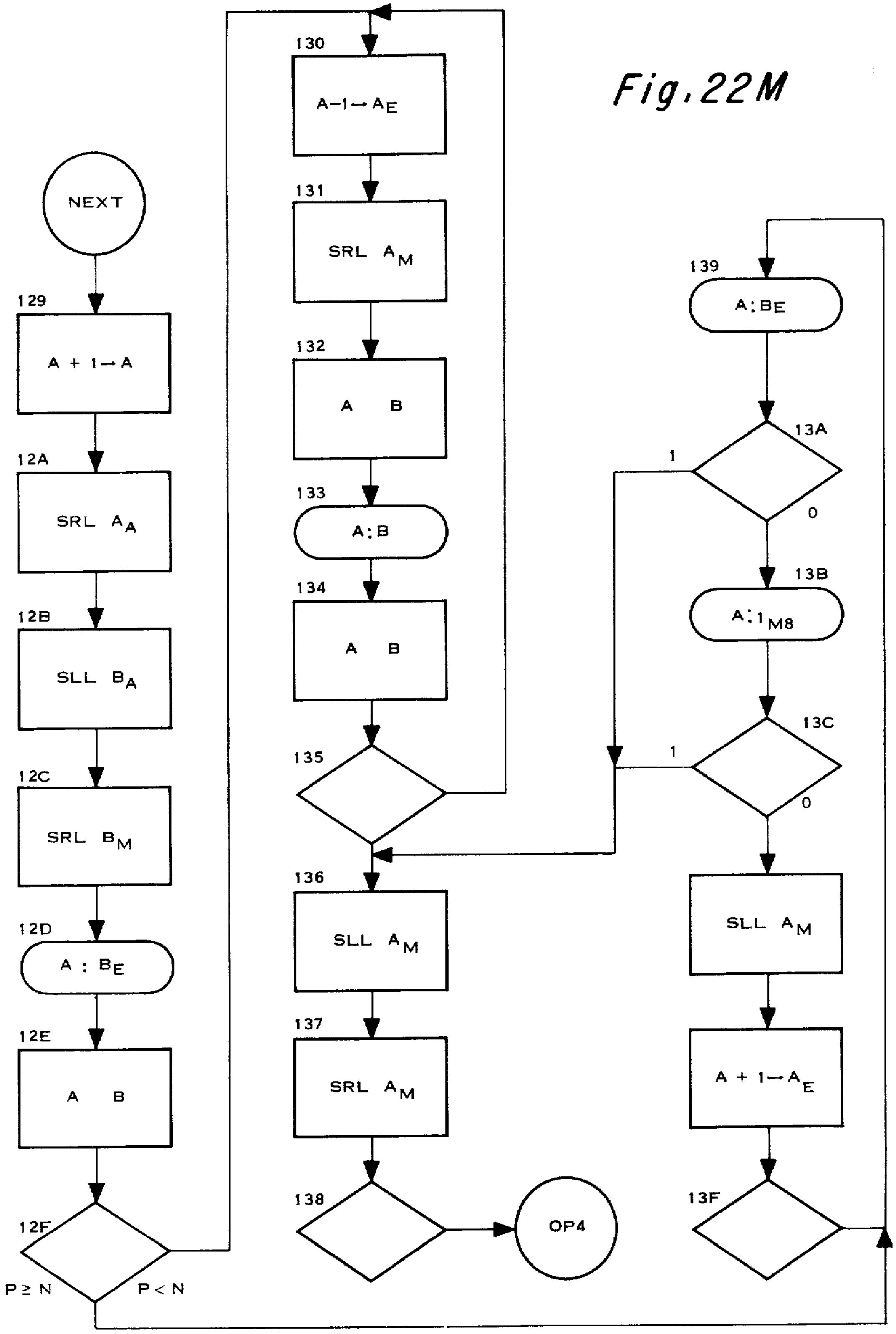
Figure 22N:
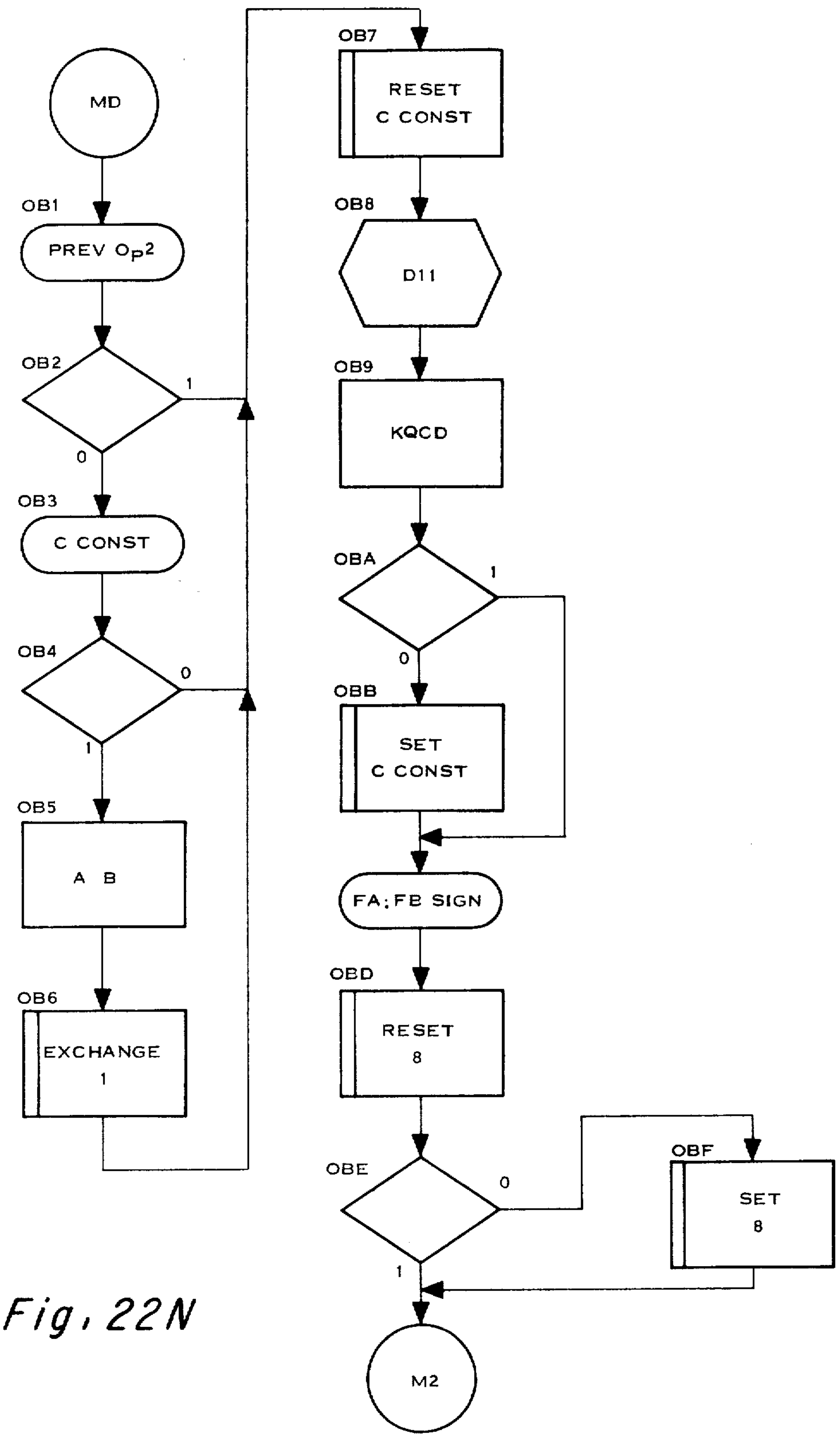
Figure 22P:
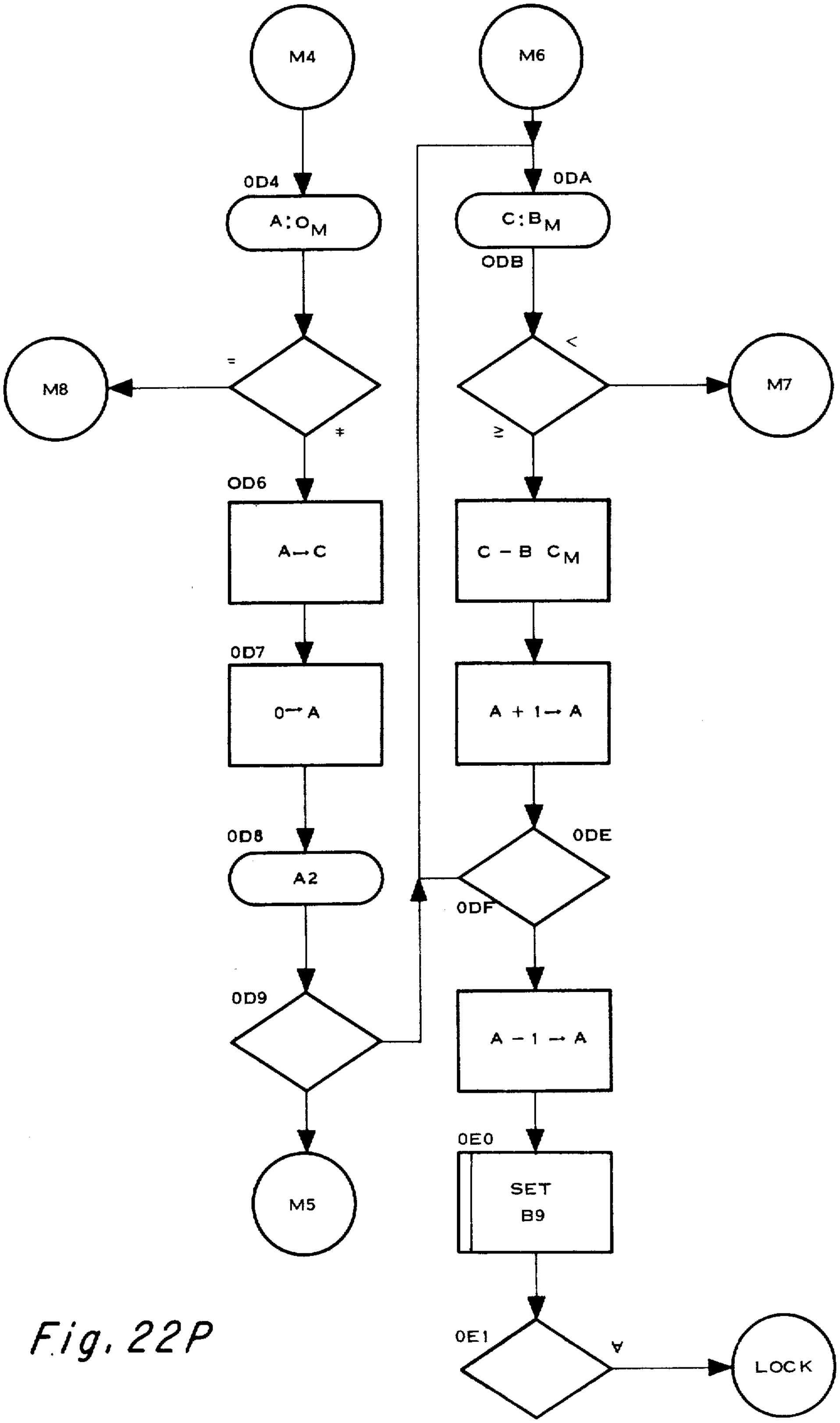
Figure 22Q:
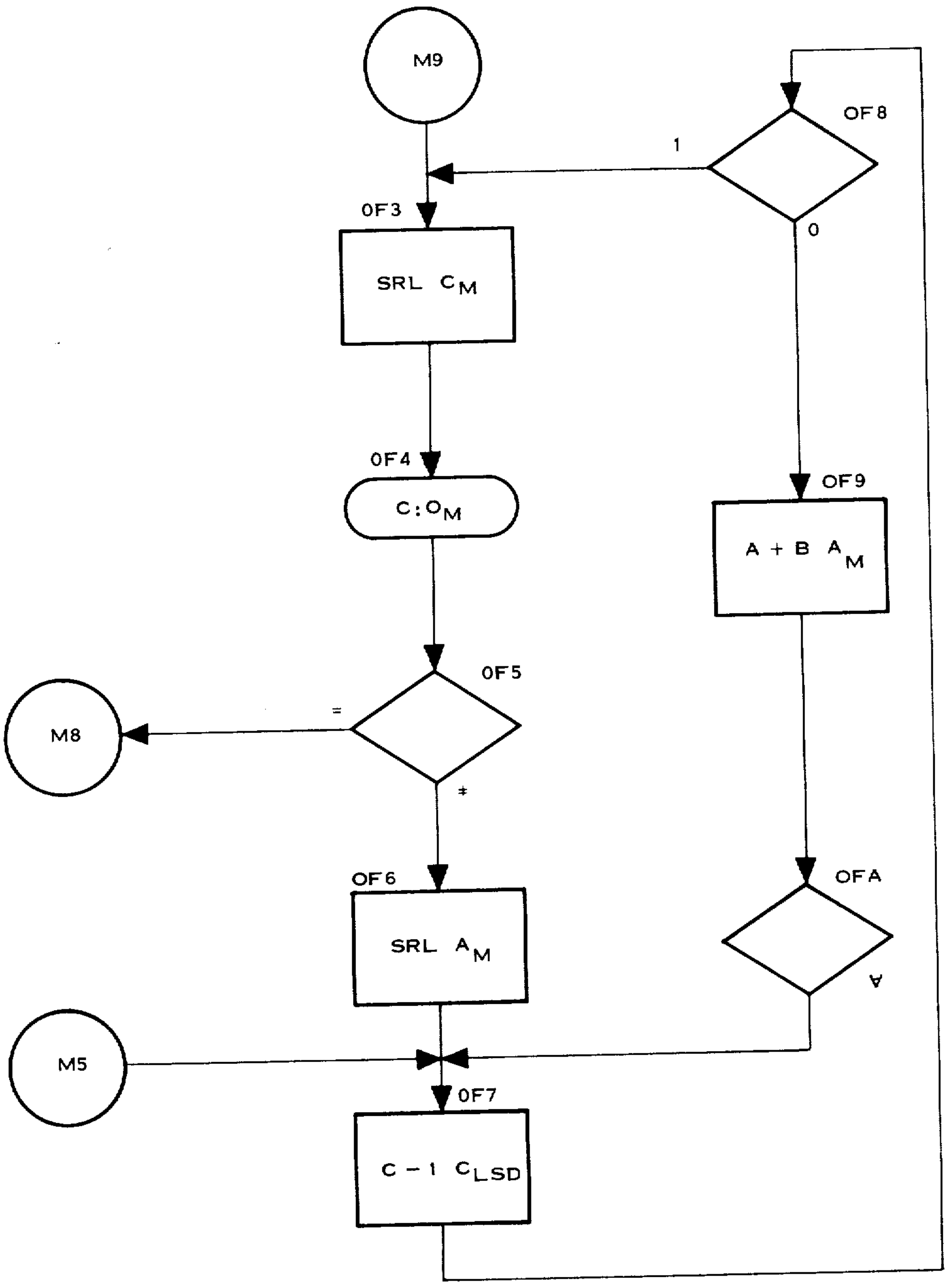
Figure 22R:
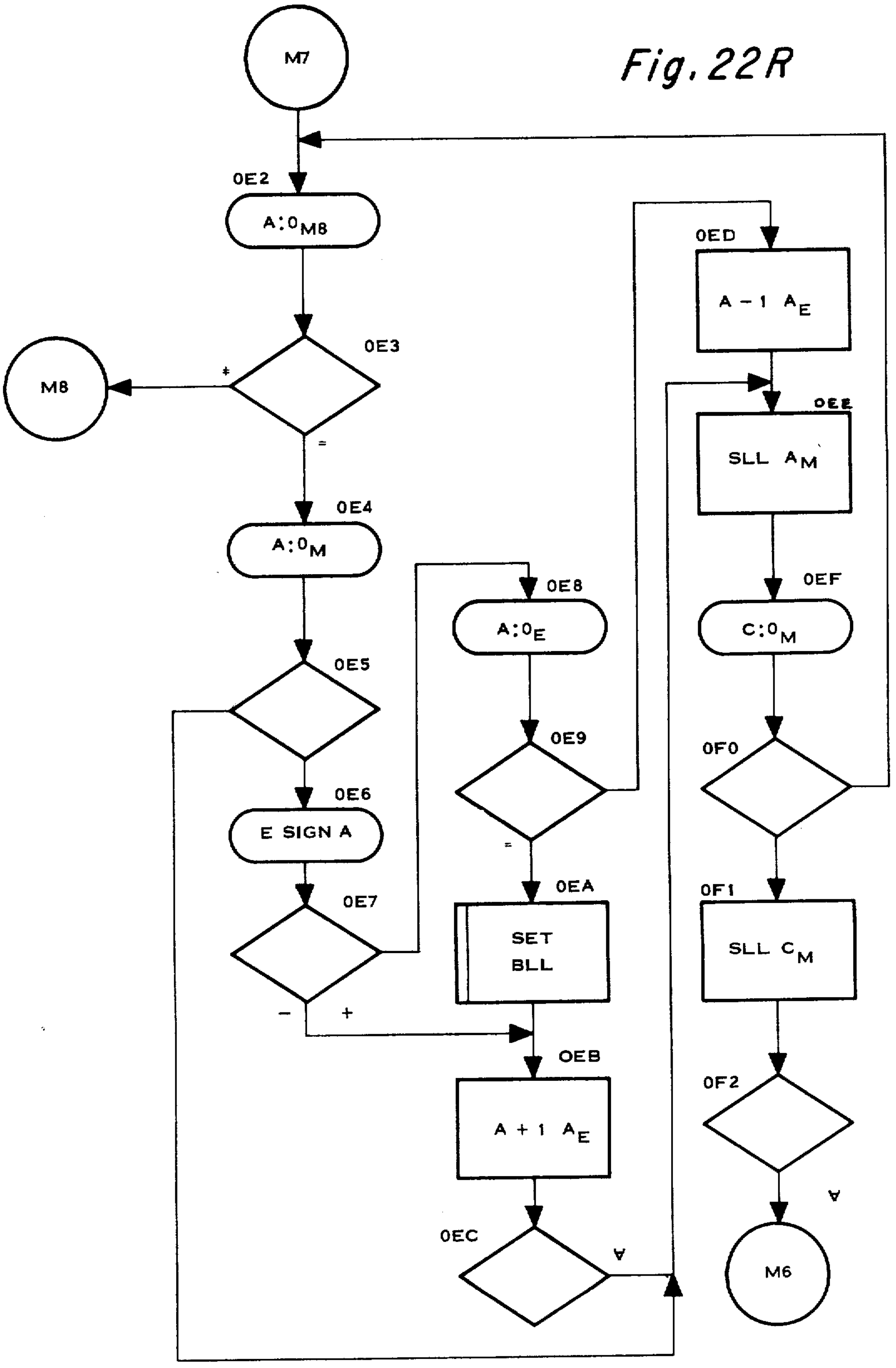
Figure 22S:
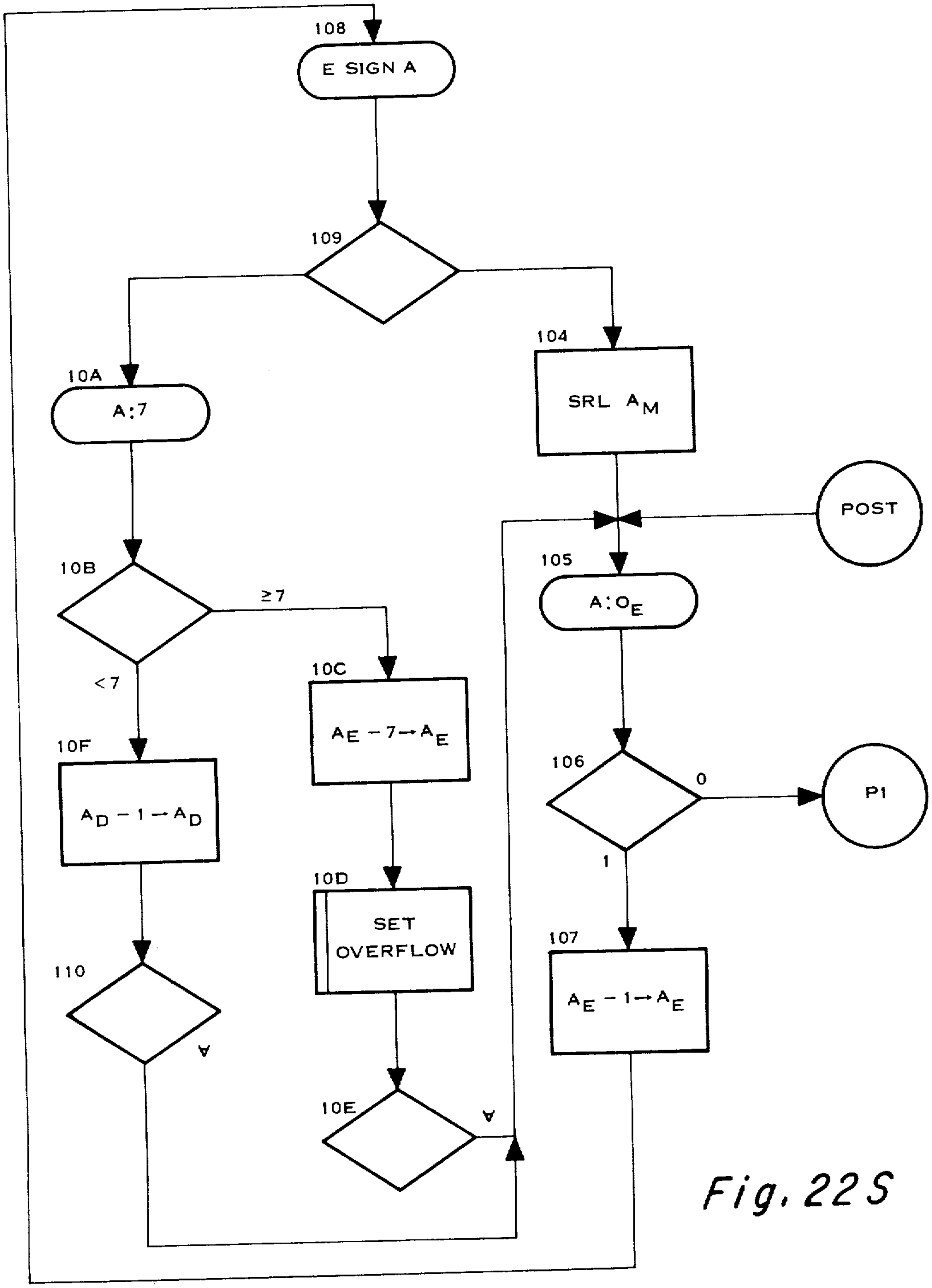
Figure 22T:
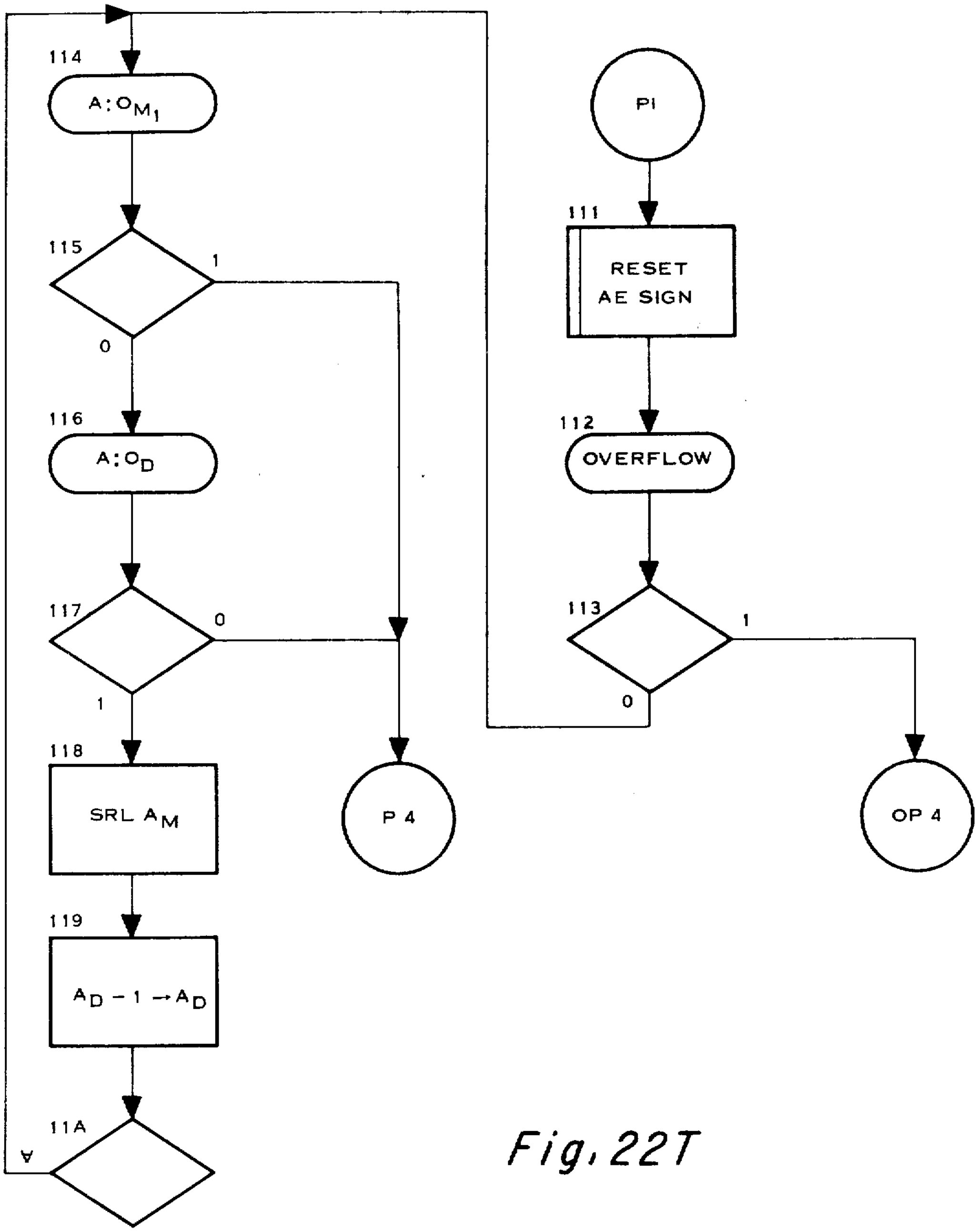
Figure 23:
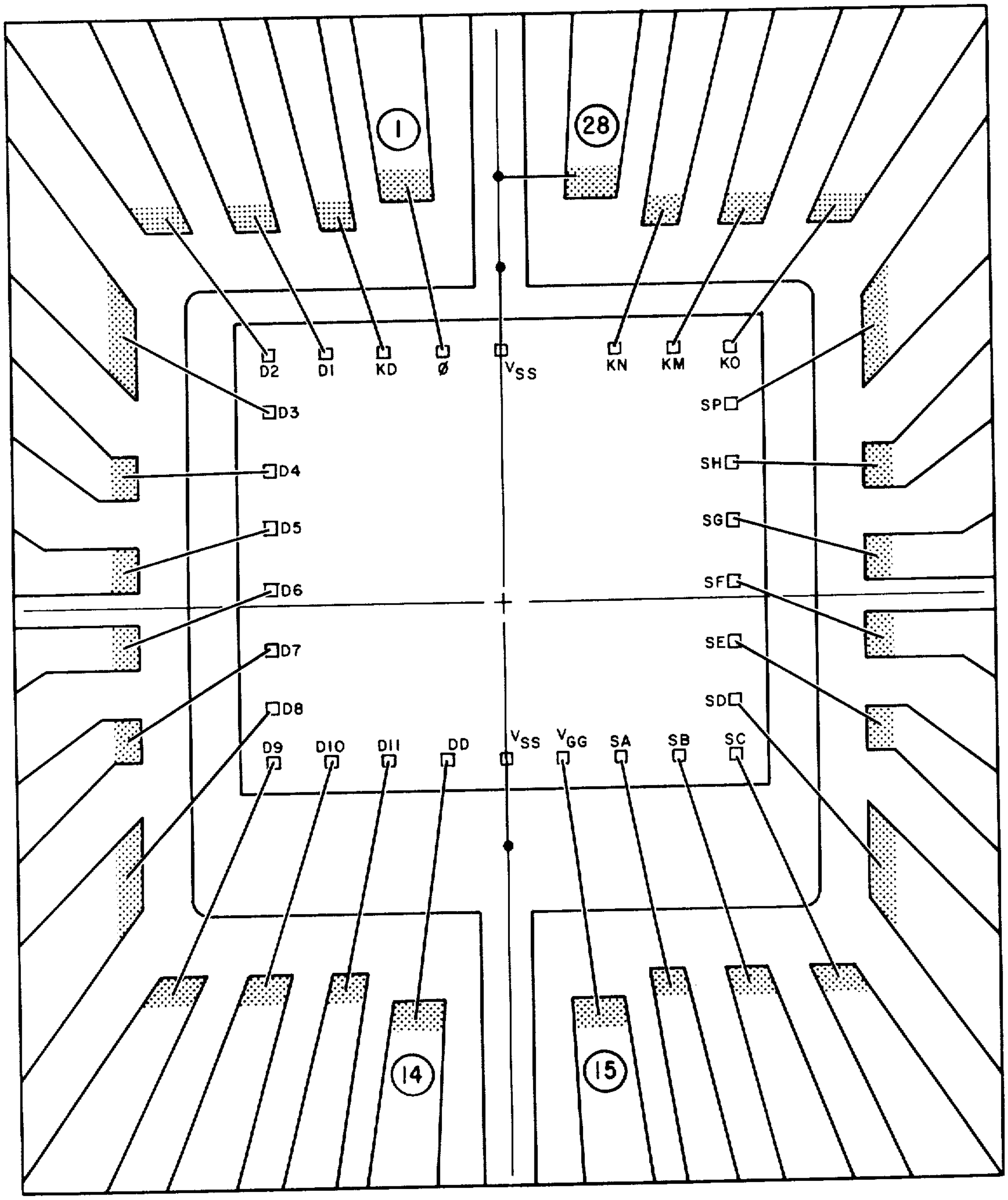

FIGS. 17A–Z comprise a logic and circuit diagram of a metal-insulator-semiconductor embodiment of the calculator system of the invention;

FIGS. 18A–D are diagrams showing the metal-insulator-semiconductor circuit equivalents of various logic gates shown in FIG. 17;

FIG. 19 is a circuit diagram illustrating the metal-insulator-semiconductor equivalent circuits of shift register cells 541 utilized in the commutator of the random access memory array shift register system utilized in the embodiment of FIG. 17;

FIG. 20 is a circuit diagram illustrating the metal-insulator-semiconductor driver circuit for the shift register cells of FIG. 19;

FIG. 21 is a diagram illustrating the circuit equivalents of the programmable logic arrays (PLA) utilized in the embodiment of FIG. 17;

FIGS. 22A–T are flow charts showing the programs stored in the programmable read only memory of an embodiment of the calculator system to provide desk top calculator functions including floating decimal point operation, input routines and output routines; and FIG. 23 is a planar view of the packaged monolithic structure showing terminal interconnects to the keyboard, display drivers and power supply.

According to the present invention a variable function programmed calculator which includes a fixed program stored in a read only memory is capable of being fabricated as a monolithic integrated semiconductor system. In particular, the described embodiment is capable of being fabricated as a monolithic integrated metal-insulator-semiconductor system utilizing contemporary metal-insulator-semiconductor technology. The calculator system may be programmed to perform desk top calculator functions including floating decimal point operation or may be programmed to perform other useful operations. A monolithic structure of the calculator system includes a fixed program which is programmed in the programmable read only memory by modifying one of five or seven masks (the gate-insulator mask) during the fabrication process. In addition, the input, output and operating format of data within the calculator system is programmable in programmable logic arrays by altering the same masks. In the following sections the calculator system is first described in terms of the functional relationship between its various subsystems, then in terms of specific circuits and finally in terms of the fixed programs stored in the read only memory.

FUNCTIONAL DESCRIPTION OF THE CALCULATOR SYSTEM

Figure 1:
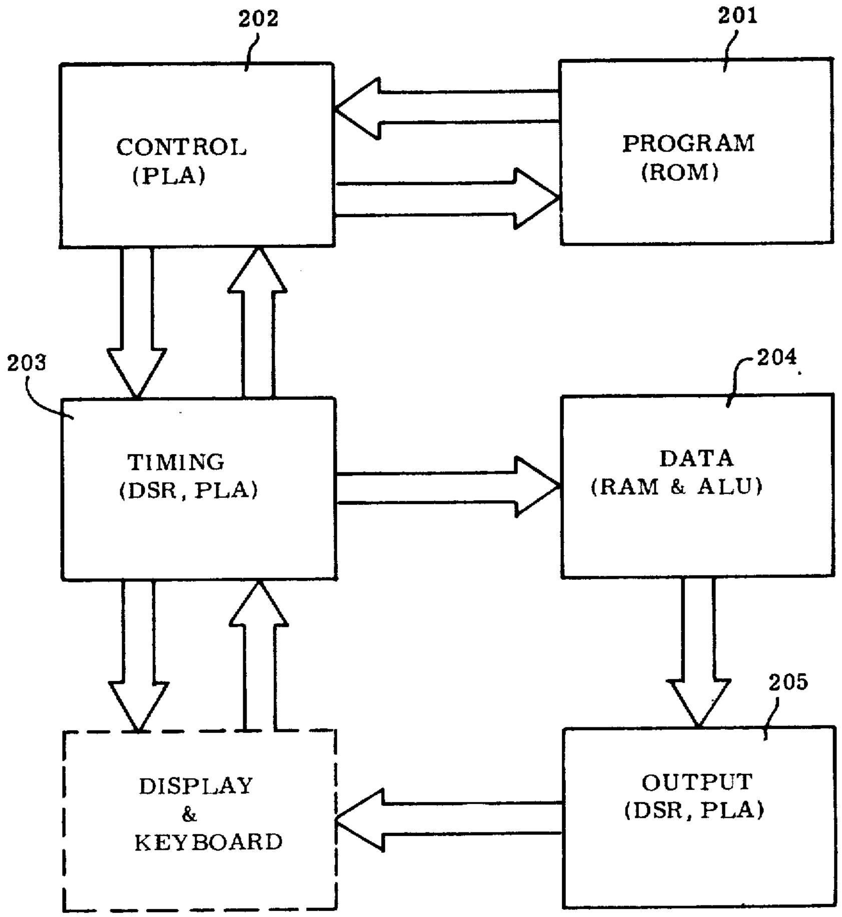
FIGS. 1 and 2 are block diagrams illustrating the calculator system of the present invention.
Figure 2:
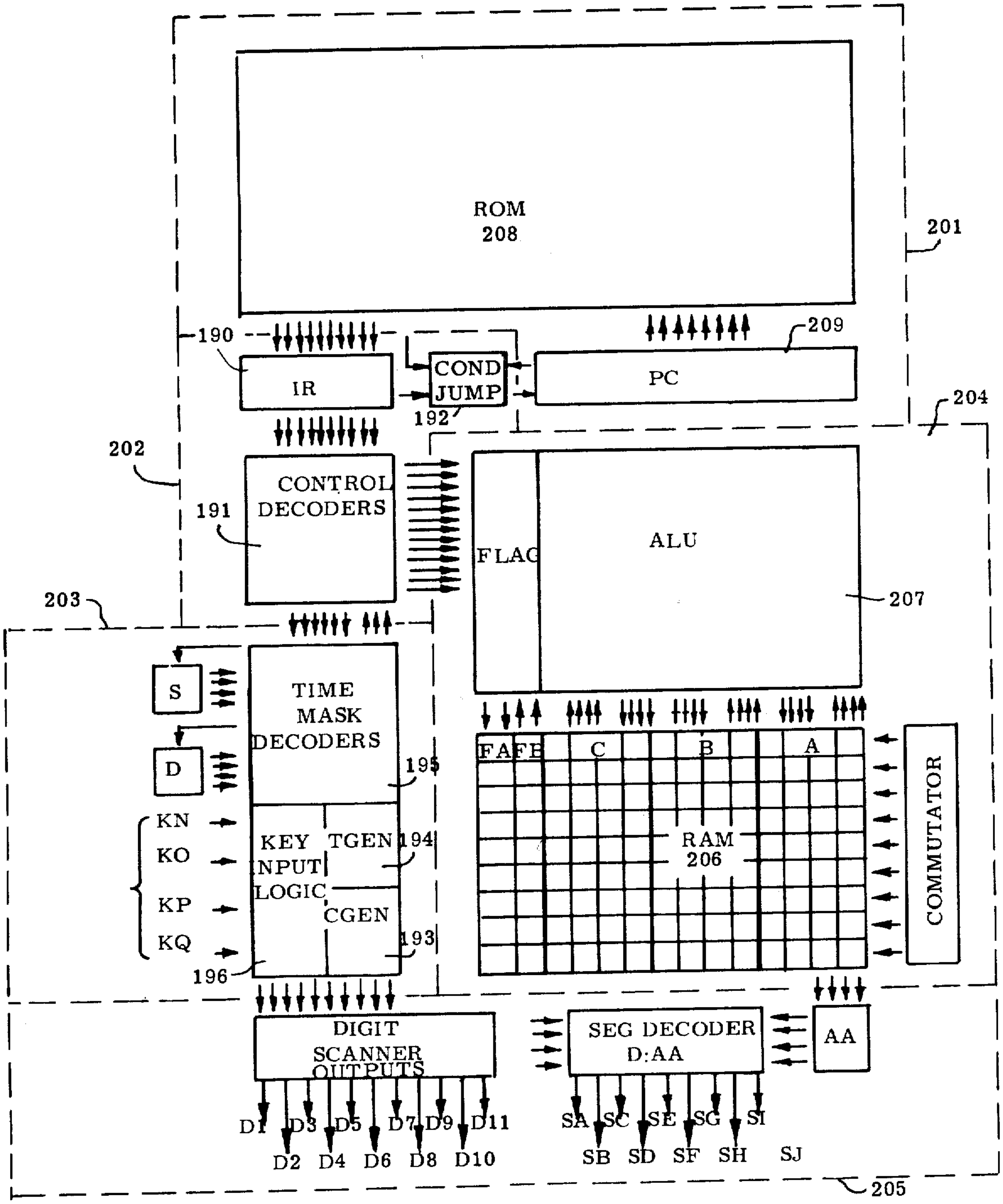

Referring to FIGS. 1 and 2, the calculator system of the present invention is illustrated in terms of the functional dependence among five internal functional subsystems of the calculator system and the relation between the internal functional subsystems and external functional elements. Program block 201 comprises a read only memory (ROM) 208 for storing fixed programs to operate the calculator in a desired manner and program counter (PC) 209. Control block 202 comprises instruction register (IR) 190 for storing a control instruction, control decoders 191 for decoding control instructions and jump condition circuit 192. Timing block 203 comprises a clock generator 143, a timing generator 194, digit and FLAG mask decoders 195, and key input logic 196. Data block 204 comprises random access memory shift register system and FLAG data storage array 206, decimal arithmetic unit 207 and FLAG logic unit 229 (see FIG. 17N). Output block 205 comprises segment output decoder 198 and digit scanner outputs 197.

DATA BLOCK 204

Referring to FIG. 3, a functional description of data block 204 is described in detail. Data block 204 includes means for providing decimal or hexadecimal data storage and means for providing basic operations. The storage structure of the present embodiment is parallel for decimal or hexadecimal digits; therefore, each interconnect 210 coupling the various functional elements symbolize four physical interconnections. A register 211, B register 212 and C register 213 of memory array shift register system 206 comprise the primary decimal or hexadecimal storage means for the calculator logic unit. 1-bit dynamic shift register delay circuits 214 are utilized to provide recirculating refresh of primary registers 211, 212 and 213. The outputs of A register 211 and C register 213 are input to the U selector 215. The output of B register 212 and a constant N provided by means 223 are input to V selector 216. A binary or binary coded decimal (BCD) adder 217 calculates the sum or difference between U and V, i.e., U+V or U−V. U is the plus side of the adder; V is the minus side of the adder. A Σ data selector 218 provides means for short and long path shifting operations. An output from adder 217 to an input of Σ data selector 218 corresponds to the normal path in which no shift is provided. The delayed adder input 225 to Σ data selector 218 corresponds to the long path in which a left shift is provided. The UV logical OR-gate 224 input to Σ data selector 218 corresponds to a short path which provides for a right shift. Data selector 219 selects the input to A register 211 as either the Σ output of Σ data selector 218 or the delayed B register 212 output or the delayed A register output. Data selector 220 selects the input to the B register as either the Σ output of Σ data selector 218 or the delayed A register 211 output or the delayed B register 212 output. Data selector 221 selects the input to the C register as either the Σ output of Σ data selector 218 or the delayed C register 213 output. Jump condition latch circuit 192 is loaded with the carry-borrow output of adder 217.

A register 211, B register 212 and C register 213 each provide dynamic recirculating storage for thirteen decimal or hexadecimal digits in the present embodiment. Adder 217, U data selector 215, V data selector 216, Σ data selector 218, A data selector 219, B data selector 220 and C data selector 221 provide means for arithmetic and logical modification of the contents of registers 211, 212 and 213 by synchronous operation of selector and adder controls which is henceforth described in detail in the section describing control block 202.

Referring to FIG. 4, the contents of data block 204 is illustrated with respect to 1-bit status or FLAG element storage and operation. The coupling of the functional elements is indicated by interconnects 230. Two 12-bit registers FA register 226 and FB register 227 provide means for storage of status or FLAG information. The outputs of FA register 226 and FB register 227 are delayed by 1-bit by means of dynamic shift register elements 228 before being input to FLAG operation logic unit 229. The A and B outputs of FLAG operation logic unit 229 are coupled to FLAG registers 226 and 227. Operations of FLAG operation logic unit 229 include recirculation, set, reset and toggle of individually addressed FLAGs; and, exchange and compare of FA and FB pairs of FLAGs. Controls SUB, FFLG, RFLG, SFLG, SLAG, and XFLAG are generated to perform the desired operation on a particular addressed FLAG or pair of FLAGs. The operation compare FLAG and the operation test FLAG result in an output from FLAG operation unit 229 to condition circuit 192. The control mechanism for these FLAG operations are henceforth described in detail in the section describing control block 202 below.

CONTROL BLOCK 202

The functions of control block 202 are to accept instruction words from program control block 201, interpret the instruction word and a condition flip-flop as a command word for a subsequent instruction cycle and decode certain controls which operate data selectors and logic units in data block 204, program block 201 and output block 205.

Figure 5:
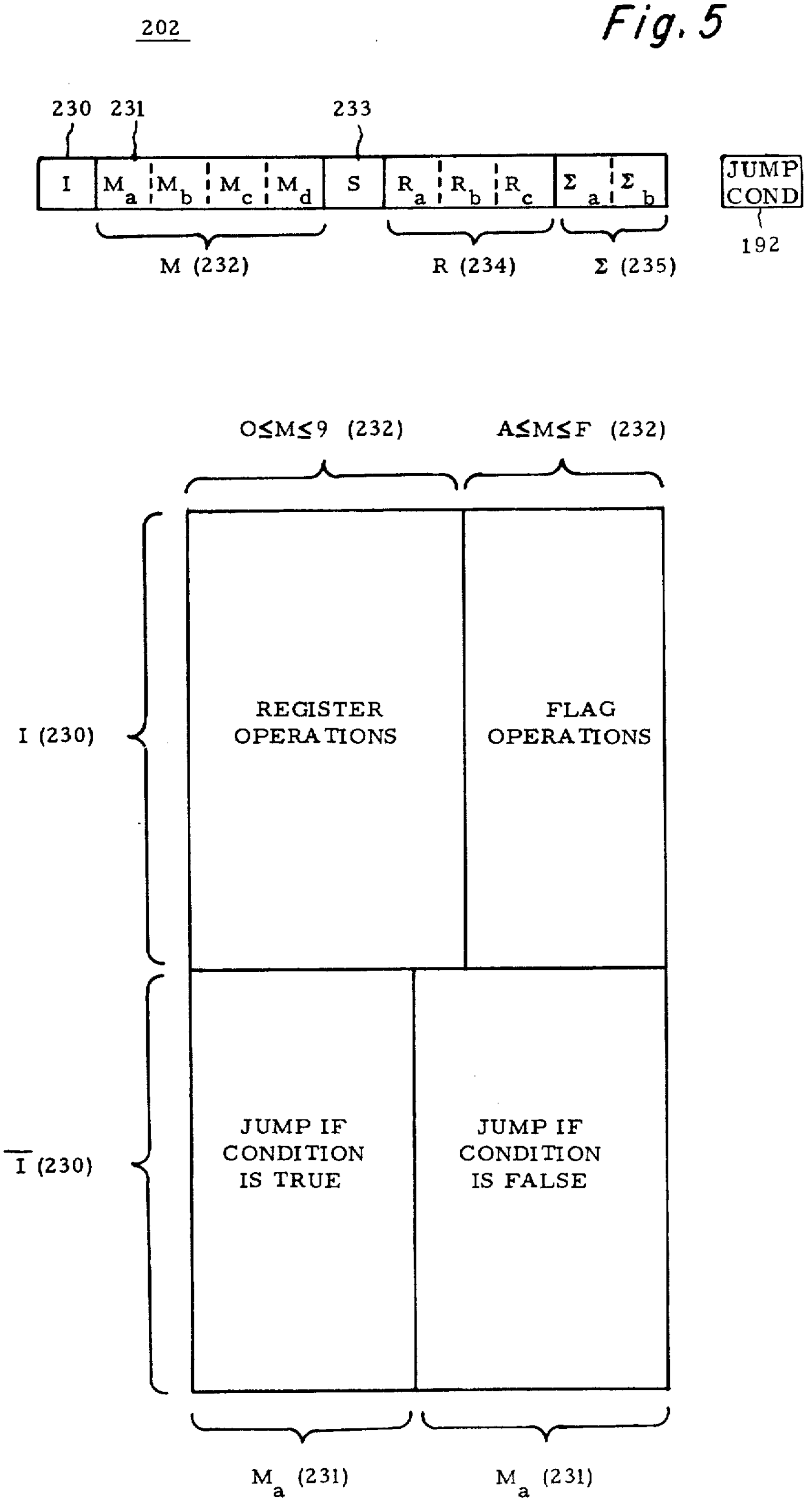
FIG. 5 is a symbolic representation of the basic command word format and instruction map utilized in an embodiment of the calculator system.

The basic command word format and instruction map are illustrated in FIG. 5. Referring to FIG. 5, I-bit 230 distinguishes jump from non-jump instructions. When I-bit 230 is a logical 0, then the instruction is a jump instruction and M-bit 231 distinguishes between true and false conditional jumps while the remaining bits of M field 232, S field 233, R field 234 and Σ field 235 contain the absolute address associated with the jump. When the instruction is a jump instruction (as indicated by a logic 0 being in the I-bit), but the jump condition is not satisfied, then ordinary incrementation of the program counter is effected. When the I-bit is a logical 1, then either a register or a FLAG operation is decoded; the entire M field 232 is used to distinguish register from FLAG operations as detailed in TABLE I below. When the binary code contained in M field 232 is between 0 and 9, a register operation is decoded; when the binary code contained in M field 232 is between 10 and 15, a FLAG operation is decoded.

In the case of register operations, the 10 codes M=0 through M=9 are used to select one of 6 digit masks in combination with one of 3 constant values (N). The assignment of the 6 masks and 3 constants depends upon the desired data word format. The selections shown in TABLE I are utilized in the programming of a floating point decimal calculator function in accordance with the present invention.

In the case of the FLAG operation, the 6 codes M=10 through M=15 are used to distinguish 6 FLAG codes, that is, compare, exchange, set, reset, toggle and test.

S-bit 233 of the command word controls three functional elements in data block 204. S-bit 233 distinguishes add from subtract in binary or BCD adder 217, distinguishes left shift from right shift in the Σ shift logic and distinguishes A from B in the FLAG operation logic.

Add, shift and FLAG operations are exclusive operations and therefore require no further decoding. R field 234 distinguishes among arithmetic, exchange and keyboard input instructions as described in conjunction with TABLE II below. When the binary value contained in R field 234 is between 1 and 5, an arithmetic operation is indicated and U data selector gate 215 and V data selector gate 216 are controlled to enable the variables indicated in TABLE II as inputs to adder 217. When the binary value contained in R field 234 is equal to 6, an exchange of A and B, without digit masking is enabled, bypassing adder 217 and the Σ gate 218. When the binary value contained in R field 234 is 0 or 7, then an arithmetic no-op (no operation) is indicated, providing means for implementation of a special class of instructions for keyboard synchronization and encoding.

TABLE I

| | REGISTER | | FLAG |
|---|---|---|---|
| M | MASK | N | OPERATION |
| 0 | ALL | | |
| 1 | EXPONENT | | |
| 2 | MANTISSA | | |
| 3 | LSD | 1-LSD | |
| 4 | MANTISSA | 1-LSD | |
| 5 | MANTISSA | 1-MSD | |
| 6 | EXPONENT | 1-EXPONENT | |
| 7 | DPT | 1-DPT | |
| 8 | DPT | 8-DPT | |
| 9 | EXPONENT | 8-EXPONENT | |
| A | | | COMPARE |
| B | | | EXCHANGE |
| C | | | SET |
| D | | | RESET |
| E | | | TOGGLE |
| F | | | TEST |

TABLE II

| | ARITHMETIC | | EXCHANGE |
|---|---|---|---|
| R | U | V | A,B |
| 0 | | | |
| 1 | A | N | |
| 2 | O | B | |
| 3 | C | N | |
| 4 | A | B | |
| 5 | C | B | |
| 6 | | | A⇄B |
| 7 | | | |

TABLE III

| | DATA SELECTORS | | |
|---|---|---|---|
| Σ | A | B | C |
| 0 | A | B | C |
| 1 | Σ | B | C |
| 2 | A | Σ | C |
| 3 | A | B | Σ |

Σ field 235 determines the selection of the output from Σ data selector 218 to A register 211, B register 212, C register 213 or none of these Σ data selector outputs. As shown in TABLE III, three codes are decoded to enable the output of Σ data selector 218 to be input to A register 211, B register 212 and C register 213; and the fourth code provides means for a no-op code to enable a class of keyboard synchronization and encoding instructions.

Condition circuit 192 reflects the status of the calculator at any given point in the execution of its fixed program. It is combined with the contents of Ma-bit 231 to determine if a jump instruction is to be executed or skipped. Condition circuit 192 is loaded with a carry-borrow (C/B) result of an arithmetic operation, the contents of any FLAG test or comparison (FA:FB) of any pair of FLAGs with a common (FMSK) address, the scanned conductance (closed equals 1) of key matrix cross-points of the keyboard switches in normal scanning sequence, or the value of a particular digit scanner state, for example, D11.

The carry-borrow and FLAG inputs to the condition circuit provide means for convenient branch operations whereby the sequential program execution can be made dependent on results of data, on arithmetic register operations, and on the current status of the calculator system as indicated by any of a plurality of status memories (FLAGs) as for example in the illustrated embodiment in which 26 FLAGs are available.

The key matrix and digit scanner inputs to the condition circuit provide means for convenient and efficient synchronization and encoding under program control of a plurality of keyboard inputs, as for example in the present illustrated embodiment, 44 inputs are available. TABLE IV shows the coding and operation of these instructions. The WAIT operations provide control means to recirculate program counter (PG) 209 at its current value (not incremented) until the WAIT condition (D11, KN, or KP) is satisfied. In addition, a register operation which subtracts the numeral 1 from the mantissa of A register 211 can be associated with the D11 WAIT condition and is associated with the KN and KP WAIT condition instructions. The logical shift and FLAG initialization instructions are also shown in TABLE IV.

TIMING BLOCK 203

Figure 6:
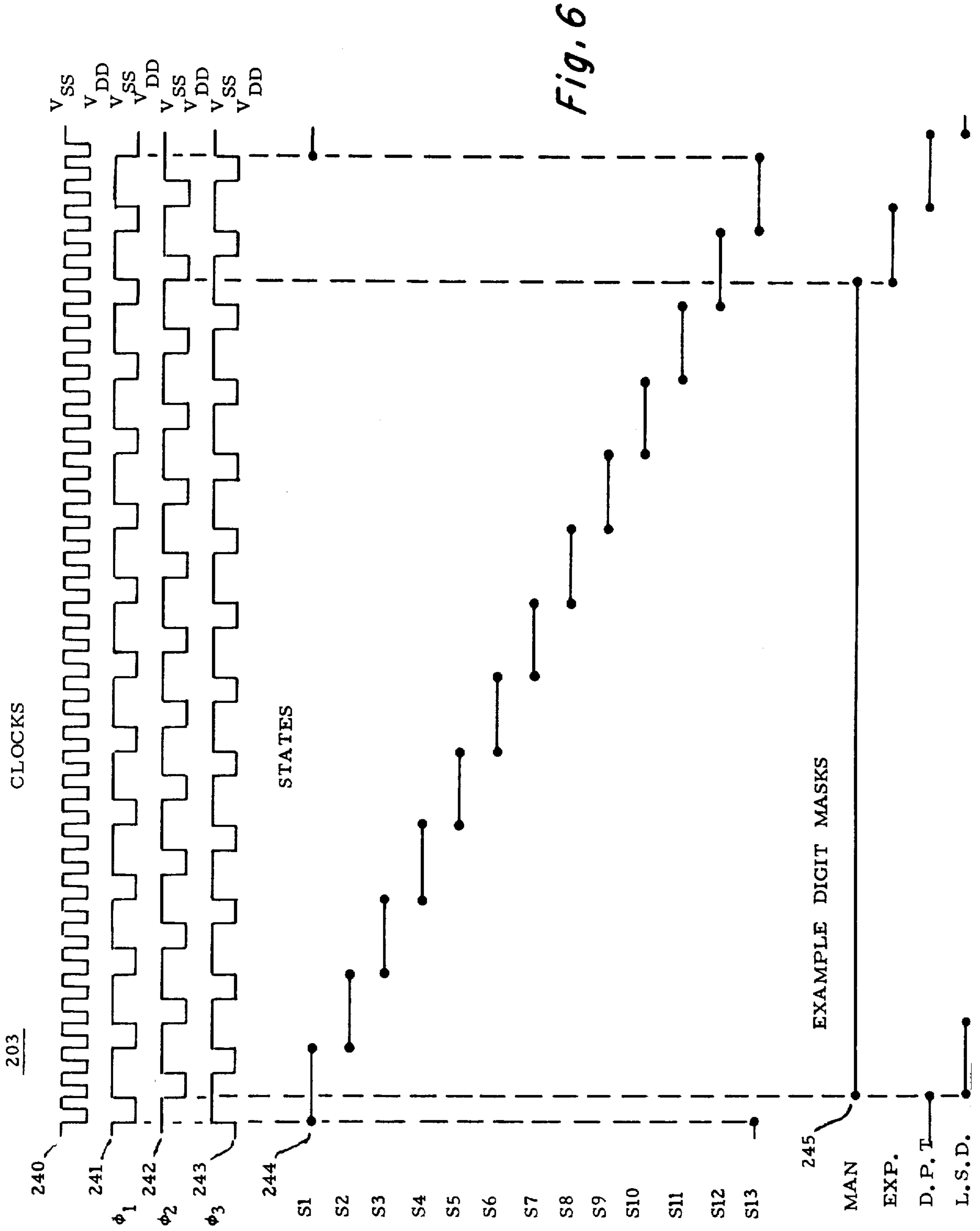
FIG. 6 is a graph illustrating the basic instruction cycle timing for the calculator system.

The function of the sybsystem within timing block 203 is to generate three phase internal clocking (internal being within the monolithic structure of the preferred MOS embodiment) from an external single phase oscillator voltage, generate internal state and digital timing based upon the clocking inputs and provide digit and FLAG masking decoders. The basic instruction cycle timing for the calculator is illustrated in FIG. 6. The $\phi$ system timing input 240 is a square wave provided by an oscillator with approximately 50% duty cycle. The 3 internal clocks $\phi_1$, $\phi_2$ and $\phi_3$ provide signals 241, 242 and 243, respectively, which are derived from the $\phi$ system clock by means of a recirculating ring counter. With binary coded decimal parallel arithmetic utilized in accordance with the present invention, each digit of add or subtract calculation utilizes one full set of clock pulses $\phi_1$, $\phi_2$, and $\phi_3$. The full set of clock pulses is considered a state; consider for example the first state S1 with a corresponding signal 244. There are 13 such states S1–S13 corresponding to the 13 digit circulation of registers 211–213 in data block 204. The 13 states are generated by means of a feedback shift counter. Although the 13 states and 13 digit registers will allow storage of 13-digit numbers, a generalized floating point notation which is more convenient from the standpoint of program storage and manipulation of data is utilized in accordance with the present invention. This is accomplished by the marking or sub-addressing of registers 211–213 to mask or isolate 6 particular fields as follows: Mantissa field 245 which has N digits, the first of which is the least significant digit (LSD), the last of which is the overflow digit (OVF) and the (N-1)th digit of which is the most significant digit (MSD); masks are thus provided for the mantissa, the LSD, the MSD and the OVF. There is also provision for an exponent (EXP) mask and a display (DPT) mask. These 6 masks are generated in the digit mask decoder as commanded by the M mask field 232 of the instruction word. In accordance with the present invention, the masks are individually adjustable so that variable functioning systems can be accommodated within the calculator system. In the MOS embodiment, variations of the masks are effected by varying the gate oxide mask during the fabrication process to change the calculator operation. One variation for example, would be to set up one or more of the 6 masks to cover two digits and controlling the adder circuit in the data block to operate in hexadecimal as opposed to binary coded decimal thereby allowing for the processing of 8-bit binary characters by the calculator system .

TABLE IV

| I | M | S | R | Σ | WAIT COND. | REGISTER ARITHMETIC | JUMP COND. | CLEAR FLAGS |
|---|---|---|---|---|---|---|---|---|
| 1 | 0 | 0 | 7 | 0 | D-11 | | | |
| 1 | 0 | 0 | 0 | 0 | D-11 | A-1→$A_M$ | | |
| 1 | 0 | 1 | 0 | 0 | KP | A-1→$A_M$ | | |
| 1 | 1 | 0 | 0 | 0 | KN | A-1→$A_M$ | | |
| 1 | 1 | 1 | 0 | 0 | | | KOvKN | |
| 1 | 1 | 0 | 0 | 0 | | | KQ | |
| 1 | 0 | 0 | 1 | 1 | | SLL(A) | | |
| 1 | 1 | 0 | 2 | 2 | | SLL(B) | | |
| 1 | 2 | 0 | 3 | 3 | | SLL(C) | | |
| 1 | 0 | 1 | 1 | 1 | | SRL(A) | | |
| 1 | 1 | 1 | 2 | 2 | | SRL(B) | | |
| 1 | 2 | 1 | 3 | 3 | | SRL(C) | | |
| 1 | 13 | 0 | 3 | 1 | | | | FA |
| 1 | 13 | 1 | 3 | 1 | | | | FB |

In addition to the digit mask provisions, a subsystem of timing block 203 controls the addressing of FLAGS. The addressing of FLAGs is essentially a one out of thirteen selection and is accomplished by the FLAG mask decoder.

Figure 7:
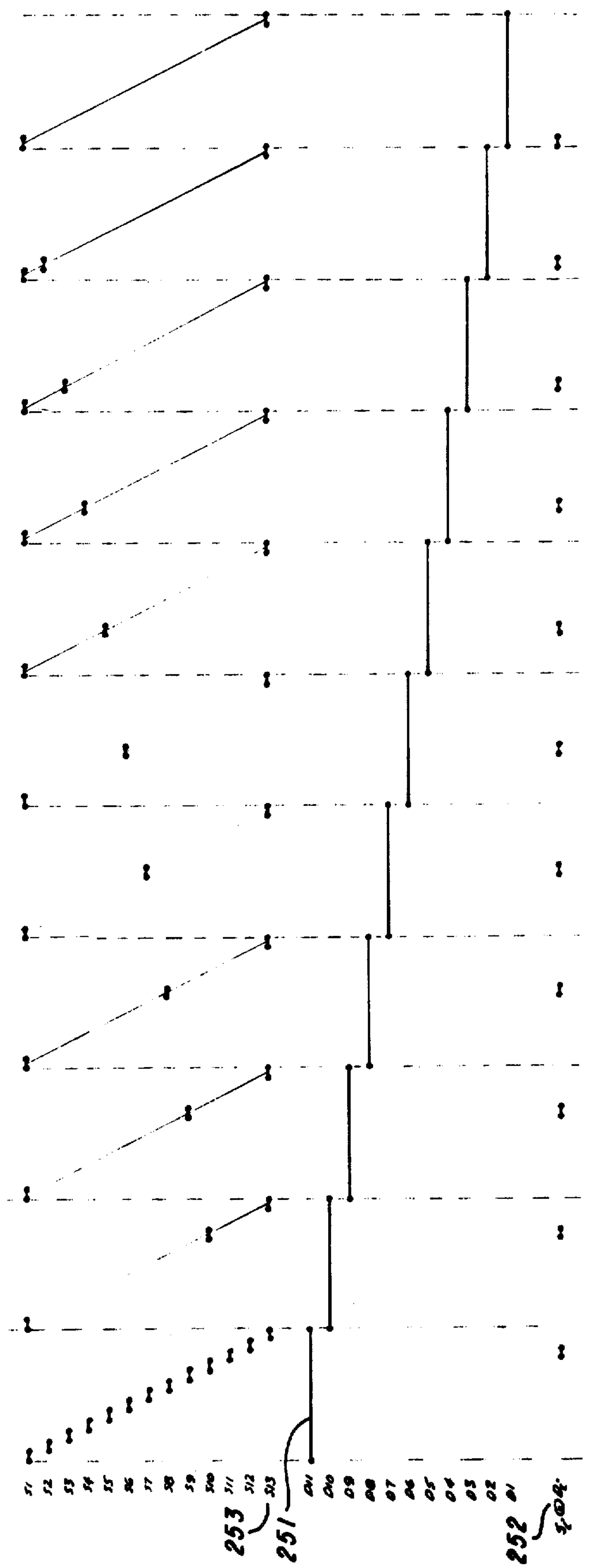
FIG. 7 is a graph representing the scan cycle timing for the keyboard and display scan and relates the scan cycle to the instruction cycle timing period.

FIG. 7 illustrates the scan cycle timing for the keyboard and display scan and relates the scan cycle to the instruction cycle timing period. In accordance with the present embodiment of the invention both the keyboard inputs and display outputs are scanned with the same scan signals. In this manner, the number of pins required to package the system as a monolithic integrated semiconductor structure are reduced to a minimum and the internal system logic is simplified. It is desirable to scan at a rate which is slow enough to be consistent with conventional displays such as a neon tube display in addition to, for example, a liquid crystal display and simultaneously to calculate at a very high rate. Hence, the scanner of the present invention operates by nesting multiple instruction cycles within a scan cycle. In the illustrated embodiment there are 11 scan signals which are sufficient for a 10 digit numeric display plus a 1 digit control display such as an error (E) signal or minus (−) sign. This also allows very efficient coding of the keyboard entry routine. During each digit time, for example, D11 with logic 1 signal 251, 1 digit of a particular register is synchronously decoded. In order to retrieve the various digits of a particular register in sequence the output decoder is double buffered. The input of the buffer is clocked on the state 252 which corresponds to the (equivalence: $S_i \bigcirc D_i$). The output is clocked on a fixed state, for example, signal 253 of state S13, synchronous with the digit scan cycle. In this manner, during a digit scan cycle, each digit from the registers is recovered in sequence and synchronously displayed. The digit counter is itself clocked by a particular state, for example, state S13 and operated by a feedback shift counter similar to the state feedback shift counter. In the present embodiment, the digit feedback shift counter counts down modulo 11 whereas the state counter counts up modulo 13. In this manner the real-time most-significant-first scan which results provides means for implementation of zero suppression logic in the display.

Figure 8:
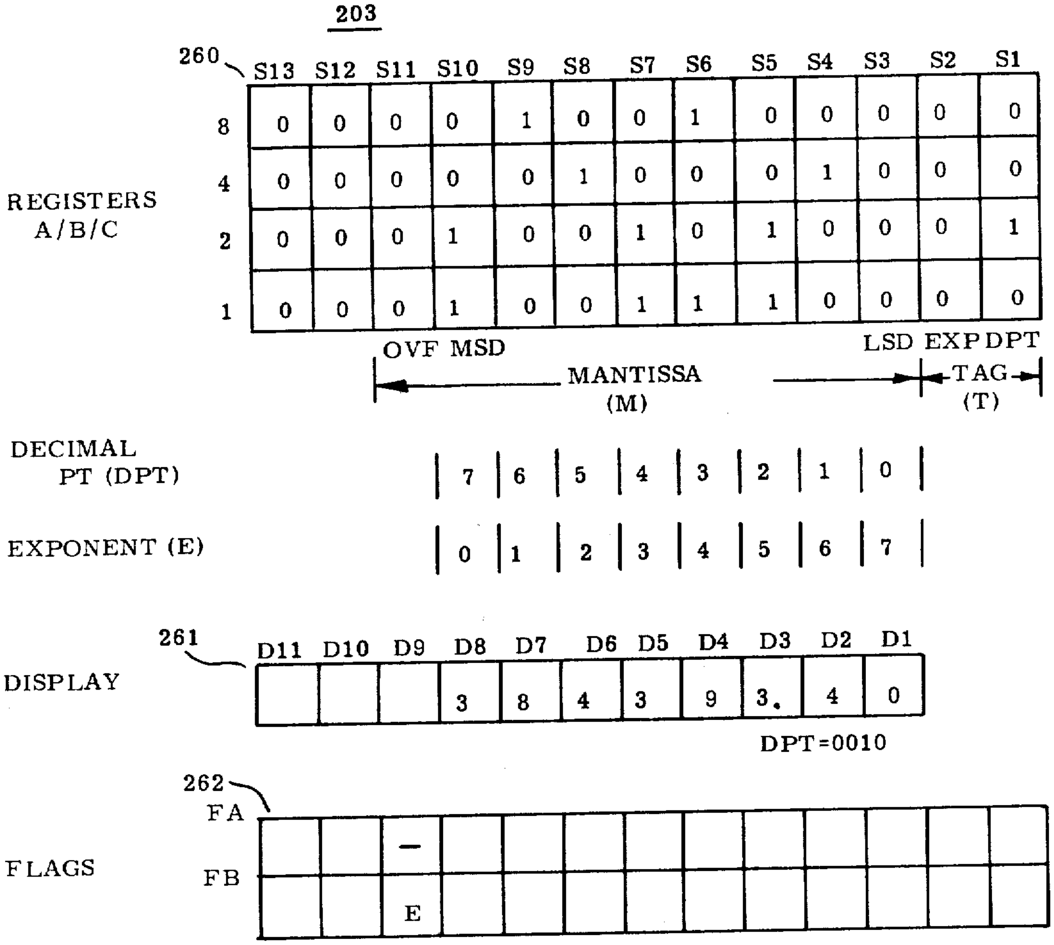
FIG. 8 is a representation of the data format for the A register, B register, C register, FA FLAG register, FB FLAG register and display.

The exemplified digit masks discussed with respect to FIG. 6 are further clarified in FIG. 8. FIG. 8 illustrates the data format for A register 211, B register 121, C register 213, FA FLAG storage element 226, FB FLAG storage element 227, and the display. A numeric example is shown in the register format 260 in order to clarify the operation of the digit masks. In the example, the decimal points (DPT) is shown equal to 2. Therefore, in display format 261, the decimal appears at the $D_3$ location. The mantissa field is shown in the example for an 8 digit calculator system to exist between S11 and S3.

Although there is no rigid requirement for the FLAG format 262, in the present embodiment it is convenient to dedicate FA FLAG storage element 226 and FB FLAG storage element at S11 mask or time-address to storage of the minus (−) and error (E) FLAGS for the display. In this manner the logic of segment decoder 198 and hence of output block 205 is greatly simplified.

Finally, the subsystem of timing block 203 includes the key input logic. The function performed by this logic is buffering and synchronization to the internal instruction cycle. In accordance with the present calculator system no provision need be made in hardware to defeat transient noise, mechanical key bounce or double key entry; each of these functions are included as fixed program routines.

PROGRAM BLOCK 201

As illustrated in FIG. 2, the subsystem of program block 201 is comprised of read only memory (ROM) 208 and program counter (PC) 209. Read only memory 208 functions as a storage means for a linear program list which in the present embodiment contains 320 11-bit instruction words to provide the fixed programs which perform the particular calculator functions. Various embodiments of the calculator system are therefore provided by providing various combinations of programs in read only memory 208. Read only memory 208 may be programmed in accordance with the techniques described in U.S. Pat. No. 3,542,343 to R. H. Crawford et al, tilted Binary Decoder. The programs may include keyboard input routines, internal format routines, internal calculation routines and display format routines. Specific programs utilized in conjunction with the desk top calculator function of the calculator system of the invention and the programming of the calculator system to perform other functions are described in a later section.

Program counter 209 is, in the present embodiment, a 9-bit dynamic storage register which accepts a new input during each instruction cycle. The new input is either the program count itself, the program count incremented by 1 or 9-bits from the previous instruction word. These three inputs provide WAIT instructions, normal operating instructions and jump instructions, respectively.

Figure 9:
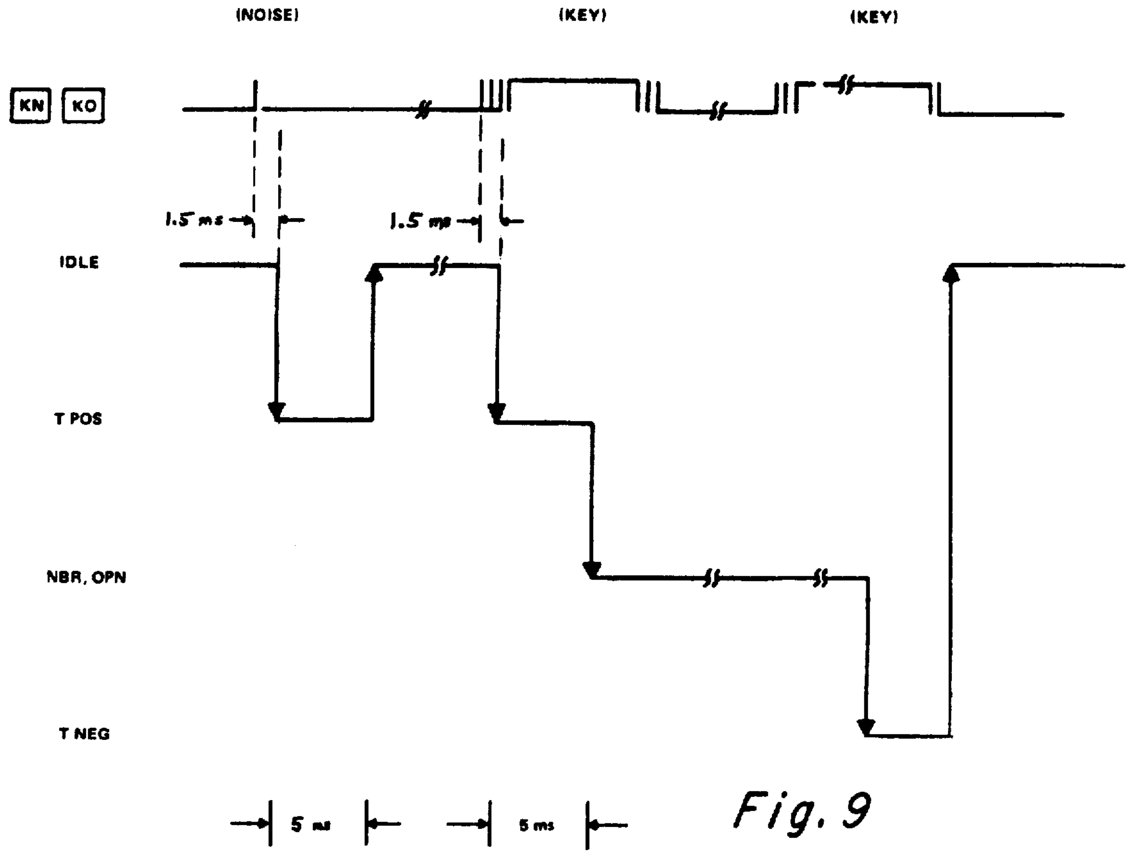
FIG. 9 is a graph representing the keyboard program timing showing that the input-sensing program provides protection against transient noise, double-entry, leading-edge bounce and trailing-edge bounce.

One function of program block 201 is to provide a defeat mechanism by which malfunction of the keyboard encoding procedure is prevented. The input-sensing program provides protection against transient noise, double-entry, leading-edge bounce, and trailing-edge bounce, as shown in FIG. 9. An 'IDLE' routine sequentially scans the [KO], [KN] and [KQ] inputs until a non-quiescent input is detected. The input is sampled again 2.5 ms later by a "TPOS" routine to distinguish a valid key-push from the transient noise. If the test is positive, then (5 ms after the initial detection) the program jumps to a 'NBR' or 'OPN' entry routine; otherwise, it returns to the 'IDLE' routine. The 'NBR' routine enters the number which is keyed-in into the display register; 'OPN' performs the keyed-in operation. Both routines terminate in a jump to a 'TNEG' routine. 'TNEG' performs a scan of the [KN], [KO] and [KQ] inputs to determine that the entire keyboard is in its quiescent condition. After a successful (negative) test the program jumps back to the 'IDLE' routine.

Figure 10:
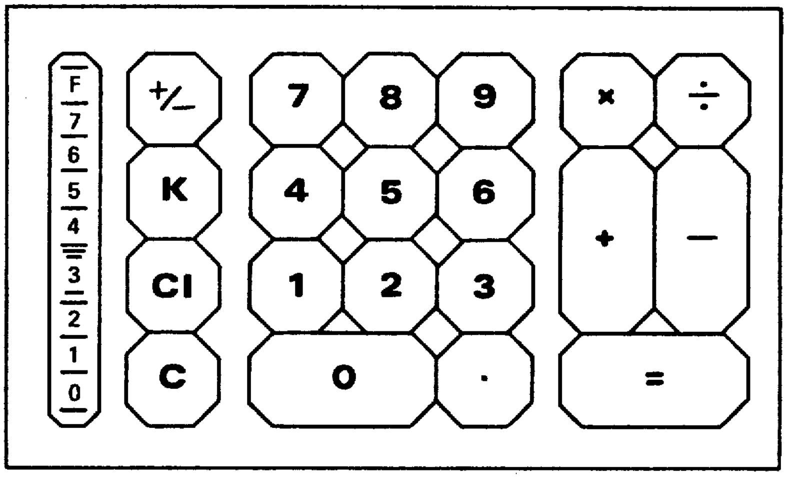
FIGS. 10 and 11 are planar diagrams showing exemplary calculator keyboards utilized in conjunction with the present calculator system.
Figure 11:
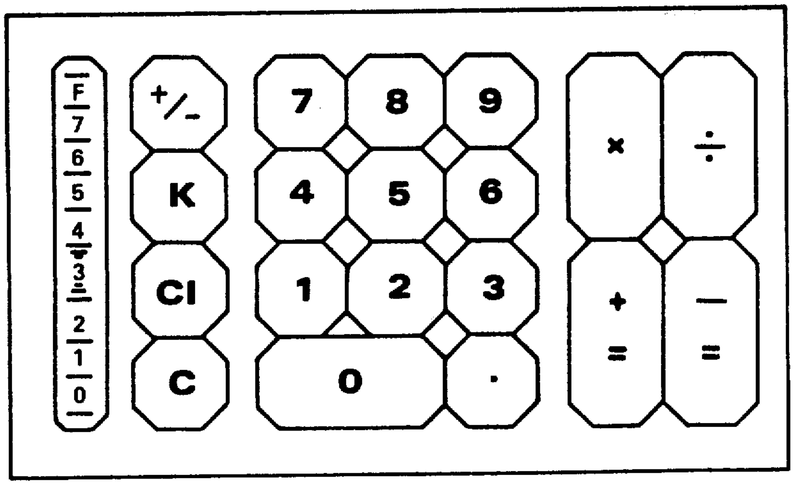

Five classes of keyboard inputs and consequent program routines are utilized in order to perform calculations and/or logic functions with the Calculator System, as follows: Number Keys, Mode Switches, A Decimal Point Switch, Operation Keys, and Interlock Keys. The distinctions between "keys" and "switches" is that keys are operated momentarily and exclusively, whereas switches are generally static and may have a normally-closed position. The program classes are explained by way of example; exemplary Calculator Keyboards using these keys are shown in FIGS. 10 and 11.

Number Keys: There are ten numeric keys and a decimal point key. Operation of the [0], [1], [2], [3], [4], [5], [6], [7], [8], and [9] keys left-shifts the display register one digit and enters the corresponding number into the least-signficant digit. The [.] key is operated in normal sequence of figure entry. If it is not used, the point is assumed to be after the last numeric entered. The entry mode is always floating.

Mode Switches: The constant switch [K] selects between chain operation and constant operation. Normal operation of the calculator, with the constant key [K] up (open) allows chained calculators without loss of intermediate results. Alternative operation with [K] down (closed) allows constant operand operation.

Point Switch: Floating or fixed mode of operations is selected by an 11-position switch [F]-[9]-[8]-[7]-[6]-[5]-[4]-[3]-[2]-[1]-[0]. Positions [0] through [9] are used for fixed-point calculation results; the [F] position selects full-floating operation.

Operation Keys: With 10 Number Keys, 2 Mode Switches, 11-position Point Switch, and 44 Matrix Crosspoints, there remains space for a total of 21 possible operation keys. These key locations are sufficient to include the two main keyboard configurations illustrated in FIGS. 10 and 11. [+] Stores an addition command and performs a possible preceding operation; [−] stores a subtraction command and performs a possible preceding operation; [×] stores a multiplication command and performs a possible preceding operation; [÷] stores a division command and performs a possible preceding operation; [+/−] changes the sign of the display register; [=] performs the preceding operation and stores a command to clear at the next number entered; [±] enters the last keyed-in number in the calculator and performs a possible preceding operation; [≡] enters the last keyed-in number in the machine as a negative number; [C] clears all three registers and any preceding operation; [CI] clears the display register.

Interlock Key routines are functional hybrids of (momentary) operation keys and (static) mode switches. They provide a mechanism for interlocking the operation of the Calculator System to the operation of other devices. In particular, the Calculator System may be programmed for at least three additional types of applications by the operation of Interlock Key routines, as follows: the Calculator System (master) controlling of a Slave Device (e.g., print mechanism or print control circuit); slave operation of the Calculator System by a Master Device (e.g., a remote controller through a real-time communication medium); and multiprocessing by a plurality of Calculator Systems of the present invention according to a preprogrammed interlock routine for determination of priority and effecting of intercommunication.

OUTPUT BLOCK 205

In the described embodiment of the Calculator System, twenty-two outputs are provided to perform display and keyboard scanning, and synchronously decode the contents of the display register.

Figure 12:
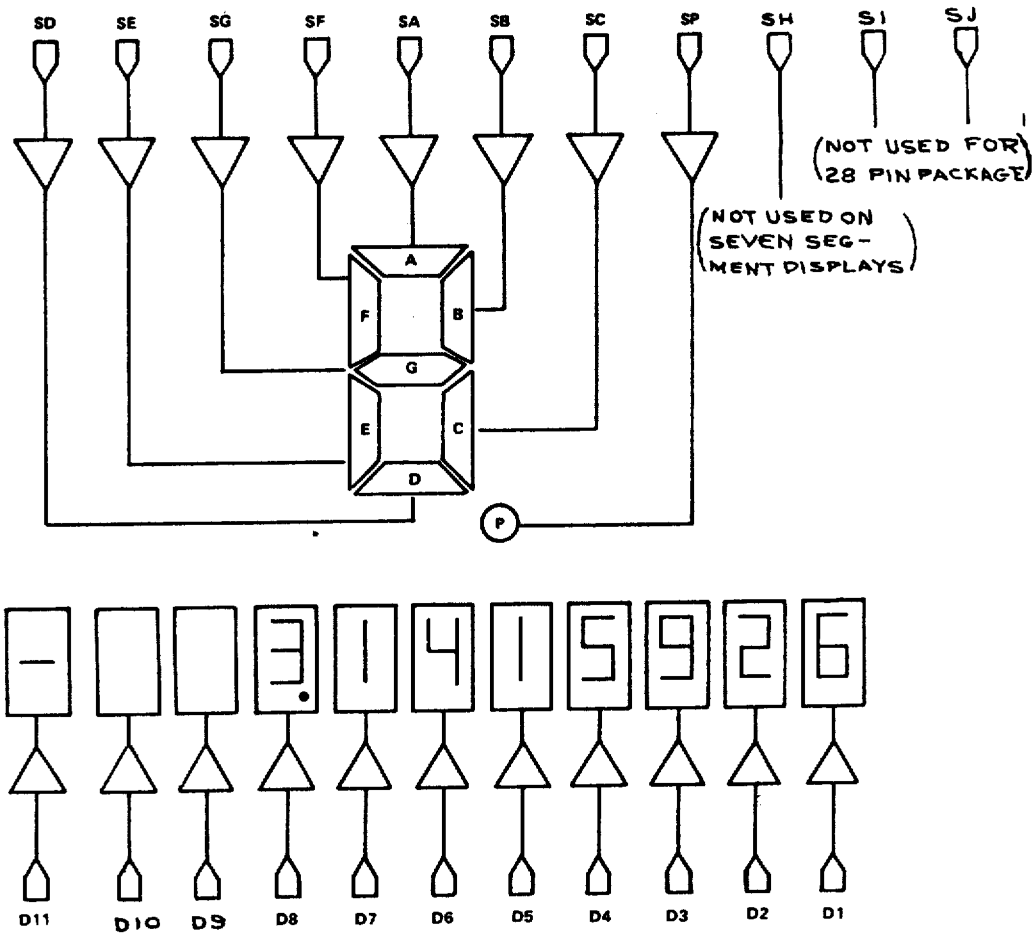
FIG. 12 is a circuit diagram of the display element showing the input and output connections to the digit scanning circuits.

Referring to FIG. 12, the Digit Driver (D1, D2, D3, D4, D5, D6, D7, D8, D9, D10, D11) outputs of digit decoder 195 are used to scan-encode the keyboard and to scan the display. An inter-digit blanking signal is gate-mask programmed to disable the digit drivers for interface to particular display devices. The polarity of the digit signals is positive; that is, during Di, Di is conducting to VSS. This is provided in the described MOS calculator system embodiment in order to effectively scan the keyboard matrix.

The Segment Driver (SA, SB, SC, SD, SE, SF, SG, SH, SI, SJ, SP) outputs of the segment decoder 198 are gate-mask programmed for direct compatibility with 7- and 8-segment (plus decimal point) displays. In addition to segment code, both inter-digit blanking and segment polarity can be selected. Thus, the inter-digit blanking signal is programmable in increments of 12 microseconds (nominal); and it can be applied to either digit drivers or segment drivers, or both. The leading zeros (high-order zeros before the decimal point or a non-zero figure) are suppressed by disabling all segment drivers.

Figure 13:
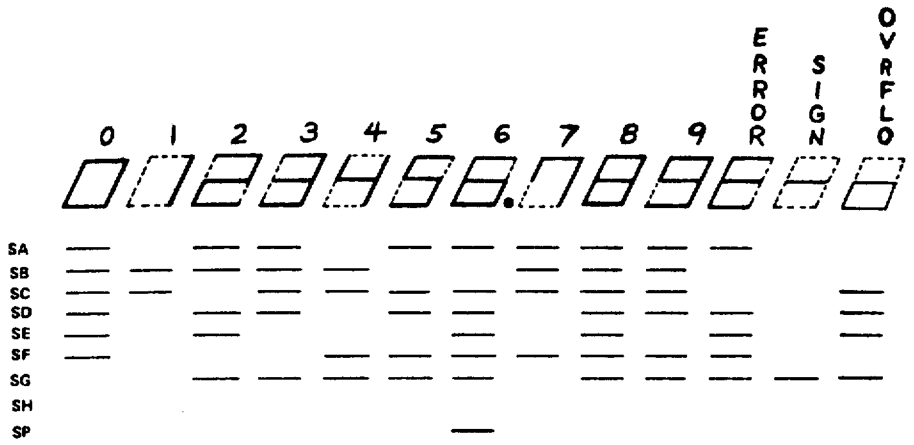
FIG. 13 is a diagram showing a representative display font of a display utilized in conjunction with an embodiment of the present invention.
Figure 14:
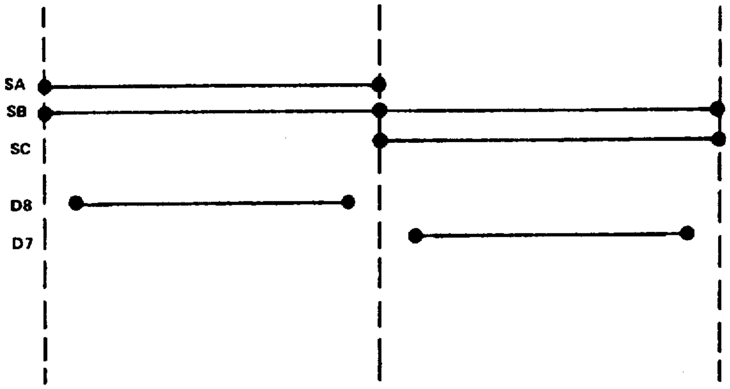
FIG. 14 is a graph showing how the segment drive includes the digit drive of an embodiment of the invention.
Figure 15:
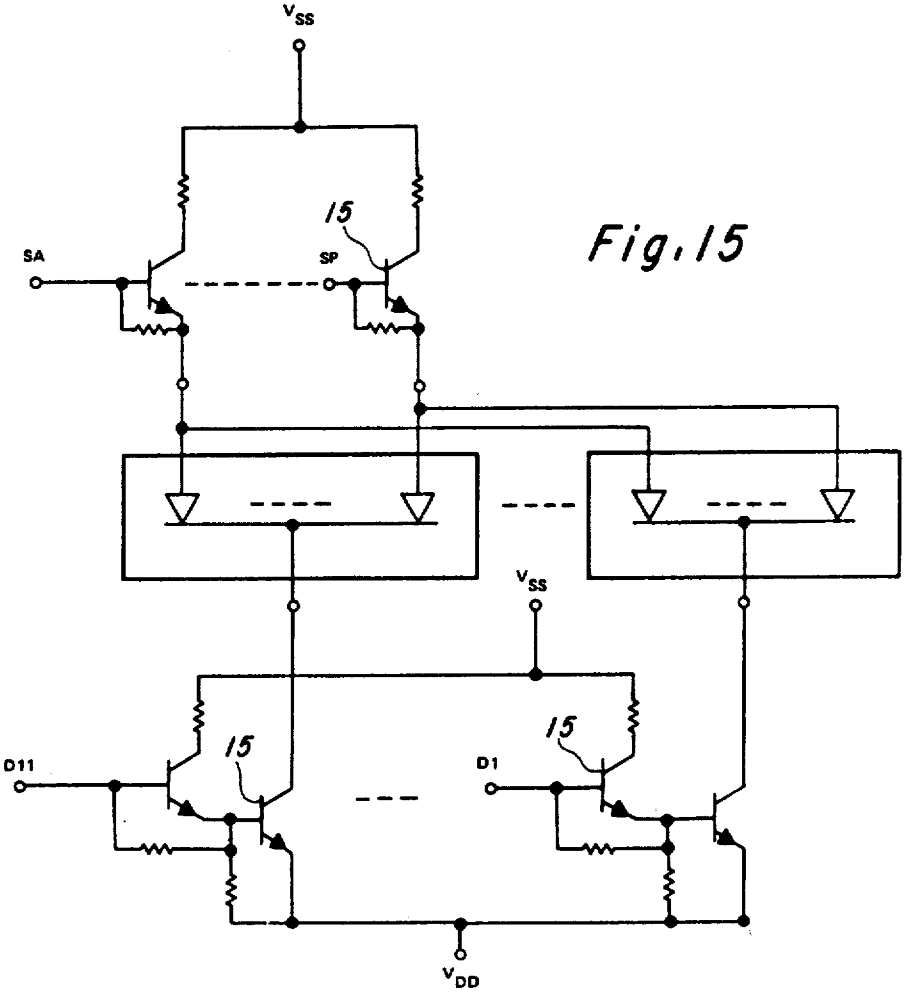
FIG. 15 is a circuit diagram of an interface circuit between the display elements and the scanning circuits in an embodiment of the present invention.

The described Calculator System embodiment digit and segment decoders have been programmed for a 7-bar digit-blanked characteristic with positive segment decoding (segment A "on" is decoded as SA conducting to VSS). The display font is illustrated in FIG. 13. The complete coding of the numerals, error (E) and minus (−) indications are shown. SH is not used for display but outputs information useful for testing purposes. SI and SJ are available in hardware for use with numeric displays with one terminal (e.g., cathode) per numeral. However, these outputs are not used for segmented displays in order to allow the monolithic integrated semiconductor embodiment of the Calculator System to be placed in a 28-pin packaging. When a clock period is 4 microseconds, for example, the scan rate is 156 microseconds per digit. For example, the present embodiment is programmed for 12-microsecond leading-edge blanking and 12-microsecond trailing-edge blanking on the digit drivers only. Hence, the segment drive covers the digit drive, as illustrated in FIG. 14. An interface circuit which includes bi-polar transistors 15 for a common-cathode 7-bar LED display is shown in FIG. 15. The interface circuit of the present embodiment is fabricated on a separate semiconductor substrate.

Figure 16:
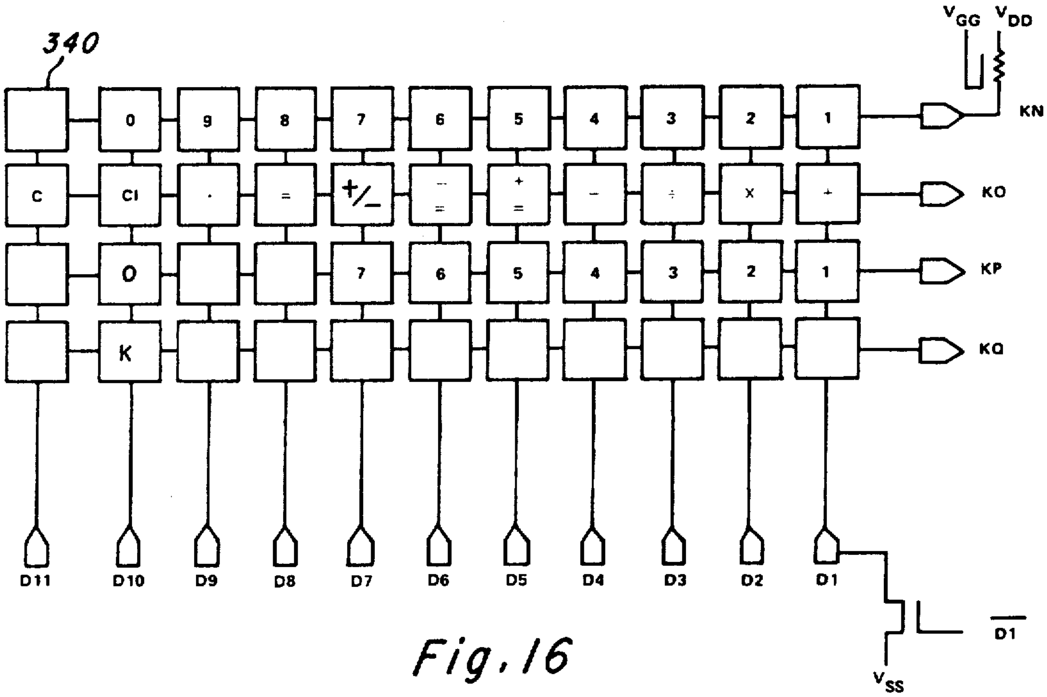
FIG. 16 is a circuit representation of a keyboard utilized in conjunction with the described calculator embodiment including the interconnections to the scanning circuits.

FIG. 16 illustrates the key assignment of the described calculator embodiment. Each key, e.g., 340 is a Form A normally open single pole, single throw switch, which has meaning for the particular input routine programmed in ROM 208.

It is also contemplated that some of the "Mode Switches" discussed previously in the Program Block section could in some embodiments be in the form of jumper wires, thus more permanently selecting a particular mode for a particular model or family of equipment. In this way, a "master program" involving a single embodiment of the invention could economically and feasibly cover the whole family of distinct operational characteristics.

LOGIC AND CIRCUIT DESCRIPTION OF THE MOS CALCULATOR SYSTEM EMBODIMENT

The calculator system according to the present invention has been discussed in terms of the function within each block of FIGS. 1 and 2. In the following sections the calculator system is described in terms of logic system and circuit elements which comprise the present calculator system embodiment which as previously noted is capable of being fabricated as a monolithic integrated semiconductor system utilizing contemporary MOS or MIS manufacturing technology. The complete calculator system of the present embodiment except for the keyboard illustrated separately in FIG. 16, the display element shown separately in FIGS. 12-14 and the display driver illustrated separately in FIG. 15. The logic/circuit diagram of FIG. 17 is comprised of 26 figures, FIGS. 17A through 17Z which are put together as illustrated in FIG. 17.

The functional elements described in the previous sections are identified in FIG. 17 with like numerals. In program block 201, program counter 209 provides a 9-bit address 501 to ROM 208. The data output 501 from ROM 208 is then transmitted to instruction register 190.

In control block 202, outputs 503 of instruction register 190 are distributed to jump-condition circuit 192; R decoder 191 A, control decoder 191 B, and Σ decoder 191 C of decoder 191 in control 202; and, FLAG and digit mask decoder circuits 195 A and 195 B in mask decoder circuits 195 of timing block 203. R decoder outputs 504 control U data selectors 215 and V data selectors 216 in data arithmetic logic unit 207. The condition output 507 of jump condition circuit 192 controls jump gates 508 in program counter functional element 209. Outputs 509 of Σ decoder 218 control the A data selector gates 219, the B data selector gates 220 and the C data selector gates 221 in arithmetic logic unit 207. Outputs 513 of control decoder 191 B operate the condition selector gates 514 in jump condition circuit 192. Outputs 515 of control decoder 191 B operate WAIT-KN-KP selector gate 516 of keyboard input circuit 196. Outputs 517 of control decoder 191 B operate Σ gates 218 in arithmetic logic unit 207.

In timing block 203, outputs 518 of digit and FLAG mask decoders 195 drive FA and FB FLAG operation logic gates 519 and 520. Outputs 521 of FLAG mask decoder 195 A operate keyboard synchronizing buffer control circuit 522 in keyboard input logic 196. Output 523 of FLAG mask decoder 195 A provides a synchronizing time pulse to jump-condition circuit 192. Outputs 524 of digit mask decoder 195 B is input to R decoder circuit 191 A and to FLAG mask decoder 195 B to discriminate FLAG commands from data operation commands. Output 526 from digit mask decoder 191 B provides a sub-addressing timing mask to Σ gate control circuit 527 and through the Σ decoder outputs 509 to A data selector gates 510, B data selector gates 511 and C data selector gates 512 in arithmetic logic unit 207; and, to carry-borrow detection gate 528 of jump-condition circuit 192. Output 529 of digit mask decoder 191 B provides a right shift command to Σ control circuit 527 in arithmetic logic unit 207. Output signals 536 of A register 211 of the FLAG and data storage array 206 are transmitted to AA buffer circuit 542 in segment decoder 198.

Figure 18A:
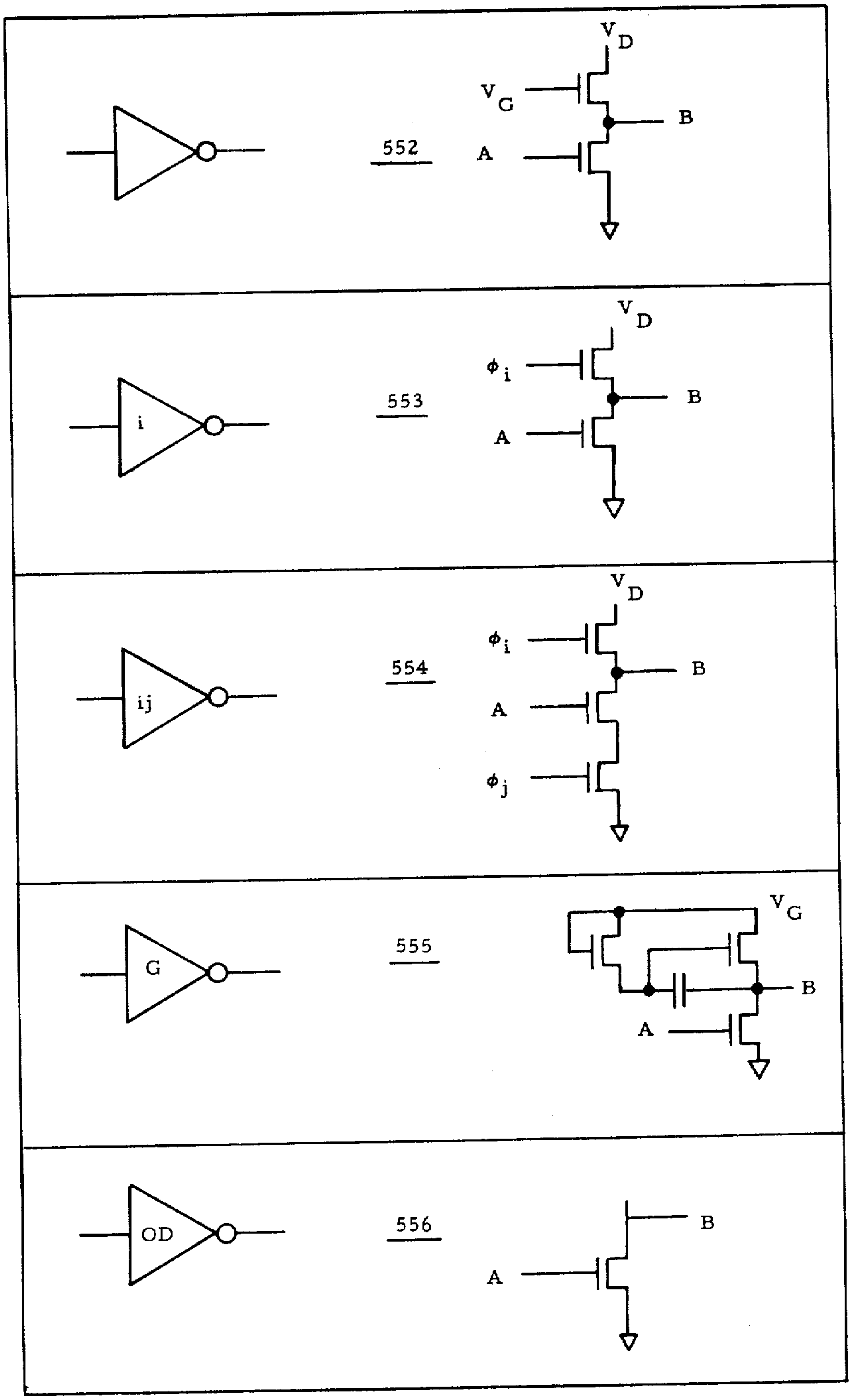
Figure 18B:
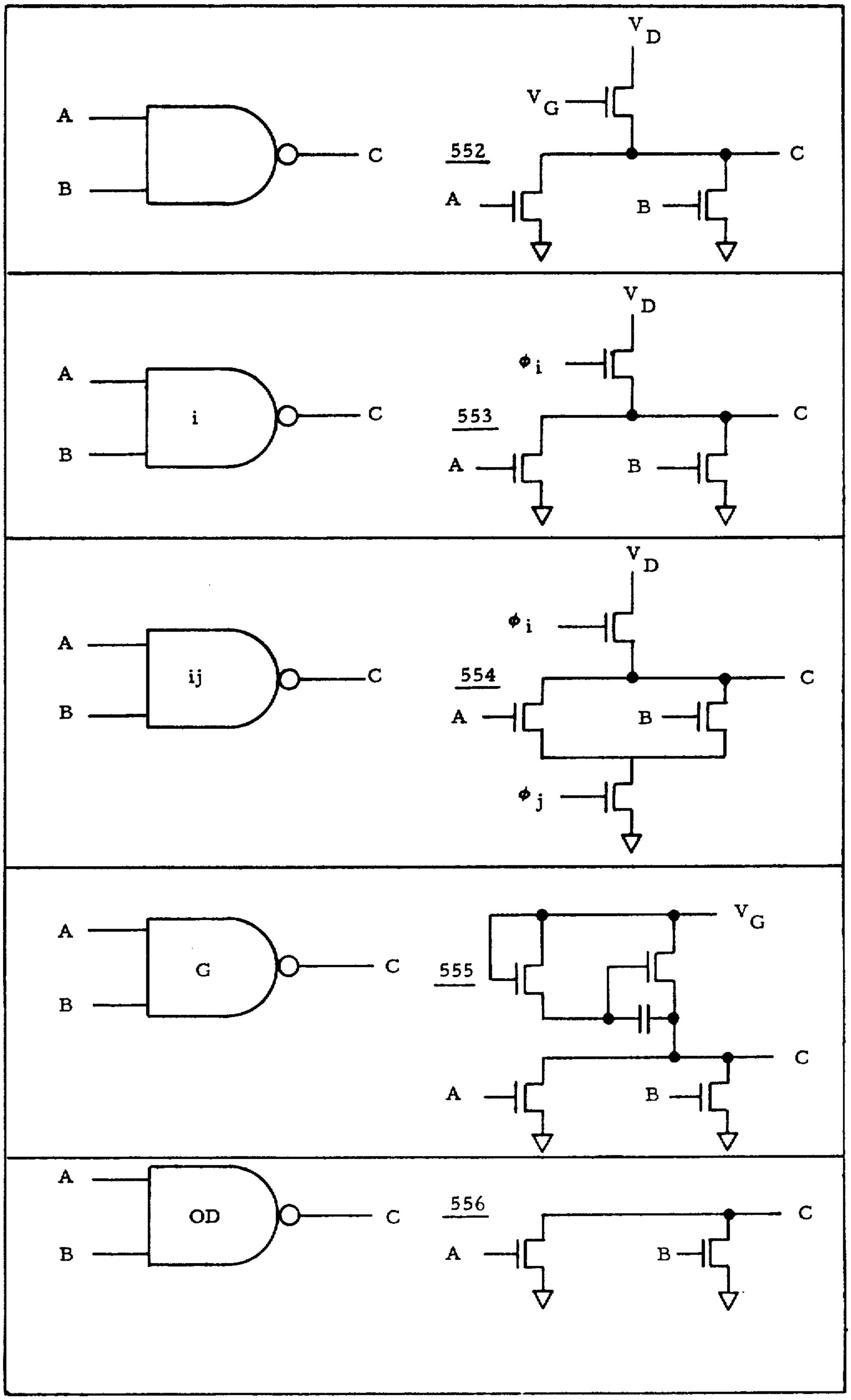
Figure 18C:
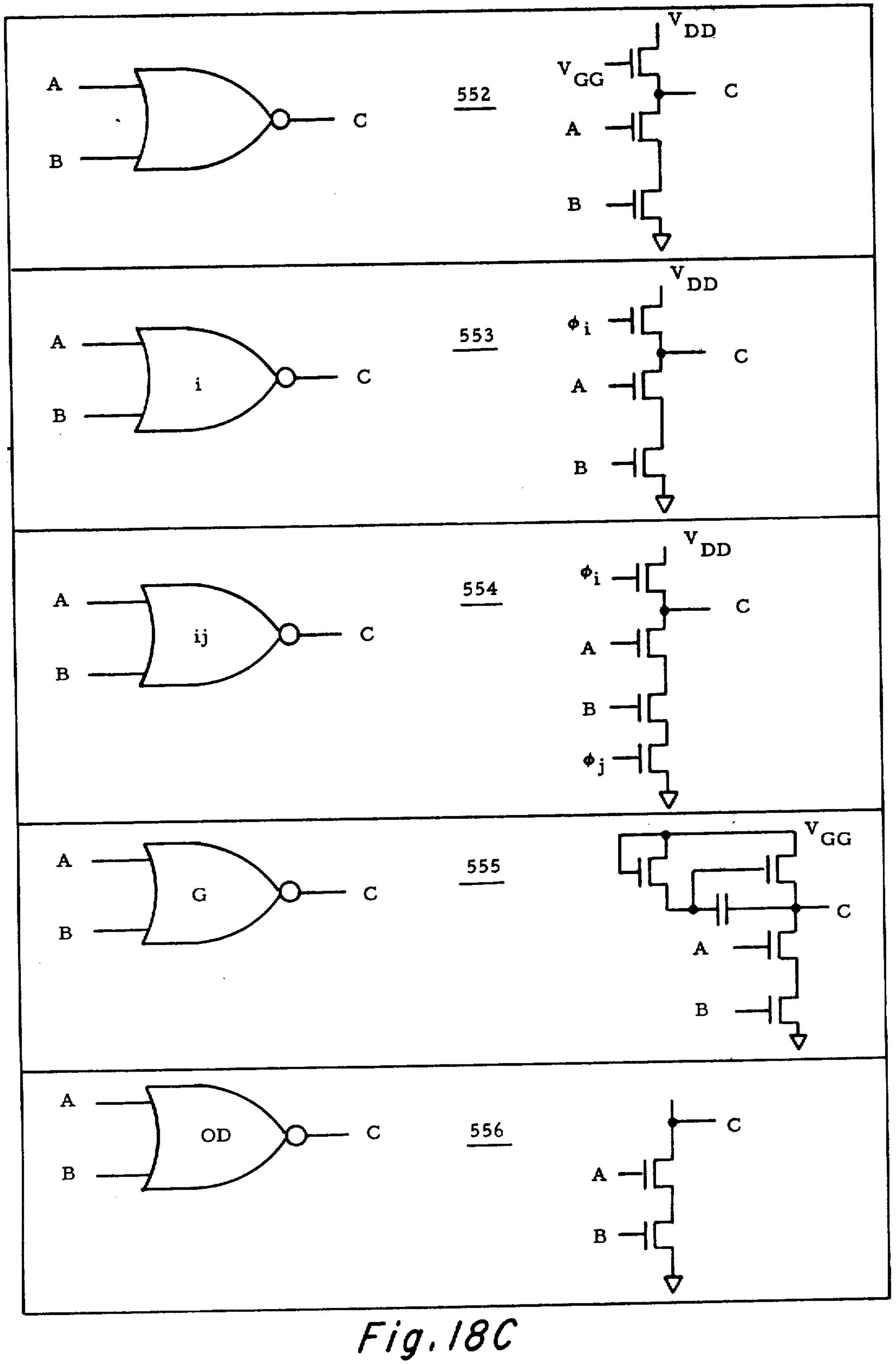
Figure 18D:
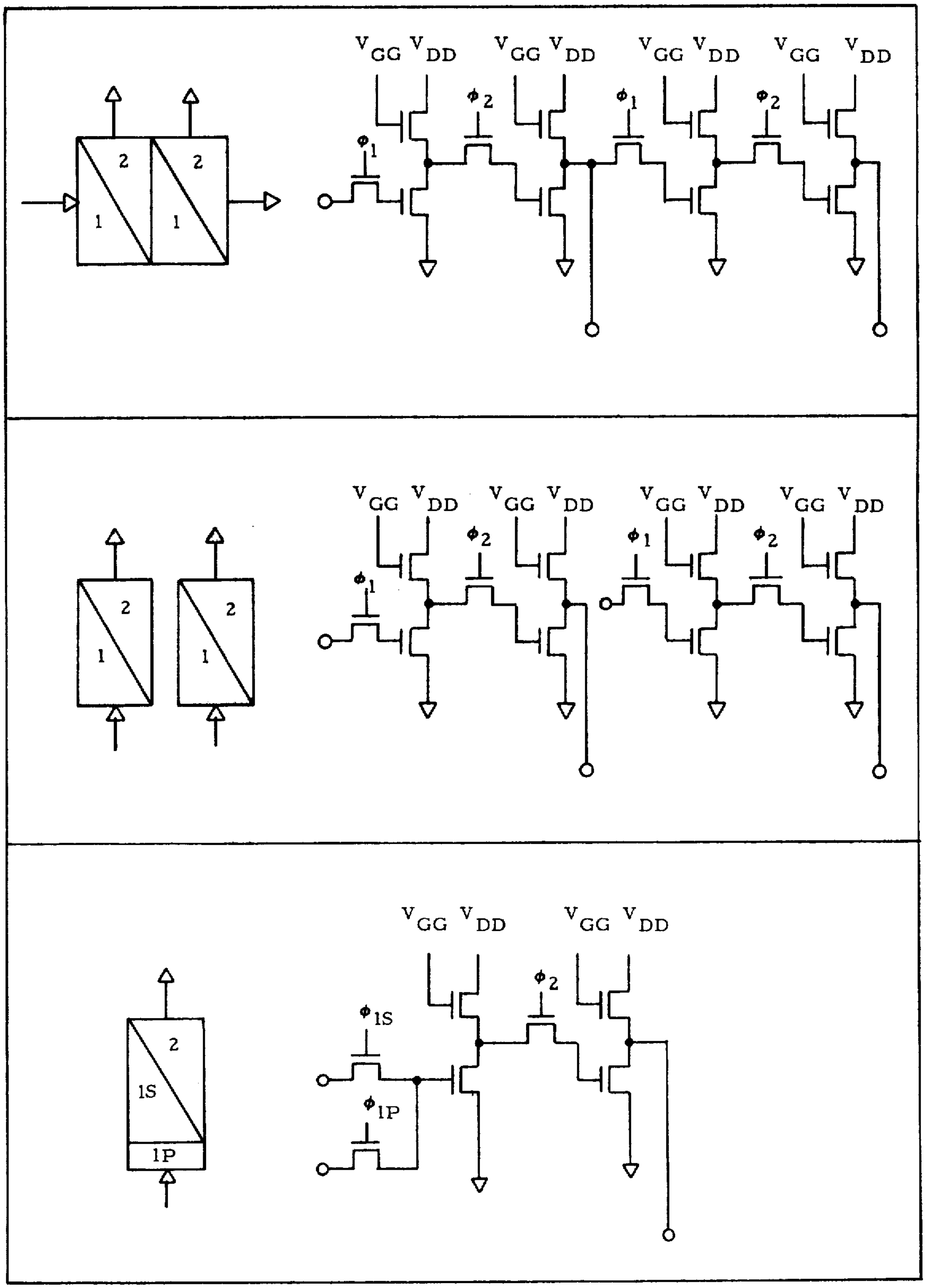

In the following sections the logic and the circuit descriptions of blocks 201-205 is described in detail. In order to better understand the calculator system, the logic symbology and its MOS circuit equivalents is here discussed with reference to FIGS. 18A-D. FIG. 17 is described in terms of conventional logic symbology using positive logic convention. However, additional notation has been included to clarify the particular MOS circuit embodiment which have been chosen to meet transient, voltage level and timing requirements of the system. FIG. 18A illustrates five different inverters which appear in FIG. 17 and their respective MOS circuit equivalents. Similarly, FIG. 18B illustrates five corresponding types of NAND gates and their respect to MOS circuit equivalents and FIG. 18C illustrates five corresponding types of NOR gates and their respect to MOS circuit equivalents. The five different types of MOS circuits shown in each of FIGS. 18A-C may be described as follows: a logic symbol 552 with no internal inscription is a conventional load ratio circuit. A logic symbol 553 with a single numeric inscription 1, 2 or 3 indicates a dynamic implementation of the logic function with clocked load $\phi$I where I is the inscription. This type of circuit is used for lower power consumption and reduction of the number of service lines (DC voltages and clocks) required in arrays which don't require a gate bias voltage VGG. A logic symbol 554 with two numeric inscriptions IJ indicates implementation of the logic function using a special ratioless type circuit with precharges on $\phi$I and conditional discharge on $\phi$J where I and J are members of the set {1, 2, 3} and the condition is the logical condition of conduction. This type of circuit is used to reduce power, to reduce cell size and/or to increase circuit speed. A logic symbol 555 with the inscription G infers performing of the logic function using a boot strap load circuit which is later described in detail. Finally, a logic symbol 556 with the inscription OD infers the implementation of that logic function using open-drain circuits. This type of circuit is used in wire-OR logic where only one of several coupled logic gates requires a load.

LOGIC AND CIRCUIT DESCRIPTION OF DATA BLOCK 204

Data block 204 comprises random access memory array shift register system 206 which is further comprised of A register 211, B register 212, C register 213, FA FLAG data storage register 226 and FB FLAG data storage register 227; and decimal arithmetic logic unit 207 and FLAG logic unit 229. Random access memory array shift register system 206 is comprised of a commutator system 545 which operates a 12×14 array or matrix 546 of charge storage cells 10 and 14 dynamic delays 214. Array 546 of charge storage cells 10 and delay cells 214 provide the parallel shifting storage system for three thirteen digit numbers and twenty-six binary FLAGS. The commutator system 545 is comprised of twelve shift register cells 541 (illustrated in detail in FIG. 19) arranged in serial connection by coupling the output of each intermediate cell 541 to the input of the next cell 541 in the series. In this manner cells 541 are capable of distributing common read-write control signals sequentially to adjacent rows of storage array 546. In order for the communication to effect a stable image of rotation corresponding to the desired characteristics of fourteen parallel shifting shift registers of 13-bits in length with one input and one output for each of the fourteen columns of the array, additional means 547 and 544 are provided in the commutation circuit. NAND circuit 547 and delay element 544 eliminates multi-modal oscillations corresponding to circulation of more than one read-write control for rotation. The MOS circuit equivalents of shift register cells 541 is illustrated in FIG. 19. Each shift register cell 541 is comprised of a normal six MOS transistor shift register bit section and additionally includes a load circuit 548 which uses a capacitance boot strapping effect to given superior transient response as compared to conventional load circuits, RP pulse enable 550 from cell 543 and a kill circuit 551 which restricts the time interval of the read-write control pulse to that of clock $\phi 2$. The circuit of cell 543 is illustrated in detail in FIG. 20; circuit 543 develops the timing pulse RP by means of a double inverting amplifier circuit with an input from clock $\phi 2$. The random access memory shift register system embodied in the present invention is further described in copending patent application Ser. No. TI-4607 by Boone et al filed of even date with and assigned to the assignee of the present application. Patent application Ser. No. TI-4607 is incorporated by reference herein.

Again, referring to FIG. 17, A data selector gates 219, B data selector gates 220 and C data selector gates 221 are coupled to and drive input means 510, 511 and 512 of A register 211 (Columns A1, A2, A4 and A8), B register 212 (Columns B1, B2, B4 and B8) and C register 213 (Columns C1, C2, C4 and C8), respectively. Output means 536, 537 and 538 of A register 211, B register 212 and C register 213, respectively complete a recirculation path through 1-bit delay elements 214 back to normal inputs NA of data selector 219, NB of data selector 220 and NC of data selector 221. In addition to the normal paths, Σ gates 218 can be selected by the Σ A control of A data selector 219 or by the Σ B control of B data selector 220 or Σ C control of C data selector 221. In addition to these paths, output means 536 and 537 of A register 211 and B register 212, respectively, transmitted through delay cells 214 are capable of being enabled to B data selector gates 220 and A data selector gates 219, respectively, by means of the exchange control in combination with the Σ A and Σ B controls as previously discussed with respect to FIG. 3. All of the normal Σ and exchange controls are provided to data selectors 219, 220 and 221 by Σ decoder 191 C.

Output means 536 of A register 211 and the output means 538 of C register 213, delayed by the first half of delay cell 214, are selected (normally exclusively) to the plus side of adder 217 by U data selector 215. Similarly, output means 537 of B register 212, delayed by the first half of delay cell 214 and a constant N generated by means 524 are selected (normally exclusively) to the minus side of adder 217 by V data selector 216. Exclusive OR circuits 554 are utilized to conditionally complement the V inputs to adder 217 with respect to their normal (add) polarity at nodes 55 and where the condition of such complementation is the subtract command from output 503 of instruction register 190. U outputs 552 from U data selector 215 and the conditionally complemented V outputs 555 from exclusive OR circuits 554 are added with carry input 557 by ripple carry adder cells 556 to generate the binary sum U plus conditionally complemented V at nodes 558 and a binary carry signal at node 559. The binary sum generated at 558 and carry generated at 559 are corrected by logic unit 563 to a decimal sum and carry at T adder nodes 560 and inter-digit carry node 561 depending upon the state of CK control 564 and CBRS control 565. Controls 564 and 565 are used to select binary coding as opposed to binary-coded-decimal (BCD) operation and to block inter-digit carries in selected fields of the register data circulation.

Outputs 560 of T adder 563 can be selected by Σ data selectors 218 through either the no-shift (NS) or delay elements 566 and left shift (LS) Σ paths. Σ data selectors 218 also allow a right shift path by using the inverted U at input 552 and inverted V input 553. Σ gate control circuit 527 transmits left or right shift commands to the left or right channels of Σ data selector 218 and enables the no-shift path when neither left shift or right shift commands are present. In addition, when a left shift command is present, Σ gate control circuit 527 generates a leading-edge detection of digit mask control 526 which are utilized by left shift delay elements 566 in order to block the first digit to insure insertion of a zero in the least significant digit masked.

The FLAG operation logic 229, in much the same manner as the register operation logic of arithmetic logic unit 207 completes a circulation path generated by data storage array 206. The output means of the FA storage cells 568 and the FB storage cells 569 are the normal recirculating inputs to FA operational logic 519 and FB operational logic 520 of FLAG logic unit 229 and also are transmitted to FLAG selection gates 570 in jump-condition circuit 192. FLAG command inputs 518 from digit mask decoder 195 B allow a particular FLAG to be set, reset, or toggled where the particular FLAG is addressed by the SUB bit of instruction register 503 (FA or FB) and by FMSK control 519 from FLAG mask decoder 195 A (selecting one of thirteen time slots or states). In addition, FA and FB pairs of FLAGs in the same time slot (FMSK) may be exchanged by means of FFLG command 518 from digit mask decoder 195 B. FA and FB operation logic gates 519 and 520 provide FLAG data to FLAG data storage array input means 505 and 506, respectively, to complete the circulation loop for the FLAGs.

LOGIC AND CIRCUIT DESCRIPTION OF CONTROL BLOCK 202

Control block 202 is comprised of instruction register 190, R decoder 191 A, control decoder 191 B, Σ decoder 191 C and jump-condition circuit 192.

Instruction register 190 is comprised of a set of eleven inverters 575 whose inputs are sampled from the program block ROM 208 data outputs 502 once per instruction cycle by boot strapped NAND gate 571. The R, control and Σ decoders 191, as well as other decoders illustrated in FIG. 17 are implemented in programmable logic arrays which are similar in structure to the read only memory (ROM) decoder/encoder circuits with the exception that the decoder is not fully generated. That is, whereas in a N-bit address ROM, $2^N$ locations are decoded; in a PLA only the desired states are decoded. Consider, for example, the PLA illustrated in FIG. 21. A and B inputs 571 are presented to the first half (decoder) of a PLA in both true and complemented polarities. In this example, four product terms (decoder outputs) 572 are presented as inputs to a second (encoder) array. The circuits for the decoder gates 572 and encoder gates 573 are identical shunt gates; that is, logical NAND gates. However, since NAND-NAND logic reduces to AND-OR logic, it is convenient to use sum-of-product notation to describe the PLA circuit implementation where the dependence of a particular product term on a particular input is indicated by a circle at that juncture as for example 574. The circles also correspond to the physical placement of MOS gates by a programmable gate mask utilized during the fabrication of the MOS embodiment.

In accordance with the above symbology for decoders (PLA), Σ decoder 191 C has a four-term decoder circuit 578 and a four-line output encoder section 579 in order to decode the controls 509 from the Σ A and Σ B inputs from output 503 of instruction register 190 and digit mask output 526 of digit mask decoder 195 B and EX exchange command 504 from R decoder 191 A. Similarly, R decoder 191 A converts R field 234 output 503 of instruction 190 into the UV command CU, AU, BV, and EX 504 and the R7 WAIT condition code 580 using a seven-term decode array 581 and five-line output encoder array 582. All terms of the R decode matrix 581 are also conditioned by the true state of the I-bit 230 of instruction register 190 at output 503 and by the FLAG signal 525 in the inverted state. Control decoder 191 B decodes the controls for special keyboard instructions for keyboard condition 513, keyboard WAIT 515 and shift left and right 517. Control decoder 191 B utilizes a twelve-term decoder 583 and a nine-line output encoder array 584.

Jump-condition circuit 192 is comprised of a cross-coupled latch circuit 584 with inputs from the keyboard condition selector gates 514, carry-borrow selector gate 528 and FLAG test and compare gates 570 to the SET side of the latch; a timing input 585 to the reset side of the latch; and a gating circuit 586 to enable jump-condition control 507 to jump gates 508 when a jump instruction is decoded and the jump-condition is true.

LOGIC AND CIRCUIT DESCRIPTION OF TIMING BLOCK 203

Timing block 203 comprises a clock generator 193, a state and digit timing generator 194, digit and FLAG mask decoder arrays 195 and key input logic 196.

All timing information for the calculator system is provided by a square wave generator or oscillator (external to the monolithic semiconductor system illustrated in FIG. 17) which is approximately 250 KHz. Input clock lead C as indicated by the $\phi$ terminal 530 in FIG. 17X provides means for applying the external clock signal to the monolithic calculator system. The basic clock shown in FIG. 17X and the three phase clock shown in FIG. 17Z are both integrated into the monolithic semiconductor system. The square wave $\phi$ is immediately divided by the basic clock circuit of FIG. 17X into half frequency square waves $\phi$B1 and $\phi$B2 of opposite polarities at 531 and 532, respectively. The two phase clock outputs $\phi$B1 and $\phi$B2 are in turn divided by means of 3-bit ring counter 588 to provide the three phase clock $\phi$1L, $\phi$2L and $\phi$3L at 533, 534 and 535, respectively, as the basic clocking system for all of the logic and circuit elements of the calculator system embodiment of FIG. 17.

State and digit timing generator 194 utilizes dynamic shift register elements and PLA logic to provide state counter 589, digit counter 590, state digit comparator 591, state decoder 592 and digit decoder 593. Re-encoded state decoder outputs 594 are distributed to the other functional elements to provide means for arbitrary selection of state timing on each of six independent timing buses. The state decoder outputs 595 are also distributed as required by other circuit elements of FIG. 17. In addition to providing means for deriving the correct feedback for the digit feedback shift register, the outputs of digit decoder 593 drives the output scanner 197.

Thirteen of the product terms in FLAG mask decoder 195 are used to correspond FLAG addresses from the R and Σ fields 234 and 235, respectively of instruction register 190 at output 503 to states one through thirteen as decoded from the SA, SB, SC and SD inputs of state counter S to derive the FLAG addressing signal FMSK at 596 which is then gated to FLAG operation logic 519 and 520 as the timing address of FLAG operations. Similarly, digit mask decoder 195B provides the digit mask signal 526 by associations of M field 232 of instruction register 190 at output 503 and from state counter 589. In this manner set and reset associations of arbitrary correspondence between state and mask for each of the six distinct masks is provided. In addition to the digit mask, digit mask decoder 195B also performs decoding of FLAG controls 518, shift right control 529 and constant N generator 524.

LOGIC AND CIRCUIT DESCRIPTION OF OUTPUT BLOCK 205

Segment output subsystem 198 is comprised of delay elements 542 which buffer output means 536 of the data storage array 206, segment decoder (PLA) 601 and output buffer circuit 602 which drive terminals 576 with 11-decode segment output signals. The segment decoder array has ten product terms for means of decoding numeric information for selective recombination, that is, encoding on numeric segment outputs 602; product terms for decoding FLAG information (for example, error or minus sign); and, product terms and feedback signal 603 to implement zero suppression.

The scan output subsystem 197 is comprised of 11 2-input NAND gates 604 which block digit decoder outputs 593 by digit BLANK signal 606 for inter-digit blanking capability; and, output buffer circuits 605 to drive terminals 576 effecting a scan of the keyboard and display as previously described.

LOGIC, CIRCUIT AND PROGRAM DESCRIPTION OF PROGRAM BLOCK 201

As previously described, program block 201 is comprised of program counter (PC) 209 and read-only memory (ROM) 208. Together, program counter 209 and read-only memory 208 perform the address-modification required for each instruction, and provide the control block 202 with, for example, in the described embodiment an 11-bit input to the instruction register (IR) 190.

The address modification required by a current instruction is either no modification for WAIT operations, binary add one for normal incremented operations and jump operations that are not executed, or replacement of the entire 9-bit program counter with nine bits from instruction register 190 for jump operations which are executed. The no modification for WAIT operations and binary add one for normal incremented operations and jump operations which are not executed are satisfied by means of a serial input 651 to the MSD of program counter 209 from key input logic 196 in timing block 203 which either recirculates the LSD output 652 of program counter 209 or adds one to the LSD and circulates it to the MSB of the program counter 209, respectively. In either case the circulation is synchronous to the instruction cycle. The replacement of the entire 9-bit count with nine bits from instruction register 190 for jump operations which are executed is satisfied by means of parallel strobing of output 503 of instruction register 190 by the output of condition circuit 192 into the inputs 653 of all bits of program counter 209 simultaneously during state S12 of the instruction cycle.

The output of the instruction word to the control block instruction register 190 is strobed by NAND gate 654 providing a new input to instruction register 190 every instruction cycle during state S13. The serial circulation of program counter 190 is provided by means of conventional shift register bits 656 clocked by NAND gates 655 during S3 through S12. The TOM is comprised of a 1-out-of-64 decoder per instruction register 190 bit output 503 driving an array of 5 NAND gates per bit or a total of 55 NAND gates. One of these five gates is addressed by a 1-out-of-5 encoder for each bit. Hence, means is provided for storage of a maximum of 320 11-bit words, and a select (decode and encode) is provided for random addressing of any one word. Program block 201 in the present calculator embodiment is comprised of programmable read-only memory 208 to store a fixed program; in further embodiments, however, a read-write memory replacing memory 208 would provide means for continuously varying the stored program and hence change the operation of the calculator system.

The resident program in one embodiment of the variable function calculator system provides means for the calculator operation characteristics called "Combination B" shown in Table VIII. The corresponding flowcharts for this embodiment are illustrated in FIGS. 22A to T; the resulting linear program is shown in Table VI; and the hexadecimal ROM code is shown in Table V. Finally a logic simulation result for a portion of an executing problem example is shown in Table VII.

Referring to FIG. 22, the calculator program logic flow is as follows:

1802 ROM ASSEMBLY...COMBINATION B (+-=) TABLE V

| ROM CODE START | END | | OBJECT CODE |
|---|---|---|---|
| 000 | 010 | [illegible] | [illegible] |
| 011 | 021 | [illegible] | [illegible] |
| 022 | 032 | [illegible] | [illegible] |
| 033 | 043 | [illegible] | [illegible] |
| 044 | 054 | [illegible] | [illegible] |
| 055 | 065 | [illegible] | [illegible] |
| 066 | 075 | [illegible] | [illegible] |
| 077 | 087 | [illegible] | [illegible] |
| 088 | 098 | [illegible] | [illegible] |
| 099 | 0A9 | [illegible] | [illegible] |
| 0AA | 0BA | [illegible] | [illegible] |
| 0BB | 0CB | [illegible] | [illegible] |
| 0CC | 0DC | [illegible] | [illegible] |
| 0DD | 0ED | [illegible] | [illegible] |
| 0EE | 0FE | [illegible] | [illegible] |
| 0FF | 10F | [illegible] | [illegible] |
| 110 | 120 | [illegible] | [illegible] |
| 121 | 131 | [illegible] | [illegible] |
| 132 | 142 | [illegible] | [illegible] |
| 143 | 153 | [illegible] | [illegible] |
| 154 | 164 | [illegible] | [illegible] |
| 165 | 175 | [illegible] | [illegible] |
| 176 | 186 | [illegible] | [illegible] |
| 187 | 197 | [illegible] | [illegible] |
| 198 | 1A8 | [illegible] | [illegible] |
| 1A9 | 1B9 | [illegible] | [illegible] |
| 1BA | 1CA | [illegible] | [illegible] |
| 1CB | 1DB | [illegible] | [illegible] |
| 1DC | 1EC | [illegible] | [illegible] |
| 1ED | 1FD | [illegible] | [illegible] |
| 1FE | 1FF | [illegible] | [illegible] |

TABLE VI

```
000  111 0100 1101   CLR     ZAFL
001  111 0110 1101           ZAFL
002  100 0000 0001           CLA     ALL
003  100 0000 0011           CLC     ALL
004  100 0000 0000   LOCK    XOII
005  111 0110 0010           TFF     2     MAKING SURE THAT ...
006  100 0000 0000           XOII
007  100 0110 0000           SCAN
008  010 0000 0100           AF      LOCK     KEY IS NOT RELEASED YET
009  100 0000 0000   IDLE    XOII
00A  100 0110 0000           SCAN
00B  100 0000 0000           XOII
00C  000 0000 1001           AF      IDLE     ... FOUND ...
00D  100 0000 0000           XOII
00E  100 0000 0000           XOII
00F  100 0110 0000           SCAN
010  000 0000 1001           AF      IDLE     NOT FOUND ANYTHING
        ------INPUT ROUTINE-----------
011  111 1110 1001           TFF     0     OVERFLOW FLAG
012  010 0000 0100           AF      LOCK     ... MUST DO A CLEAR
013  100 0001 1100           SDGX
014  010 0000 0000           AZ      CE    CLEAR ENTRY
015  010 0000 0000           AZ      DPT
016  010 0000 0000           AZ      DLFD     ... KEY
017  010 0000 0000           AZ      ...
018  010 0000 0100           AZ      LOCK     ... KEY
019  010 0000 0000           AZ      ...
01A  010 0000 0000           AZ      ...      ... KEY
01B  010 0000 0000           AZ      DIVI
01C  010 0000 0000           AZ      MULT
01D  010 0000 0000           AZ      DIFD     ... KEY
        ------ DATA ENTRY ... ------------
01E  111 0000 0011           SFA     3     FLAG ...     DATA ENTRY ...
01F  111 1110 0100   D3      TFB     4     FLAG DISPLAY
020  000 0000 0000           AO      D1
021  100 0000 0001   D2      CLA     ALL
022  111 0110 0100           TFB     4     FLAG DISPLAY
023  111 0110 1010           TFA     10    FLAG SIGN OF MNT OF A
024  111 0110 1011           TFB     11    FLAG SIGN OF EXP OF A
025  111 1100 0010           TFA     2

026  000 0000 0000           AO      D1
027  111 1100 0001           TFA     1
028  010 0000 0000           AZ      D1
029  111 1010 1010           KFA     10    ... NEGATIVE ...
02A  111 1100 0011   D1      TFA     3     FLAG ...
02B  010 0000 0000           AZ      D7
02C  101 1100 0001           DATA
02D  101 1110 0101           ...     DPT1     ... EFFECTIVE
02E  000 0000 0100           AO      LOCK     ALWAYS BRANCH
        ------DIGIT ENTRY-----------
02F  111 0100 0011   D7      TFA     3     ...
030  101 0110 0100           CAX     MSD1
031  000 0000 0000           AO      D5    DIGIT OVERFLOW
032  110 0010 0100           CAX     DPT7
033  010 0000 0000           AZ      D6
034  111 0010 1000   D5      SFB     2
035  000 0000 0100           AO      LOCK     DIGIT OVERFLOW
036  111 1110 0011   D6      TFB     3     DPT FLAG
037  000 0000 0000           AO      D4
038  101 1100 0101           AAKA    DPT1
039  100 1000 0101   D4      SLLA    DGIT     LSD OF A IS MADE ...
03A  100 0000 0000           XOII
03B  100 1110 0001           SDCI
03C  100 1100 0101           AAKA    LSD1
03D  010 0000 0100           AZ      LOCK     ALWAYS BRANCH
        ------DPT ENTRY---------
03E  111 0010 0011   DPT     SFA     3     DPT FLAG
03F  000 0001 1111           AO      D1       ALWAYS BRANCH
        ------------------------
040  111 0010 0010   MIN     SFA     2     SUBTRACT COMMAND
041  111 0110 0001   PLFD    ZFB     1     ... OP 1
042  111 1100 0001           TFA     1     ... OP 1
043  000 0000 0000           AO      D00
044  111 0000 0000   DUS     SFA     0     ...FLAG
045  000 0000 0000           AO      DCF      ALWAYS BRANCH
046  111 0010 0010   DIVI    SFB     2
047  111 0010 0001   MULT    SFB     1
048  111 1100 0001           TFA     1     ... OP 1
049  000 0000 0000           AO      D06
04A  111 1110 0100   D02     TF      4     DISPLAY FLAG
04B  000 0100 0100           AO      D05
04C  111 1110 0001           TFB     1     ... FLAG 1
04D  010 0000 0000           AZ      D01      ... LAST ... EFFECTIVE
04E  100 0000 0111   DD4     AAKC    ALL
04F  111 0100 1010           TFA     10    ... OF ...
050  111 1110 1010           TFB     10    ...
051  000 0000 0000           AO      D01
052  111 0000 1010           SFA     10
053  110 1100 0001   C01     XFA     1     EXCHANGE CURRENT ... WITH ...
054  110 1100 0010           XFB     2     EXCHANGE CURRENT ... WITH ...
055  111 0110 0011   D03     TFB     3     ... FLAG
056  111 0010 0100           SFB     4     FLAG DISPLAY
057  000 0000 0100           AO      LOCK     ALWAYS BRANCH
        ------CLEAR ENTRY---------
```

TABLE VI

```
258  111 0110 0011    CF      ZFA   4     FLAG OUT
259  111 0110 1000            ZFA   8
25A  000 0010 0001            BR    02    ALWAYS BRANCH
                      ------ CHANGE SIGN-------
25B  111 1010 1010    S       SFA   10
25C  000 0000 0100            BR    LOCK  ALWAYS BRANCH
                      ------ADD AND SUBTRACT---------------
25D  110 1000 1011    A/S     TFA   11    COMPARING EXP SIGNS
25E  000 0000 0000            BR    AS2
25F  100 0111 0000            CSA   EXP
260  000 0000 0000            BR    AS3
261  100 0001 1000            EXAB  ALL
262  110 1100 1010            XFA   10
263  100 0111 0011    AS3     SABC  EXP
264  111 1100 1011            TFA   11    SIGN OF EXP
265  000 0000 0000            BR    AS4
266  100 0001 1000            EXAB  ALL
267  110 1100 1010            XFA   10
268  101 1010 1111    AS4     SCXC  EXP1
269  010 0000 0000            BZ    AS5
26A  100 1010 1010            SCLB  MOUT
26B  000 0110 1000            BR    AS4   ALWAYS BRANCH
26C  111 1100 1011    AS2     TFA   11
26D  010 0000 0000            BZ    AS5
26E  100 0001 1000    AS7     EXAB  ALL
26F  110 1100 1010            XFA   10
270  110 1100 1011            XFA   11
271  101 0010 0100    AS6     CAK   M11
272  010 0110 1110            BZ    AS7
273  100 0101 0011            ABAC  EXP
274  000 0110 1000            BR    AS6   ALWAYS BRANCH
275  100 1011 0000    AS5     CAK   MOUT
276  000 0000 0000            BR    AS9
277  100 0001 1000            EXAB  ALL
278  110 1100 1010            XFA   10
279  110 1000 1010    AS9     CFA   10
27A  010 0000 0000            BZ    AS8
27B  100 1011 0001            SABA  MOUT
27C  000 0000 0000            BR    DNE   ALWAYS BRANCH
27D  100 1001 0001    AS8     SABA  MOUT
                      ------DENORMALIZING A NUMBER-----------
27E  101 0010 0100    DNE     CAK   M11
27F  010 0000 0000            BZ    A91   DATA IS ZERO
280  101 0100 0010            MSR1
281  100 1000 1010            SLLB  MOUT
282  100 1011 0000            CAK   M21   IS MR OF A NORMALIZED ?
283  010 0000 0000            BZ    A2    MSD OF A ZERO
284  100 1010 0101            SLLB  MOUT
285  111 1110 1011            TFB   11    SIGN OF EXP
286  010 0000 0000            BZ    A13
287  101 1000 0101            SAKA  EXP1
288  110 0010 0100    A2      CAK   DGT7
289  010 0000 0000            CZ    A3    DGT OF A LESS THAN 7
28A  101 0110 0100            CAK   M21
28B  000 0000 0000            BR    A3
28C  100 1000 0101            SLLA  MOUT
28D  111 1110 1011            TFB   11    SIGN OF EXP
28E  010 0000 0000            BZ    A4    EXP OF A IS -
28F  101 1010 0100    A5      CAK   EXP1
290  010 0000 0000            BZ    A6    EXP OF A IS ZERO
291  101 1010 0101            SAKA  EXP1
292  000 1000 1000            BR    A2    ALWAYS BRANCH
293  101 1010 0101    A13     SAKA  EXP1
294  000 1000 1000            BR    A2    ALWAYS BRANCH
295  101 1100 0101    A3      SAKA  DGT1
296  101 0110 0100            CAK   M01
297  010 0000 0000            BZ    A9    MS OF A IS ZERO
298  111 1110 1011            TFB   11    SIGN OF EXP
299  010 1000 1111            BZ    A6    SIGN OF EXP OF A IS NEGATIVE
29A  110 0110 0100    A6      CAK   EXP7
29B  010 0000 0000            CZ    A7    EXP OF A LESS THAN 7
29C  111 0010 1001            SFA   2     OVERFLOW
29D  110 0110 0101            SAKA  EXP7
29E  000 0000 0000            BR    A7    ALWAYS BRANCH
29F  111 1010 1011    A4      SFA   11    CHANGE SIGN OF EXP OF A
2A0  101 1000 0101    A7      SAKA  EXP1
2A1  000 1000 1000            BR    A2    ALWAYS BRANCH
2A2  100 1000 0101    A8      SLLA  MOUT
2A3  000 1000 1000            BR    A2    ALWAYS BRANCH
2A4  100 0000 0001    A91     CLA   ALL
2A5  111 1100 0000    A9      TFA   0     D-FLAG
2A6  000 0000 0000            BR    DEST
2A7  100 0001 1000            EXAB  ALL
2A8  100 0000 1101            ACKB  ALL
2A9  100 0000 1011            ABKC  ALL
2AA  110 1100 1011            XFA   11
2AB  111 1100 1000            TFA   8     A SPECIAL FLAG FOR THE ROUTINE
2AC  111 1000 1000            FFA   8
2AD  000 0111 1110            BR    DNE
2AE  111 0100 0000            ZFA   0     D-FLAG
2AF  111 1100 0001            TFA   1
2B0  000 0101 1101            BR    A/S
```

TABLE VI

```
                                    ------MULTIPLY AND DIVIDE---------
0B1   111 1100 0010     M/D         TFA    2      PREV OP 2
0B2   000 0000 0010                 BR     M1
0B3   111 1100 0111                 TFA    7      OPER2 CONTAINING A CONSTANT ?
0B4   010 0000 0000                 BZ     M1
0B5   100 0001 1000                 EXA4   ALL
0B6   110 1100 1011                 CFA    11
0B7   111 0101 0111     M1          TFA    7      RESET THE CONSTANT FLAG IN CASE IT IS CLEARED
0B8   100 0000 0000                 [illegible]
0B9   100 1000 0000                 KOCD
0BA   000 0000 0000                 BR     M22
0BB   111 0000 0111                 SFA    7      OPER2 CONTAINS A CONSTANT
0BC   110 1100 1010     M22         CFA    10
0BD   111 0110 1010                 ZFA    10
0BE   010 0000 0000                 BZ     12
0BF   111 0010 1010                 SFA    10
0C0   110 1000 1011     M2          CFA    11
0C1   000 0000 0000                 BR     M20    UNLIKE ? SIGNS
0C2   111 1100 0010                 TFA    2      OP 2
0C3   010 0000 0000                 BZ     M3     /
0C4   100 0101 0001     M21         SAKA   EXP
0C5   000 0000 0000                 BR     M4     ALWAYS BRANCH
0C6   111 1100 0010     M20         TFA    2      OP 2
0C7   010 1100 0100                 BZ     M21    /
0C8   100 0111 1000                 CAK    EXP
0C9   000 0000 0000                 BR     M3
0CA   111 1010 1011                 CFA    11
0CB   100 0111 0001     M3          SAKA   EXP
0CC   000 0000 0000                 BR     M4
0CD   100 0101 0001                 AAKA   EXP
0CE   100 0001 1000                 EXA4   ALL
0CF   100 0111 0010                 SAKA   EXP
0D0   100 0001 1000                 EXA4   ALL
0D1   111 1100 0010                 TFA    2      OP 2
0D2   000 0000 0000                 BR     M6
0D3   111 1010 1011                 SFA    11
0D4   101 0010 0100     M4          CAK    M11
0D5   010 0000 0000                 BZ     M5     TAKE CARE OF ..., ..., AND ... THE RESULT IS 0
0D6   100 1000 0111                 SAKC   MONT
0D7   100 1000 0001                 CLA    MONT
0D8   111 1100 0010                 TFA    2      PREV OP 2
0D9   000 0000 0000                 BR     M5     MULTIPLY
0DA   100 1011 0100     M6          CCS    MONT
0DB   010 0000 0000                 BZ     M7
0DC   100 1011 0111                 SCHC   MONT
0DD   101 0000 0101                 SAKA   M11
0DE   000 1101 1010                 BR     M5
0DF   101 0010 0101                 SAKA   M11    OVFLOW
0E0   111 0010 1001                 SFA    9
0E1   000 0000 0100                 BR     LOOP   ALWAYS BRANCH
0E2   101 0110 0100     M7          CAK    MSD1
0E3   000 0000 0000                 BR     M8     DIVISION DONE, WITH OR WITHOUT REMAINDER
0E4   101 0010 0100                 CAK    M11
0E5   000 0000 0000                 BR     M22
0E6   111 1110 1011                 TFA    11     SIGN OF EXP OF A
0E7   010 0000 0000                 BZ     M24
0E8   101 1010 0101                 CAK    EXP1
0E9   000 0000 0000                 BR     M25
0EA   111 0010 1011                 SFA    11
0EB   101 1000 0101     M24         SAKA   EXP1
0EC   000 0000 0000                 BR     M23    ALWAYS BRANCH
0ED   101 1010 0101     M25         SAKA   EXP1
0EE   100 1000 0101     M23         SFLA   MONT
0EF   101 0010 1100                 CCK    M11
0F0   010 1110 0010                 BZ     M7
0F1   100 1000 1111                 SLLC   MONT
0F2   000 1101 1010                 BR     MA     ALWAYS BRANCH
0F3   100 1010 1111     M9          SHLC   MONT
0F4   101 0010 1100                 CCK    M11
0F5   010 0000 0000                 BZ     M8
0F6   100 1010 0101                 SHLA   MONT
0F7   100 1110 1111     M8          SCKC   LSD1
0F8   010 1111 0011                 BZ     M9
0F9   100 1001 0001                 SARA   MONT
0FA   000 1111 0111                 BR     M8     ALWAYS BRANCH
0FB   100 0000 1011     M8          ABKC   ALL
0FC   111 1110 0001                 TFA    1      CHEK OP 1
0FD   000 0000 0000                 BR     M12
0FE   111 0100 0111                 ZFA    7
0FF   111 1100 0111     M12         TFA    7      CONSTANT IN OPER2 ?
100   010 0111 1110                 BZ     DWE
101   111 0100 0001                 ZFA    1      PREV OP 1
102   111 0100 0010                 ZFA    2      RESET PREV OP 2
103   000 0111 1110                 BR     0FE    ALWAYS BRANCH
                                    ------POST NORMALIZATION ROUTINE---------
104   100 1010 0101     P2          SHLA   MONT
105   101 1010 0100     POST        CAK    EXP1
106   010 0000 0000                 BZ     P1
107   101 1010 0101                 SAKA   EXP1
108   111 1110 1011                 TFA    11     SIGN OF EXP OF A
109   011 0000 0100                 BZ     P2
10A   110 0110 0100                 CAK    EXP2
10B   010 0000 0000                 BZ     P7
10C   110 0110 0101                 SAKA   EXP2
```

TABLE VI

```
100  111 0010 1001            SEP   0    OVERFLOW
10E  001 0000 0101            B1    POST ALWAYS BRANCH
10F  101 1110 0101    07      SAKA  DPT1
110  001 0000 0101            B1    POST    ALWAYS BRANCH
111  111 0110 1011    01      TER   11
112  111 1110 1001            TEA   9    OVERFLOW
113  010 0000 0000            B7    D26   [illegible]
114  100 1110 0100    05      CSK   LSD1
115  000 0000 0000            B0    06
116  101 1110 0100            CAK   DPT1
117  010 0000 0000            B7    06
118  100 1010 0101            SRLA  MONT    GETTING RID OF TRAILING ZEROS
119  101 1110 0101            SAKA  DPT1
11A  001 0001 0100            B0    05    ALWAYS BRANCH
11B  111 1110 0001    06      TER   1    [illegible]
11C  010 0000 0000            B7    D26   INTERMEDIATE RESULT IN FLOATING MODE
11D  100 0001 1000            EXAB  ALL
11E  100 0000 0001            CLA   ALL
11F  100 0000 0000            ADD1
120  100 0010 0000            SRCR
121  010 0000 0000            B7    03    FIXED POINT MODE
122  100 0001 1000            EXAB  ALL   FLOATING MODE
123  111 1100 0111    026     TFA   7    CONSTANT IN CHAR 2
124  010 0101 0101            B7    0D3
125  000 0100 1110            B0    0D4    ALWAYS BRANCH
126  100 0000 0000    03      WAIT
127  100 1100 0001            SRCR
128  000 0000 0000            B0    NEXT
129  100 1100 0101    NEXT    SAKA  LSD1    [illegible]
12A  100 0010 0101            SRLA  ALL   DESIRED DECIMAL PLACE GOES TO EXP DE 1
12B  100 0000 1010            SLLA  ALL   ACTUAL DECIMAL PLACE GOES TO EXP DE 1
12C  100 1010 1010            SRLA  MONT
12D  100 0111 0000            CAB   EXP
12E  100 0001 1000            EXAB  ALL
12F  000 0000 0000            B0    06
130  101 1010 0101    09      SAKA  EXP1
131  100 1010 0101            SRLA  MONT
132  100 0001 1000            EXAB  ALL
133  100 0111 0000            CAB   EXP
134  100 0001 1000            EXAB  ALL
135  011 0011 0000            B3    0A
136  100 1000 0101    0A      SLLA  MONT
137  100 0010 0101            SRLA  ALL
138  001 0010 0011            B0    0D4    ALWAYS BRANCH
139  100 0111 0000    0A      CAB   EXP
13A  001 0011 0110            B1    0D    DESIRED DPT = ACTUAL DPT
13B  101 0110 0100            CAK   MSD1   [illegible]
13C  001 0011 0110            B1    0D    CAN NOT ADJUST TO EQUAL DPT
13D  100 1000 0101            SLLA  MONT
13E  101 1000 0101            SAKA  EXP1
13F  001 0011 1001            B1    06    ALWAYS BRANCH
```

TABLE VII . . . EXAMPLE INSTRUCTION TRACE . . . DATA CARD 157 ($7.79 -= $) . . .

| PC | I-REG | [illegible] | [illegible] | [illegible] | FLAGS (A) | FLAGS (B) | [illegible] | [illegible] | [illegible] | [illegible] | [illegible] |
|---|---|---|---|---|---|---|---|---|---|---|---|
| 00F | 45? | [illegible] | [illegible] | [illegible] | [illegible] | [illegible] | [illegible] | [illegible] | [illegible] | [illegible] | [illegible] |
| 010 | [illegible] | [illegible] | [illegible] | [illegible] | [illegible] | [illegible] | [illegible] | [illegible] | [illegible] | [illegible] | [illegible] |
| 011 | 7?3 | [illegible] | [illegible] | [illegible] | [illegible] | [illegible] | [illegible] | [illegible] | [illegible] | [illegible] | [illegible] |
| 012 | 2?4 | [illegible] | [illegible] | [illegible] | [illegible] | [illegible] | [illegible] | [illegible] | [illegible] | [illegible] | [illegible] |
| 013 | 41C | [illegible] | [illegible] | [illegible] | [illegible] | [illegible] | [illegible] | [illegible] | [illegible] | [illegible] | [illegible] |
| 014 | 253 | [illegible] | [illegible] | [illegible] | [illegible] | [illegible] | [illegible] | [illegible] | [illegible] | [illegible] | [illegible] |
| 015 | 233 | [illegible] | [illegible] | [illegible] | [illegible] | [illegible] | [illegible] | [illegible] | [illegible] | [illegible] | [illegible] |
| 016 | 23C | [illegible] | [illegible] | [illegible] | [illegible] | [illegible] | [illegible] | [illegible] | [illegible] | [illegible] | [illegible] |
| 017 | 256 | [illegible] | [illegible] | [illegible] | [illegible] | [illegible] | [illegible] | [illegible] | [illegible] | [illegible] | [illegible] |
| 018 | 239 | [illegible] | [illegible] | [illegible] | [illegible] | [illegible] | [illegible] | [illegible] | [illegible] | [illegible] | [illegible] |
| 019 | 23C | [illegible] | [illegible] | [illegible] | [illegible] | [illegible] | [illegible] | [illegible] | [illegible] | [illegible] | [illegible] |
| 01A | 224 | [illegible] | [illegible] | [illegible] | [illegible] | [illegible] | [illegible] | [illegible] | [illegible] | [illegible] | [illegible] |
| 01B | 241 | [illegible] | [illegible] | [illegible] | [illegible] | [illegible] | [illegible] | [illegible] | [illegible] | [illegible] | [illegible] |
| 01C | 242 | [illegible] | [illegible] | [illegible] | [illegible] | [illegible] | [illegible] | [illegible] | [illegible] | [illegible] | [illegible] |
| 01D | 23C | [illegible] | [illegible] | [illegible] | [illegible] | [illegible] | [illegible] | [illegible] | [illegible] | [illegible] | [illegible] |
| 01E | 7?3 | [illegible] | [illegible] | [illegible] | [illegible] | [illegible] | [illegible] | [illegible] | [illegible] | [illegible] | [illegible] |
| 01F | 754 | [illegible] | [illegible] | [illegible] | [illegible] | [illegible] | [illegible] | [illegible] | [illegible] | [illegible] | [illegible] |
| 020 | ?25 | [illegible] | [illegible] | [illegible] | [illegible] | [illegible] | [illegible] | [illegible] | [illegible] | [illegible] | [illegible] |
| 021 | 4?1 | [illegible] | [illegible] | [illegible] | [illegible] | [illegible] | [illegible] | [illegible] | [illegible] | [illegible] | [illegible] |
| 022 | 754 | [illegible] | [illegible] | [illegible] | [illegible] | [illegible] | [illegible] | [illegible] | [illegible] | [illegible] | [illegible] |
| 023 | 75A | [illegible] | [illegible] | [illegible] | [illegible] | [illegible] | [illegible] | [illegible] | [illegible] | [illegible] | [illegible] |
| 024 | 758 | [illegible] | [illegible] | [illegible] | [illegible] | [illegible] | [illegible] | [illegible] | [illegible] | [illegible] | [illegible] |
| 025 | 7?3 | [illegible] | [illegible] | [illegible] | [illegible] | [illegible] | [illegible] | [illegible] | [illegible] | [illegible] | [illegible] |
| 026 | 23A | [illegible] | [illegible] | [illegible] | [illegible] | [illegible] | [illegible] | [illegible] | [illegible] | [illegible] | [illegible] |
| 02A | 743 | [illegible] | [illegible] | [illegible] | [illegible] | [illegible] | [illegible] | [illegible] | [illegible] | [illegible] | [illegible] |
| 02B | 564 | [illegible] | [illegible] | [illegible] | [illegible] | [illegible] | [illegible] | [illegible] | [illegible] | [illegible] | [illegible] |
| 02C | 02F | [illegible] | [illegible] | [illegible] | [illegible] | [illegible] | [illegible] | [illegible] | [illegible] | [illegible] | [illegible] |
| 02D | 624 | [illegible] | [illegible] | [illegible] | [illegible] | [illegible] | [illegible] | [illegible] | [illegible] | [illegible] | [illegible] |
| 02F | 231 | [illegible] | [illegible] | [illegible] | [illegible] | [illegible] | [illegible] | [illegible] | [illegible] | [illegible] | [illegible] |
| 031 | 753 | [illegible] | [illegible] | [illegible] | [illegible] | [illegible] | [illegible] | [illegible] | [illegible] | [illegible] | [illegible] |
| 032 | 234 | [illegible] | [illegible] | [illegible] | [illegible] | [illegible] | [illegible] | [illegible] | [illegible] | [illegible] | [illegible] |
| 034 | 495 | [illegible] | [illegible] | [illegible] | [illegible] | [illegible] | [illegible] | [illegible] | [illegible] | [illegible] | [illegible] |

| PC | I-REG | A-REG | B-REG | C-REG | FLAGS (A) | FLAGS (B) | C | KP | KN | KO | KQ |
|---|---|---|---|---|---|---|---|---|---|---|---|
| | | | | | | | 1 | 0 | 0 | 0 | 0 |
| 035 | 400 | 000000000001 | 000000000000 | 000003249202 | 0100000000000 | 0000000000000 | 0 | 0 | 5 | 0 | 0 |
| 036 | 451 | 000000000401 | 000000000000 | 000003249202 | 0100000000000 | 0000000000000 | 0 | 0 | 5 | 0 | 0 |
| 037 | 405 | 000000000700 | 000000000000 | 000003249202 | 0100000000000 | 0000000000000 | 1 | 0 | 5 | 0 | 0 |
| 038 | 204 | 000000000700 | 000000000000 | 000003249202 | 0100000000000 | 0000000000000 | 1 | 0 | 1 | 0 | 0 |
| 004 | 400 | 000000000700 | 000000000000 | 000003249202 | 0100000000000 | 0000000000000 | 1 | 0 | 0 | 0 | 0 |
| 005 | 762 | 000000000700 | 000000000000 | 000003249202 | 0100000000000 | 0000000000000 | 1 | 0 | 0 | 0 | 0 |
| 006 | 400 | 000000000700 | 000000000000 | 000003249202 | 0100000000000 | 0000000000000 | 1 | 0 | 0 | 0 | 0 |
| 007 | 460 | 000000000700 | 000000000000 | 000003249202 | 0100000000000 | 0000000000000 | 1 | 0 | 0 | 0 | 0 |
| 008 | 204 | 000000000700 | 000000000000 | 000003249202 | 0100000000000 | 0000000000000 | 1 | 0 | 0 | 0 | 0 |
| 009 | 400 | 000000000700 | 000000000000 | 000003249202 | 0100000000000 | 0000000000000 | 0 | 0 | 0 | 0 | 0 |
| 00A | 460 | 000000000700 | 000000000000 | 000003249202 | 0100000000000 | 0000000000000 | 0 | 0 | 0 | 0 | 0 |
| 00B | 400 | 000000000700 | 000000000000 | 000003249202 | 0100000000000 | 0000000000000 | 1 | 0 | 0 | 0 | 0 |
| 00C | 009 | 000000000700 | 000000000000 | 000003249202 | 0100000000000 | 0000000000000 | 1 | 0 | 0 | 0 | 0 |
| 00D | 400 | 000000000700 | 000000000000 | 000003249202 | 0100000000000 | 0000000000000 | 1 | 0 | 0 | 0 | 0 |
| 00E | 400 | 000000000700 | 000000000000 | 000003249202 | 0100000000000 | 0000000000000 | 1 | 0 | 0 | 0 | 0 |
| 00F | 460 | 000000000700 | 000000000000 | 000003249202 | 0100000000000 | 0000000000000 | 1 | 0 | 0 | 0 | 0 |
| 010 | 009 | 000000000700 | 000000000000 | 000003249202 | 0100000000000 | 0000000000000 | 1 | 0 | 0 | 0 | 0 |
| 011 | 7E9 | 000000000700 | 000000000000 | 000003249202 | 0100000000000 | 0000000000000 | 1 | 0 | 0 | 0 | 0 |
| 012 | 204 | 000000000700 | 000000000000 | 000003249202 | 0100000000000 | 0000000000000 | 1 | 0 | 0 | 0 | 0 |
| 013 | 41C | 000000000700 | 000000000000 | 000003249202 | 0100000000000 | 0000000000000 | 1 | 0 | 0 | 0 | 0 |
| 014 | 253 | 000000000700 | 000000000000 | 000003249202 | 0100000000000 | 0000000000000 | 1 | 0 | 0 | 7 | 0 |
| 015 | 239 | 000000000700 | 000000000000 | 000003249202 | 0100000000000 | 0000000000000 | 1 | 0 | 0 | 7 | 0 |
| 039 | 723 | 000000000700 | 000000000000 | 000003249202 | 0100000000000 | 0001000000000 | 1 | 0 | 0 | 7 | 0 |
| 03A | 01F | 000000000700 | 000000000000 | 000003249202 | 0100000000000 | 0001000000000 | 1 | 0 | 0 | 7 | 0 |
| 01F | 7E4 | 000000000700 | 000000000000 | 000003249202 | 0100000000000 | 0001000000000 | 1 | 0 | 0 | 7 | 0 |
| 020 | 025 | 000000000700 | 000000000000 | 000003249202 | 0100000000000 | 0001000000000 | 1 | 0 | 0 | 7 | 0 |
| 025 | 7C3 | 000000000700 | 000000000000 | 000003249202 | 0100000000000 | 0001000000000 | 1 | 0 | 0 | 7 | 0 |
| 026 | 224 | 000000000700 | 000000000000 | 000003249202 | 0100000000000 | 0001000000000 | 1 | 0 | 0 | 7 | 0 |
| 027 | 5C1 | 000000000701 | 000000000000 | 000003249202 | 0100000000000 | 0001000000000 | 1 | 0 | 0 | 7 | 0 |
| 028 | 5E8 | 000000000700 | 000000000000 | 000003249202 | 0100000000000 | 0001000000000 | 1 | 0 | 0 | 7 | 0 |
| 029 | 204 | 000000000700 | 000000000000 | 000003249202 | 0100000000000 | 0001000000000 | 1 | 0 | 0 | 0 | 0 |
| 004 | 400 | 000000000700 | 000000000000 | 000003249202 | 0100000000000 | 0001000000000 | 1 | 0 | 0 | 0 | 0 |
| 005 | 762 | 000000000700 | 000000000000 | 000003249202 | 0100000000000 | 0001000000000 | 1 | 0 | 0 | 0 | 0 |
| 006 | 400 | 000000000700 | 000000000000 | 000003249202 | 0100000000000 | 0001000000000 | 1 | 0 | 0 | 0 | 0 |
| 007 | 460 | 000000000700 | 000000000000 | 000003249202 | 0100000000000 | 0001000000000 | 1 | 0 | 0 | 0 | 0 |
| 008 | 204 | 000000000700 | 000000000000 | 000003249202 | 0100000000000 | 0001000000000 | 1 | 0 | 0 | 0 | 0 |
| 009 | 400 | 000000000700 | 000000000000 | 000003249202 | 0100000000000 | 0001000000000 | 0 | 0 | 0 | 1 | 0 |
| 00A | 460 | 000000000700 | 000000000000 | 000003249202 | 0100000000000 | 0001000000000 | 0 | 0 | 0 | 0 | 0 |
| 00B | 400 | 000000000700 | 000000000000 | 000003249202 | 0100000000000 | 0001000000000 | 1 | 1 | 0 | 0 | 0 |
| 00C | 009 | 000000000700 | 000000000000 | 000003249202 | 0100000000000 | 0001000000000 | 1 | 0 | 0 | 0 | 0 |
| 00D | 400 | 000000000700 | 000000000000 | 000003249202 | 0100000000000 | 0001000000000 | 1 | 0 | 0 | 0 | 0 |
| 00E | 400 | 000000000700 | 000000000000 | 000003249202 | 0100000000000 | 0001000000000 | 0 | 0 | 0 | 0 | 0 |
| 00F | 460 | 000000000700 | 000000000000 | 000003249202 | 0100000000000 | 0001000000000 | 1 | 0 | 0 | 0 | 0 |
| 010 | 009 | 000000000700 | 000000000000 | 000003249202 | 0100000000000 | 0001000000000 | 1 | 0 | 0 | 0 | 0 |
| 011 | 7E9 | 000000000700 | 000000000000 | 000003249202 | 0100000000000 | 0001000000000 | 1 | 0 | 0 | 1 | 0 |
| 012 | 204 | 000000000700 | 000000000000 | 000003249202 | 0100000000000 | 0001000000000 | 1 | 0 | 0 | 0 | 0 |
| 013 | 41C | 000000000700 | 000000000000 | 000003249202 | 0100000000000 | 0001000000000 | 1 | 0 | 0 | 0 | 0 |
| 014 | 253 | 000000000700 | 000000000000 | 000003249202 | 0100000000000 | 0001000000000 | 1 | 0 | 0 | 0 | 0 |
| 015 | 239 | 000000000700 | 000000000000 | 000003249202 | 0100000000000 | 0001000000000 | 1 | 0 | 0 | 4 | 0 |
| 016 | 23C | 000000000700 | 000000000000 | 000003249202 | 0100000000000 | 0001000000000 | 1 | 0 | 0 | 5 | 0 |
| 017 | 256 | 000000000700 | 000000000000 | 000003249202 | 0100000000000 | 0001000000000 | 1 | 0 | 0 | 4 | 0 |
| 018 | 239 | 000000000700 | 000000000000 | 000003249202 | 0100000000000 | 0001000000000 | 1 | 0 | 1 | 0 | 0 |
| 019 | 23C | 000000000700 | 000000000000 | 000003249202 | 0100000000000 | 0001000000000 | 1 | 0 | 0 | 0 | 0 |
| 01A | 204 | 000000000700 | 000000000000 | 000003249202 | 0100000000000 | 0001000000000 | 1 | 0 | 0 | 0 | 0 |
| 01B | 241 | 000000000700 | 000000000000 | 000003249202 | 0100000000000 | 0001000000000 | 1 | 0 | 1 | 0 | 0 |
| 01C | 243 | 000000000700 | 000000000000 | 000003249202 | 0100000000000 | 0001000000000 | 1 | 0 | 0 | 0 | 0 |
| 01D | 23C | 000000000700 | 000000000000 | 000003249202 | 0100000000000 | 0001000000000 | 1 | 1 | 0 | 0 | 0 |
| 01E | 7D4 | 000000000700 | 000000000000 | 000003249202 | 0101000000000 | 0001000000000 | 1 | 0 | 0 | 0 | 0 |
| 01F | 7E4 | 000000000700 | 000000000000 | 000003249202 | 0101000000000 | 0001000000000 | 1 | 0 | 0 | 0 | 0 |
| 020 | 025 | 000000000700 | 000000000000 | 000003249202 | 0101000000000 | 0001000000000 | 0 | 0 | 0 | 0 | 0 |
| 025 | 7C3 | 000000000700 | 000000000000 | 000003249202 | 0101000000000 | 0001000000000 | 1 | 0 | 0 | 0 | 0 |
| 026 | 224 | 000000000700 | 000000000000 | 000003249202 | 0101000000000 | 0001000000000 | 1 | 0 | 0 | 0 | 0 |
| 02A | 743 | 000000000700 | 000000000000 | 000003249202 | 0100000000000 | 0001000000000 | 0 | 0 | 0 | 0 | 0 |
| 02B | 564 | 000000000700 | 000000000000 | 000003249202 | 0100000000000 | 0001000000000 | 1 | 0 | 0 | 0 | 0 |
| 02C | 02F | 000000000700 | 000000000000 | 000003249202 | 0100000000000 | 0001000000000 | 0 | 0 | 0 | 0 | 0 |
| 02D | 624 | 000000000700 | 000000000000 | 000003249202 | 0100000000000 | 0001000000000 | 1 | 0 | 0 | 0 | 0 |
| 02F | 231 | 000000000700 | 000000000000 | 000003249202 | 0100000000000 | 0001000000000 | 0 | 0 | 0 | 0 | 0 |
| 031 | 7E3 | 000000000700 | 000000000000 | 000003249202 | 0100000000000 | 0001000000000 | 1 | 0 | 0 | 0 | 0 |
| 032 | 034 | 000000000700 | 000000000000 | 000003249202 | 0100000000000 | 0001000000000 | 1 | 0 | 0 | 0 | 0 |
| 033 | 5C5 | 000000000701 | 000000000000 | 000003249202 | 0100000000000 | 0001000000000 | 1 | 0 | 0 | 0 | 0 |
| 034 | 485 | 000000007601 | 000000000000 | 000003249202 | 0100000000000 | 0001000000000 | 1 | 0 | 0 | 0 | 0 |
| 035 | 400 | 000000007001 | 000000000000 | 000003249202 | 0100000000000 | 0001000000000 | 0 | 0 | 5 | 0 | 0 |
| 036 | 451 | 000000007601 | 000000000000 | 000003249202 | 0100000000000 | 0001000000000 | 0 | 0 | 5 | 0 | 0 |
| 037 | 405 | 000000007701 | 000000000000 | 000003249202 | 0100000000000 | 0001000000000 | 1 | 0 | 5 | 1 | 0 |
| 038 | 204 | 000000007701 | 000000000000 | 000003249202 | 0100000000000 | 0001000000000 | 1 | 0 | 0 | 1 | 0 |
| 004 | 400 | 000000007701 | 000000000000 | 000003249202 | 0100000000000 | 0001000000000 | 1 | 0 | 0 | 0 | 0 |
| 005 | 762 | 000000007701 | 000000000000 | 000003249202 | 0100000000000 | 0001000000000 | 1 | 0 | 1 | 0 | 0 |
| 006 | 400 | 000000007701 | 000000000000 | 000003249202 | 0100000000000 | 0001000000000 | 1 | 0 | 0 | 0 | 0 |
| 007 | 460 | 000000007701 | 000000000000 | 000003249202 | 0100000000000 | 0001000000000 | 1 | 0 | 0 | 0 | 0 |
| 008 | 204 | 000000007701 | 000000000000 | 000003249202 | 0100000000000 | 0001000000000 | 1 | 0 | 0 | 0 | 0 |
| 009 | 400 | 000000007701 | 000000000000 | 000003249202 | 0100000000000 | 0001000000000 | 0 | 0 | 0 | 0 | 0 |
| 00A | 460 | 000000007701 | 000000000000 | 000003249202 | 0100000000000 | 0001000000000 | 0 | 0 | 0 | 0 | 0 |
| 00B | 400 | 000000007701 | 000000000000 | 000003249202 | 0100000000000 | 0001000000000 | 1 | 0 | 0 | 0 | 0 |
| 00C | 009 | 000000007701 | 000000000000 | 000003249202 | 0100000000000 | 0001000000000 | 1 | 0 | 9 | 9 | 0 |
| 00D | 400 | 000000007701 | 000000000000 | 000003249202 | 0100000000000 | 0001000000000 | 1 | 0 | 0 | 0 | 0 |
| 00E | 400 | 000000007701 | 000000000000 | 000003249202 | 0100000000000 | 0001000000000 | 0 | 0 | 0 | 0 | 0 |
| 00F | 460 | 000000007701 | 000000000000 | 000003249202 | 0100000000000 | 0001000000000 | 1 | 0 | 0 | 0 | 0 |
| 010 | 009 | 000000007701 | 000000000000 | 000003249202 | 0100000000000 | 0001000000000 | 1 | 0 | 0 | 0 | 0 |
| 011 | 7E9 | 000000007701 | 000000000000 | 000003249202 | 0100000000000 | 0001000000000 | 1 | 0 | 0 | 0 | 0 |
| 012 | 204 | 000000007701 | 000000000000 | 000003249202 | 0100000000000 | 0001000000000 | 1 | 0 | 0 | 0 | 0 |
| 013 | 41C | 000000007701 | 000000000000 | 000003249202 | 0100000000000 | 0001000000000 | 1 | 0 | 0 | 0 | 0 |
| 014 | 253 | [illegible] | [illegible] | [illegible] | [illegible] | [illegible] | [illegible] | [illegible] | [illegible] | [illegible] | [illegible] |

| PC | I-REG | A-REG | B-REG | C-REG | FLAGS (A) | FLAGS (B) | C | KP | KN | KO | KQ |
|---|---|---|---|---|---|---|---|---|---|---|---|
| 015 | 239 | 000000007701 | 000000000000 | 000003249202 | 01000000000000 | 000100000000 | 1 | 0 | 0 | 7 | 0 |
| 016 | 23C | 000000007701 | 000000000000 | 000003249202 | 01000000000000 | 000100000000 | 1 | 0 | 0 | 6 | 0 |
| 017 | 256 | 000000007701 | 000000000000 | 000003249202 | 01000000000000 | 000100000000 | 1 | 0 | 0 | 5 | 0 |
| 018 | 238 | 000000007701 | 000000000000 | 000003249202 | 01000000000000 | 000100000000 | 1 | 0 | 0 | 4 | 0 |
| 019 | 23C | 000000007701 | 000000000000 | 000003249202 | 01000000000000 | 000100000000 | 1 | 0 | 0 | 3 | 0 |
| 01A | 204 | 000000007701 | 000000000000 | 000003249202 | 01000000000000 | 000100000000 | 1 | 0 | 0 | 1 | 0 |
| 01B | 241 | 000000007701 | 000000000000 | 000003249202 | 01000000000000 | 000100000000 | 1 | 0 | 0 | 1 | 0 |
| 01C | 242 | 000000007701 | 000000000000 | 000003249202 | 01000000000000 | 000100000000 | 1 | 0 | 0 | 0 | 0 |
| 01D | 23C | 000000007701 | 000000000000 | 000003249202 | 01000000000000 | 000100000000 | 1 | 0 | 0 | 0 | 0 |
| 01E | 203 | 000000007701 | 000000000000 | 000003249202 | 01000000000000 | 000100000000 | 1 | 0 | 0 | 0 | 0 |
| 01F | 754 | 000000007701 | 000000000000 | 000003249202 | 01100000000000 | 000100000000 | 1 | 0 | 0 | 0 | 0 |
| 020 | 025 | 000000007701 | 000000000000 | 000003249202 | 01100000000000 | 000100000000 | 1 | 0 | 0 | 0 | 0 |
| 025 | 703 | 000000007701 | 000000000000 | 000003249202 | 01100000000000 | 000100000000 | 0 | 0 | 0 | 0 | 0 |
| 026 | 225 | 000000007701 | 000000000000 | 000003249202 | 01100000000000 | 000100000000 | 1 | 0 | 0 | 0 | 0 |
| 025 | 743 | 000000007701 | 000000000000 | 000003249202 | 01000000000000 | 000100000000 | 1 | 0 | 0 | 0 | 1 |
| 023 | 556 | 000000007701 | 000000000000 | 000003249202 | 01000000000000 | 000100000000 | 0 | 0 | 0 | 0 | 0 |
| 02C | 02F | 000000007701 | 000000000000 | 000003249202 | 01000000000000 | 000100000000 | 1 | 0 | 0 | 0 | 0 |
| 02D | 624 | 000000007701 | 000000000000 | 000003249202 | 01000000000000 | 000100000000 | 0 | 0 | 0 | 0 | 0 |
| 02F | 231 | 000000007701 | 000000000000 | 000003249202 | 01000000000000 | 000100000000 | 1 | 0 | 0 | 0 | 0 |
| 031 | 753 | 000000007701 | 000000000000 | 000003249202 | 01000000000000 | 000100000000 | 0 | 0 | 0 | 0 | 0 |
| 032 | 034 | 000000007701 | 000000000000 | 000003249202 | 01000000000000 | 000100000000 | 1 | 0 | 0 | 0 | 0 |
| 033 | 5C5 | 000000007700 | 000000000000 | 000003249202 | 01000000000000 | 000100000000 | 1 | 0 | 0 | 0 | 0 |
| 034 | 435 | 000000077002 | 000000000000 | 000003249202 | 01000000000000 | 000100000000 | 1 | 0 | 0 | 0 | 0 |
| 035 | 400 | 000000077002 | 000000000000 | 000003249202 | 01000000000000 | 000100000000 | 1 | 0 | 0 | 0 | 0 |
| 036 | 4E1 | 000000077902 | 000000000000 | 000003249202 | 01000000000000 | 000100000000 | 0 | 0 | 7 | 0 | 0 |
| 037 | 4C5 | 000000077002 | 000000000000 | 000003249202 | 01000000000000 | 000100000000 | 0 | 0 | 7 | 0 | 0 |
| 038 | 204 | 000000077000 | 000000000000 | 000003249202 | 01000000000000 | 000100000000 | 1 | 0 | 7 | 0 | 0 |
| 004 | 400 | 000000077002 | 000000000000 | 000003249202 | 01000000000000 | 000100000000 | 1 | 0 | 0 | 0 | 0 |
| 005 | 762 | 000000077902 | 000000000000 | 000003249202 | 01000000000000 | 000100000000 | 1 | 0 | 0 | 0 | 0 |
| 006 | 400 | 000000077902 | 000000000000 | 000003249202 | 01000000000000 | 000100000000 | 1 | 0 | 0 | 0 | 0 |
| 007 | 460 | 000000077002 | 000000000000 | 000003249202 | 01000000000000 | 000100000000 | 1 | 0 | 0 | 4 | 0 |
| 008 | 234 | 000000077902 | 000000000000 | 000003249202 | 01000000000000 | 000100000000 | 1 | 0 | 0 | 0 | 0 |
| 009 | 400 | 000000077002 | 000000000000 | 000003249202 | 01000000000000 | 000100000000 | 1 | 0 | 0 | 0 | 0 |
| 00A | 460 | 000000077002 | 000000000000 | 000003249202 | 01000000000000 | 000100000000 | 0 | 0 | 3 | 4 | 0 |
| 00B | 400 | 000000077902 | 000000000000 | 000003249202 | 01000000000000 | 000100000000 | 0 | 0 | 0 | 0 | 0 |
| 00C | 039 | 000000077902 | 000000000000 | 000003249202 | 01000000000000 | 000100000000 | 1 | 0 | 0 | 0 | 0 |
| 00D | 400 | 000000077302 | 000000000000 | 000003249202 | 01000000000000 | 000100000000 | 1 | 0 | 0 | 0 | 0 |
| 00E | 400 | 000000077302 | 000000000000 | 000003249202 | 01000000000000 | 000100000000 | 1 | 0 | 0 | 0 | 0 |
| 00F | 460 | 000000077902 | 000000000000 | 000003249202 | 01000000000000 | 000100000000 | 0 | 0 | 0 | 0 | 0 |
| 010 | 039 | 000000077902 | 000000000000 | 000003249202 | 01000000000000 | 000100000000 | 1 | 4 | 3 | 3 | 0 |
| 011 | 759 | 000000077902 | 000000000000 | 000003249202 | 01000000000000 | 000100000000 | 1 | 0 | 8 | 8 | 0 |
| 012 | 204 | 000000077902 | 000000000000 | 000003249202 | 01000000000000 | 000100000000 | 1 | 9 | 9 | 8 | 0 |
| 013 | 41C | 000000077902 | 000000000000 | 000003249202 | 01000000000000 | 000100000000 | 1 | 9 | 9 | 9 | 9 |
| 014 | 253 | 000000077902 | 000000000000 | 000003249202 | 01000000000000 | 000100000000 | 1 | 9 | 9 | 8 | 9 |
| 015 | 239 | 000000077902 | 000000000000 | 000003249202 | 01000000000000 | 000100000000 | 1 | 9 | 9 | 7 | 0 |
| 016 | 23C | 000000077902 | 000000000000 | 000003249202 | 01000000000000 | 000100000000 | 1 | 9 | 9 | 6 | 0 |
| 017 | 256 | 000000077902 | 000000000000 | 000003249202 | 01000000000000 | 000100000000 | 1 | 9 | 9 | 5 | 9 |
| 019 | 238 | 000000077902 | 000000000000 | 000003249202 | 01000000000000 | 000100000000 | 1 | 0 | 0 | 4 | 1 |
| 03B | 728 | -00000077902 | 000000000000 | 000003249202 | 01000000000000 | 000100000100 | 1 | 0 | 0 | 4 | 1 |
| 03C | 741 | -00000077102 | 000000000000 | 000003249202 | 01000000000000 | 000100000100 | 1 | 0 | 0 | 4 | 0 |
| 03D | 7C1 | -00000077302 | 000000000000 | 000003249202 | 01000000000000 | 000100000100 | 0 | 0 | 1 | 4 | 0 |
| 03E | 045 | -00000077102 | 000000000000 | 000003249202 | 01000000000000 | 000100000100 | 1 | 0 | 0 | 1 | 1 |
| 03F | 700 | -00000077002 | 000000000000 | 000003249202 | 11000000000000 | 000100000100 | 1 | 0 | 0 | 4 | 1 |
| 040 | 079 | -00000077002 | 000000000000 | 000003249202 | 11000000000000 | 000100000100 | 1 | 0 | 0 | 4 | 0 |
| 079 | 574 | -00000077002 | 000000000000 | 000003249202 | 11000000000000 | 000100000100 | 1 | 0 | 1 | 4 | 4 |
| 07A | 29F | -00000077002 | 000000000000 | 000003249202 | 11000000000000 | 000100000100 | 1 | 0 | 1 | 4 | 0 |
| 07B | 542 | -00000077002 | 100000000000 | 000003249202 | 11000000000000 | 000100000100 | 1 | 0 | 1 | 4 | 0 |
| 07C | 44A | -00000077902 | 100000000000 | 000003249202 | 11000000000000 | 000100000100 | 1 | 0 | 0 | 4 | 0 |
| 07D | 480 | -00000077902 | 100000000000 | 000003249202 | 11000000000000 | 000100000100 | 0 | 0 | 0 | 4 | 0 |
| 07F | 283 | -00000077902 | 100000000000 | 000003249202 | 11000000000000 | 000100000100 | 1 | 9 | 9 | 4 | 0 |
| 083 | 624 | -00000077902 | 100000000000 | 000003249202 | 11000000000000 | 000100000100 | 0 | 0 | 0 | 4 | 0 |
| 084 | 290 | -00000077902 | 100000000000 | 000003249202 | 11000000000000 | 000100000100 | 1 | 0 | 0 | 4 | 1 |
| 090 | 5C5 | -00000077002 | 100000000000 | 000003249202 | 11000000000000 | 000100000100 | 1 | 0 | 0 | 4 | 0 |
| 091 | 564 | -00000077001 | 100000000000 | 000003249202 | 11000000000000 | 000100000100 | 0 | 0 | 0 | 4 | 0 |
| 092 | 29D | -00000077002 | 100000000000 | 000003249202 | 11000000000000 | 000100000100 | 1 | 0 | 0 | 4 | 0 |
| 09D | 485 | -00000773002 | 100000000000 | 000003249202 | 11000000000000 | 000100000100 | 1 | 0 | 0 | 4 | 3 |
| 09E | 083 | -00000773002 | 100000000000 | 000003249202 | 11000000000000 | 000100000100 | 1 | 0 | 0 | 4 | 3 |
| 093 | 424 | -00000773002 | 100000000000 | 000003249202 | 11000000000000 | 000100000100 | 0 | 0 | 0 | 4 | 0 |
| 094 | 290 | -00000773000 | 100000000000 | 000003249202 | 11000000000000 | 000100000100 | 1 | 0 | 0 | 4 | 0 |
| 090 | 5C5 | -00000773004 | 100000000000 | 000003249202 | 11000000000000 | 000100000100 | 1 | 0 | 0 | 4 | 0 |
| 091 | 564 | -00000773004 | 100000000000 | 000003249202 | 11000000000000 | 000100000100 | 0 | 0 | 0 | 4 | 1 |
| 092 | 290 | -00000773004 | 100000000000 | 000003249202 | 11000000000000 | 000100000100 | 1 | 0 | 0 | 4 | 1 |
| 09D | 485 | -00000773004 | 100000000000 | 000003249202 | 11000000000000 | 000100000100 | 1 | 0 | 0 | 4 | 0 |
| 09F | 093 | -00000773004 | 100000000000 | 000003249202 | 11000000000000 | 000100000100 | 1 | 0 | 0 | 4 | 1 |
| 083 | 624 | -00000773004 | 100000000000 | 000003249202 | 11000000000000 | 000100000100 | 0 | 0 | 1 | 4 | 1 |
| 084 | 290 | -00000773004 | 100000000000 | 000003249202 | 11000000000000 | 000100000100 | 1 | 0 | 0 | 4 | 0 |
| 090 | 5C5 | -00007730005 | 100000000000 | 000003249202 | 11000000000000 | 000100000100 | 1 | 0 | 0 | 4 | 1 |
| 091 | 564 | -00007730005 | 100000000000 | 000003249202 | 11000000000000 | 000100000100 | 1 | 0 | 0 | 4 | 0 |
| 092 | 290 | -00007730005 | 100000000000 | 000003249202 | 11000000000000 | 000100000100 | 1 | 0 | 0 | 4 | 0 |
| 093 | 485 | -00007730000 | 100000000000 | 000003249202 | 11000000000000 | 000100000100 | 1 | 0 | 0 | 4 | 0 |
| 09E | 083 | -00007730000 | 100000000000 | 000003249202 | 11000000000000 | 000100000100 | 1 | 0 | 0 | 4 | 0 |
| 083 | 624 | -00007730005 | 100000000000 | 000003249202 | 11000000000000 | 000100000100 | 0 | 0 | 0 | 4 | 1 |
| 084 | 290 | -00007700005 | 100000000000 | 000003249202 | 11000000000000 | 000100000100 | 1 | 0 | 0 | 4 | 1 |
| 090 | 5C5 | -00077000006 | 100000000000 | 000003249202 | 11000000000000 | 000100000100 | 1 | 0 | 0 | 4 | 0 |
| 091 | 564 | -00077000006 | 100000000000 | 000003249202 | 11000000000000 | 000100000100 | 0 | 0 | 1 | 4 | 9 |
| 092 | 293 | -00077300006 | 100000000000 | 000003249202 | 11000000000000 | 000100000100 | 1 | 0 | 0 | 4 | 1 |
| 09D | 495 | -00773000006 | 100000000000 | 000003249202 | 11000000000000 | 000100000100 | 1 | 0 | 0 | 4 | 1 |
| 09E | 093 | -00773000006 | 100000000000 | 000003249202 | 11000000000000 | 000100000100 | 1 | 0 | 0 | 4 | 0 |
| 093 | 624 | -00773000006 | 100000000000 | 000003249202 | 11000000000000 | 000100000100 | 0 | 0 | 0 | 4 | 0 |
| 084 | 290 | -00773000006 | 100000000000 | 000003249202 | 11000000000000 | 000100000100 | 1 | 9 | 9 | 4 | 9 |
| 090 | 5C5 | -00773000007 | 100000000000 | 000003249202 | 11000000000000 | 000100000100 | 1 | 9 | 9 | 4 | 9 |
| 091 | 564 | -00773000007 | 100000000000 | 000003249202 | 11000000000000 | 000100000100 | 0 | 0 | 0 | 4 | 0 |
| 092 | 290 | -00773000007 | 100000000000 | 000003249202 | 11000000000000 | 000100000100 | 1 | 0 | 1 | 4 | 0 |

| PC | I-REG | A-REG | B-REG | C-REG | FLAGS (A) | FLAGS (B) | C | KP | KN | KO | NN |
|---|---|---|---|---|---|---|---|---|---|---|---|
| | | | | 00003249202 | 11000000000000 | 00010000000100 | 1 | 0 | 0 | 4 | 0 |
| 390 | 485 | -07770000007 | 10000000000 | 00003249202 | 11000000000000 | 00010000000100 | 1 | 0 | 0 | 4 | 0 |
| 39E | 083 | -07770000007 | 10000000000 | 00003249202 | 11000000000000 | 00010000000100 | 1 | 0 | 0 | 4 | 0 |
| 383 | 624 | -07770000007 | 10000000000 | 00003249202 | 11000000000000 | 00010000000100 | 1 | 0 | 0 | 4 | 0 |
| 384 | 290 | -07770000007 | 10000000000 | 00003249202 | 11000000000000 | 00010000000100 | 1 | 0 | 0 | 4 | 0 |
| 385 | 564 | -07770000000 | 10000000000 | 00003249202 | 11000000000000 | 00010000000100 | 1 | 0 | 0 | 4 | 0 |
| 386 | 040 | -07770000007 | 10000000000 | 00003249202 | 11000000000000 | 00010000000100 | 0 | 0 | 0 | 4 | 0 |
| 3A0 | 7C0 | -07770000007 | 10000000000 | 00003249202 | 11000000000000 | 00010000000100 | 1 | 0 | 0 | 4 | 0 |
| 3A1 | 100 | -07770000007 | 10000000000 | 00003249202 | 11000000000000 | 00010000000100 | 1 | 0 | 0 | 4 | 0 |
| 3A2 | 413 | -10000000000 | 07770000007 | 00003249202 | 11000000000000 | 00010000000100 | 1 | 0 | 0 | 4 | 0 |
| 3A3 | 400 | -00003249202 | 07770000007 | 00003249202 | 11000000000000 | 00010000000100 | 1 | 0 | 0 | 4 | 0 |
| 3A4 | 400 | -00003249202 | 07770000007 | 07700000007 | 11000000000000 | 00010000000100 | 1 | 0 | 0 | 4 | 0 |
| 3A5 | 6C0 | -00003249202 | 07770000007 | 07770000007 | 11000000000000 | 00010000000100 | 1 | 0 | 0 | 4 | 0 |
| 3A6 | 7C0 | -00003249202 | 07770000007 | 07770000007 | 11000000100000 | 00010000000100 | 1 | 0 | 0 | 4 | 0 |
| 3A7 | 798 | -00003249202 | 07770000007 | 07770000007 | 11000000100000 | 00010000000100 | 1 | 0 | 0 | 4 | 0 |
| 3A8 | 070 | -00003249202 | 07770000007 | 07770000007 | 11000000100000 | 00010000000100 | 1 | 0 | 0 | 4 | 0 |
| 379 | 574 | -00003249202 | 07770000007 | 07770000007 | 11000000100000 | 00010000000100 | 1 | 0 | 0 | 4 | 0 |
| 37A | 295 | -00003249202 | 07770000007 | 07770000007 | 11000000100000 | 00010000000100 | 1 | 0 | 0 | 4 | 0 |
| 37B | 542 | -00003249202 | 10000000007 | 07770000007 | 11000000100000 | 00010000000100 | 1 | 0 | 0 | 4 | 0 |
| 37C | 48A | -00003249202 | 10000000007 | 07770000007 | 11000000100000 | 00010000000100 | 0 | 0 | 0 | 4 | 0 |
| 37D | 480 | -00003249202 | 10000000007 | 07770000007 | 11000000100000 | 00010000000100 | 1 | 0 | 0 | 4 | 0 |
| 37E | 293 | -00003249202 | 10000000007 | 07770000007 | 11000000100000 | 00010000000100 | 0 | 0 | 0 | 4 | 0 |
| 383 | 624 | -00003249202 | 10000000007 | 07770000007 | 11000000100000 | 00010000000100 | 1 | 0 | 0 | 4 | 0 |
| 384 | 290 | -00003249202 | 10000000007 | 07770000007 | 11000000100000 | 00010000000100 | 1 | 0 | 0 | 4 | 0 |
| 390 | 5C5 | -00003249202 | 10000000007 | 07770000007 | 11000000100000 | 00010000000100 | 0 | 0 | 0 | 4 | 0 |
| 391 | 564 | -00003249202 | 10000000007 | 07770000007 | 11000000100000 | 00010000000100 | 1 | 0 | 0 | 4 | 0 |
| 392 | 290 | -00003249202 | 10000000007 | 07770000007 | 11000000100000 | 00010000000100 | 1 | 0 | 0 | 4 | 0 |
| 390 | 485 | -00032492000 | 10000000007 | 07770000007 | 11000000100000 | 00010000000100 | 1 | 0 | 0 | 4 | 0 |
| 39E | 083 | -00032492003 | 10000000007 | 07770000007 | 11000000100000 | 00010000000100 | 0 | 0 | 0 | 4 | 0 |
| 383 | 624 | -00032492003 | 10000000007 | 07770000007 | 11000000100000 | 00010000000100 | 1 | 0 | 0 | 4 | 0 |
| 384 | 290 | -00032492003 | 10000000007 | 07770000007 | 11000000100000 | 00010000000100 | 1 | 0 | 0 | 4 | 0 |
| 390 | 5C5 | -00032492004 | 10000000007 | 07770000007 | 11000000100000 | 00010000000100 | 0 | 0 | 0 | 4 | 0 |
| 391 | 564 | -00032492006 | 10000000007 | 07770000007 | 11000000100000 | 00010000000100 | 1 | 0 | 0 | 4 | 0 |
| 392 | 290 | -00032492006 | 10000000007 | 07770000007 | 11000000100000 | 00010000000100 | 1 | 0 | 0 | 4 | 0 |
| 390 | 485 | -00324920006 | 10000000007 | 07770000007 | 11000000100000 | 00010000000100 | 1 | 0 | 0 | 4 | 0 |
| 39E | 083 | -00324920006 | 10000000007 | 07770000007 | 11000000100000 | 00010000000100 | 0 | 0 | 0 | 4 | 0 |
| 383 | 624 | -00324920006 | 10000000007 | 07770000007 | 11000000100000 | 00010000000100 | 1 | 0 | 0 | 4 | 0 |
| 384 | 290 | -00324920006 | 10000000007 | 07770000007 | 11000000100000 | 00010000000100 | 1 | 0 | 0 | 4 | 0 |
| 390 | 5C5 | -00324920005 | 10000000007 | 07770000007 | 11000000100000 | 00010000000100 | 0 | 0 | 0 | 4 | 0 |
| 391 | 564 | -00324920005 | 10000000007 | 07770000007 | 11000000100000 | 00010000000100 | 1 | 0 | 0 | 4 | 0 |
| 392 | 290 | -00324920005 | 10000000007 | 07770000007 | 11000000100000 | 00010000000100 | 1 | 0 | 0 | 4 | 0 |
| 390 | 485 | -03249200005 | 10000000007 | 07770000007 | 11000000100000 | 00010000000100 | 1 | 0 | 0 | 4 | 0 |
| 39E | C83 | -03249200005 | 10000000007 | 07770000007 | 11000000100000 | 00010000000100 | 0 | 0 | 0 | 4 | 0 |
| 383 | 624 | -03249200005 | 10000000007 | 07770000007 | 11000000100000 | 00010000000100 | 1 | 0 | 0 | 4 | 0 |
| 384 | 290 | -03249200005 | 10000000007 | 07770000007 | 11000000100000 | 00010000000100 | 1 | 0 | 0 | 4 | 0 |
| 390 | 5C5 | -03249200006 | 10000000007 | 07770000007 | 11000000100000 | 00010000000100 | 1 | 0 | 0 | 4 | 0 |
| [illegible] | [illegible] | [illegible] | [illegible] | [illegible] | [illegible] | [illegible] | 1 | [illegible] | [illegible] | [illegible] | [illegible] |
| 392 | 290 | -03249200006 | 10000000007 | 07770000007 | 11000000100000 | 00010000000100 | 1 | 0 | 0 | 4 | 0 |
| 393 | 759 | -03249200006 | 10000000007 | 07770000007 | 11000000100000 | 00010000000100 | 1 | 0 | 0 | 4 | 0 |
| 394 | 28A | -03249200006 | 10000000007 | 07770000007 | 11000000100000 | 00010000000100 | 0 | 0 | 0 | 4 | 0 |
| 395 | 664 | -03249200006 | 10000000007 | 07770000007 | 11000000100000 | 00010000000100 | 1 | 0 | 0 | 4 | 0 |
| 396 | 299 | -03249200006 | 10000000007 | 07770000007 | 11000000100000 | 00010000000100 | 1 | 0 | 0 | 4 | 0 |
| 399 | 595 | -03249200015 | 10000000007 | 07770000007 | 11000000100000 | 00010000000100 | 1 | 0 | 0 | 4 | 0 |
| 39C | 083 | -03249200017 | 10000000007 | 07770000007 | 11000000100000 | 00010000000100 | 0 | 0 | 0 | 4 | 0 |
| 383 | 624 | -03249200017 | 10000000007 | 07770000007 | 11000000100000 | 00010000000100 | 1 | 0 | 0 | 4 | 0 |
| 384 | 290 | -03249200017 | 10000000007 | 07770000007 | 11000000100000 | 00010000000100 | 1 | 0 | 0 | 4 | 0 |
| 390 | 5C5 | -03249200017 | 10000000007 | 07770000007 | 11000000100000 | 00010000000100 | 1 | 0 | 0 | 4 | 0 |
| 391 | 564 | -03249200017 | 10000000007 | 07770000007 | 11000000100000 | 00010000000100 | 1 | 0 | 0 | 4 | 0 |
| 392 | 290 | -03249200017 | 10000000007 | 07770000007 | 11000000100000 | 00010000000100 | 1 | 0 | 0 | 4 | 0 |
| 393 | 759 | -03249200017 | 10000000007 | 07770000007 | 11000000100000 | 00010000000100 | 1 | 0 | 0 | 4 | 0 |
| 394 | 28A | -03249200017 | 10000000007 | 07770000007 | 11000000100000 | 00010000000100 | 0 | 0 | 0 | 4 | 0 |
| 395 | 664 | -03249200017 | 10000000007 | 07770000007 | 11000000100000 | 00010000000100 | 1 | 0 | 0 | 4 | 0 |
| 396 | 299 | -03249200017 | 10000000007 | 07770000007 | 11000000100000 | 00010000000100 | 1 | 0 | 0 | 4 | 0 |
| 399 | 595 | -03249200027 | 10000000007 | 07770000007 | 11000000100000 | 00010000000100 | 1 | 0 | 0 | 4 | 0 |
| 39C | 083 | -03249200027 | 10000000007 | 07770000007 | 11000000100000 | 00010000000100 | 1 | 0 | 0 | 4 | 0 |
| 383 | 624 | -03249200027 | 10000000027 | 07770000007 | 11000000100000 | 00010000000100 | 1 | 0 | 0 | 4 | 0 |
| 384 | 290 | -03249200027 | 10000000027 | 07770000007 | 11000000100000 | 00010000000100 | 1 | 0 | 0 | 4 | 0 |
| 385 | 564 | -03249200027 | 10000000007 | 07770000007 | 11000000100000 | 00010000000100 | 1 | 0 | 0 | 4 | 0 |
| 386 | 040 | -03249200027 | 10000000007 | 07770000007 | 11000000100000 | 00010000000100 | 0 | 0 | 0 | 4 | 0 |
| 3A0 | 7C0 | -03249200027 | 10000000007 | 07770000007 | 11000000100000 | 00010000000100 | 1 | 0 | 0 | 4 | 0 |
| 3A1 | 100 | -03249200027 | 10000000007 | 07770000007 | 11000000100000 | 00010000000100 | 1 | 0 | 0 | 4 | 0 |
| 3A2 | 413 | -10000000007 | 03249200027 | 07770000007 | 11000000000000 | 00010000000100 | 1 | 0 | 0 | 4 | 0 |
| 3A3 | 400 | -07770000007 | 03249200027 | 07770000007 | 11000000000000 | 00010000000100 | 1 | 0 | 0 | 4 | 0 |
| 3A4 | 40B | -07770000007 | 03249200027 | 03249200027 | 11000000100000 | 00010000000100 | 1 | 0 | 0 | 4 | 0 |
| 3A5 | 6C9 | -07770000007 | 03249200027 | 03249200027 | 11000000100000 | 00010000000100 | 1 | 0 | 0 | 4 | 0 |
| 3A6 | 7C9 | -07770000007 | 03249200027 | 03249200027 | 11000000100000 | 00010000000100 | 0 | 0 | 0 | 4 | 0 |
| 3A7 | 798 | -07770000007 | 03249200027 | 03249200027 | 11000000000000 | 00010000000100 | 0 | 0 | 0 | 4 | 0 |
| 3A8 | 070 | -07770000007 | 03249200027 | 03249200027 | 11000000000000 | 00010000000100 | 1 | 0 | 0 | 4 | 0 |
| 3A9 | 740 | -07770000007 | 03249200027 | 03249200027 | 01000000000000 | 00010000000100 | 1 | 0 | 0 | 4 | 0 |
| 3AA | 7C1 | -07770000007 | 03249200027 | 03249200027 | 01000000000000 | 00010000000100 | 1 | 0 | 0 | 4 | 0 |
| 3AB | 059 | -07770000007 | 03249200027 | 03249200027 | 01000000000000 | 00010000000100 | 1 | 0 | 0 | 4 | 0 |
| 3AC | 7C2 | -07770000007 | 03249200027 | 03249200027 | 01000000000000 | 00010000000100 | 1 | 0 | 0 | 4 | 0 |
| 3AD | 083 | -07770000007 | 03249200027 | 03249200027 | 01000000000000 | 00010000000100 | 1 | 0 | 0 | 4 | 0 |
| 3B2 | 747 | -07770000007 | 03249200027 | 03249200027 | 01000000000000 | 00010000000100 | 1 | 0 | 0 | 0 | 0 |
| 3B3 | 400 | -07770000007 | 03249200027 | 03249200027 | 01000000000000 | 00010000000100 | 1 | 0 | 0 | 0 | 0 |
| 3B4 | 490 | -07770000007 | 03249200027 | 03249200027 | 01000000000000 | 00010000000100 | 1 | 0 | 0 | 0 | 0 |
| 3B5 | C57 | -07770000007 | 03249200027 | 03249200027 | 01000000000000 | 00010000000100 | 1 | 0 | 0 | 0 | 0 |
| 3B7 | 654 | -07770000007 | 03249200027 | 03249200027 | 01000000000000 | 00010000000000 | 1 | 0 | 0 | 0 | 0 |
| 3B8 | 764 | 07770000007 | 03249200027 | 03249200027 | 01000000000000 | 00010000000000 | 1 | 0 | 0 | 0 | 0 |
| 3B9 | 259 | 07770000007 | 03249200027 | 03249200027 | 01000000000000 | 00010000000100 | 1 | 0 | 0 | 0 | 0 |
| 3BA | 724 | -07770000007 | 03249200027 | 03249200027 | 01000000000000 | 00010000000100 | 0 | 0 | 0 | 0 | 0 |
| 3B5 | 684 | -07770000007 | 03249200027 | 03249200027 | | | | | | | |

| PC | I-REG | A-REG | B-REG | C-REG | FLAGS (A) | FLAGS (B) | C | KP | KN | KO | KQ |
|---|---|---|---|---|---|---|---|---|---|---|---|
| 08C | 0C1 | -07700000027 | 03249200027 | 03249200027 | 010000000000 | 000100000100 | 1 | 0 | 0 | 0 | 0 |
| 090 | 7C2 | -07700000027 | 03249200027 | 03249200027 | 010000000000 | 000100000100 | 1 | 0 | 0 | 0 | 0 |
| 08E | 2C6 | -07700000027 | 03249200027 | 03249200027 | 010000000000 | 000100000100 | 1 | 0 | 0 | 0 | 0 |
| 08F | 451 | -07700000027 | 03249200027 | 03249200027 | 010000000000 | 000100000100 | 1 | 0 | 0 | 0 | 0 |
| 0C0 | 0C5 | -07700000027 | 03249200027 | 03249200027 | 010000000000 | 000100000100 | 1 | 0 | 0 | 0 | 0 |
| 0CF | 524 | -07700000027 | 03249200027 | 03249200027 | 010000000000 | 000100000100 | 1 | 0 | 0 | 0 | 0 |
| 0D0 | 2F5 | -07700000027 | 03249200027 | 03249200027 | 010000000000 | 000100000100 | 1 | 0 | 0 | 0 | 0 |
| 0D1 | 497 | -07700000027 | 03249200027 | 03249200027 | 010000000000 | 000100000100 | 1 | 0 | 0 | 0 | 0 |
| 0D2 | 491 | -00000000027 | 03249200027 | 07700000027 | 010000000000 | 000100000100 | 1 | 0 | 0 | 0 | 0 |
| 0D3 | 7C2 | -00000000027 | 03249200027 | 07700000027 | 010000000000 | 000100000100 | 1 | 0 | 0 | 0 | 0 |
| 0D4 | 0F2 | -00000000027 | 03249200027 | 07700000027 | 010000000000 | 000100000100 | 1 | 0 | 0 | 0 | 0 |
| 0F2 | 4EF | -00000000027 | 03249200027 | 07700000027 | 010000000000 | 000100000100 | 1 | 0 | 0 | 0 | 0 |
| 0F3 | 2EE | -00000000027 | 03249200027 | 07700000027 | 010000000000 | 000100000100 | 1 | 0 | 0 | 0 | 0 |
| 0EE | 4AE | -00000000027 | 03249200027 | 07700000027 | 010000000000 | 000100000100 | 1 | 0 | 0 | 0 | 0 |
| 0EF | 52C | -00000000027 | 03249200027 | 07700000027 | 010000000000 | 000100000100 | 1 | 0 | 0 | 0 | 0 |
| 0F0 | 2F6 | -00000000027 | 03249200027 | 07700000027 | 010000000000 | 000100000100 | 1 | 0 | 0 | 0 | 0 |
| 0F1 | 4A5 | -00000000027 | 03249200027 | 07700000027 | 010000000000 | 000100000100 | 1 | 0 | 0 | 0 | 0 |
| 0F2 | 4EF | -00000000027 | 03249200027 | 07700000027 | 010000000000 | 000100000100 | 1 | 0 | 0 | 0 | 0 |
| 0F3 | 2EF | -00000000027 | 03249200027 | 07700000027 | 010000000000 | 000100000100 | 1 | 0 | 0 | 0 | 0 |
| 0EE | 4AE | -00000000027 | 03249200027 | 00077000027 | 010000000000 | 000100000100 | 1 | 0 | 0 | 0 | 0 |
| 0EF | 52C | -00000000027 | 03249200027 | 00077000027 | 010000000000 | 000100000100 | 1 | 0 | 0 | 0 | 0 |
| 0F0 | 2F6 | -00000000027 | 03249200027 | 00077000027 | 010000000000 | 000100000100 | 1 | 0 | 0 | 0 | 0 |
| 0F1 | 4A5 | -00000000027 | 03249200027 | 00077000027 | 010000000000 | 000100000100 | 1 | 0 | 0 | 0 | 0 |
| 0F2 | 4EF | -00000000027 | 03249200027 | 00077000027 | 010000000000 | 000100000100 | 1 | 0 | 0 | 0 | 0 |
| 0F3 | 2EF | -00000000027 | 03249200027 | 00077900027 | 010000000000 | 000100000100 | 1 | 0 | 0 | 0 | 0 |
| 0EE | 4AE | -00000000027 | 03249200027 | 00000770027 | 010000000000 | 000100000100 | 1 | 0 | 0 | 0 | 0 |
| 0EF | 52C | -00000000027 | 03249200027 | 00000770027 | 010000000000 | 000100000100 | 1 | 0 | 0 | 0 | 0 |
| 0F0 | 2F6 | -00000000027 | 03249200027 | 00000770027 | 010000000000 | 000100000100 | 1 | 0 | 0 | 0 | 0 |
| 0F1 | 4A5 | -00000000027 | 03249200027 | 00000770027 | 010000000000 | 000100000100 | 1 | 0 | 0 | 0 | 0 |
| 0F2 | 4EF | -00000000027 | 03249200027 | 00000770027 | 010000000000 | 000100000100 | 1 | 0 | 0 | 0 | 0 |
| 0F3 | 2EF | -00000000027 | 03249200027 | 00000771027 | 010000000000 | 000100000100 | 1 | 0 | 0 | 0 | 0 |
| 0EE | 4AE | -00000000027 | 03249200027 | 00000077027 | 010000000000 | 000100000100 | 1 | 0 | 0 | 0 | 0 |
| 0EF | 52C | -00000000027 | 03249200027 | 00000077027 | 010000000000 | 000100000100 | 1 | 0 | 0 | 0 | 0 |
| 0F0 | 2F6 | -00000000027 | 03249200027 | 00000077027 | 010000000000 | 000100000100 | 1 | 0 | 0 | 0 | 0 |
| 0F1 | 4A5 | -00000000027 | 03249200027 | 00000077027 | 010000000000 | 000100000100 | 1 | 0 | 0 | 0 | 0 |
| 0F2 | 4EF | -00000000027 | 03249200027 | 00000077027 | 010000000000 | 000100000100 | 1 | 0 | 0 | 0 | 0 |
| 0F3 | 2EE | -00000000027 | 03249200027 | 00000077027 | 010000000000 | 000100000100 | 1 | 0 | 0 | 0 | 0 |
| 0EE | 4AE | -00000000027 | 03249200027 | 00000077027 | 010000000000 | 000100000100 | 1 | 0 | 0 | 0 | 0 |
| 0EF | 52C | -00000000027 | 03249200027 | 00000077027 | 010000000000 | 000100000100 | 1 | 0 | 0 | 0 | 0 |
| 0F0 | 2F6 | -00000000027 | 03249200027 | 00000077027 | 010000000000 | 000100000100 | 1 | 0 | 0 | 0 | 0 |
| 0F1 | 4A5 | -00000000027 | 03249200027 | 00000077027 | 010000000000 | 000100000100 | 1 | 0 | 0 | 0 | 0 |
| 0F2 | 4EF | -00000000027 | 03249200027 | 00000077327 | 010000000000 | 000100000100 | 1 | 0 | 0 | 0 | 0 |
| 0F3 | 2EF | -00000000027 | 03249200027 | 00000077827 | 010000000000 | 000100000100 | 1 | 0 | 0 | 0 | 0 |
| 0F4 | 491 | -03243200027 | 03249200027 | 00000077827 | 010000000000 | 000100000100 | 1 | 0 | 0 | 0 | 0 |
| 0F5 | 0F2 | -03249200027 | 03249200027 | 00000077827 | 010000000000 | 000100000100 | 1 | 0 | 0 | 0 | 0 |
| 0F2 | 4EF | -03249200027 | 03249200027 | 00000077727 | 010000000000 | 000100000100 | 1 | 0 | 0 | 0 | 0 |
| 0F3 | 2EF | -03243200027 | 03249200027 | 00000077727 | 010000000000 | 000100000100 | 1 | 0 | 0 | 0 | 0 |
| 0F4 | 491 | -06493600027 | 03249200027 | 00000077727 | 010000000000 | 000100000100 | 1 | 0 | 0 | 0 | 0 |
| 0F5 | 0F2 | -06493600027 | 03249200027 | 00000077727 | 010000000000 | 000100000100 | 1 | 0 | 0 | 0 | 0 |
| 0F2 | 4EF | -06493600027 | 03249200027 | 00000077627 | 010000000000 | 000100000100 | 1 | 0 | 0 | 0 | 0 |
| 0F3 | 2EF | -06493600027 | 03249200027 | 00000077627 | 010000000000 | 000100000100 | 1 | 0 | 0 | 0 | 0 |
| 0F4 | 491 | -09747600027 | 03249200027 | 00000077627 | 010000000000 | 000100000100 | 1 | 0 | 0 | 0 | 0 |
| 0F5 | 0F2 | -09747600027 | 03249200027 | 00000077627 | 010000000000 | 000100000100 | 1 | 0 | 0 | 0 | 0 |
| 0F2 | 4EF | -09747600027 | 03249200027 | 00000077527 | 010000000000 | 000100000100 | 1 | 0 | 0 | 0 | 0 |
| 0F3 | 2EF | -09747600027 | 03249200027 | 00000077527 | 010000000000 | 000100000100 | 1 | 0 | 0 | 0 | 0 |
| 0F4 | 491 | -12996800027 | 03249200027 | 00000077527 | 010000000000 | 000100000100 | 1 | 0 | 0 | 0 | 0 |
| 0F5 | 0F2 | -12996800027 | 03249200027 | 00000077527 | 010000000000 | 000100000100 | 1 | 0 | 0 | 0 | 0 |
| 0F2 | 4EF | -12996800027 | 03249200027 | 00000077427 | 010000000000 | 000100000100 | 1 | 0 | 0 | 0 | 0 |
| 0F3 | 2EF | -12996800027 | 03249200027 | 00000077427 | 010000000000 | 000100000100 | 1 | 0 | 0 | 0 | 0 |
| 0F4 | 491 | -16246000027 | 03249200027 | 00000077427 | 010000000000 | 000100000100 | 1 | 0 | 0 | 0 | 0 |
| 0F5 | 0F2 | -16246000027 | 03249200027 | 00000077427 | 010000000000 | 000100000100 | 1 | 0 | 0 | 0 | 0 |
| 0F2 | 4EF | -16246000027 | 03249200027 | 00000077327 | 010000000000 | 000100000100 | 1 | 0 | 0 | 0 | 0 |
| 0F3 | 2EF | -16246000027 | 03249200027 | 00000077327 | 010000000000 | 000100000100 | 1 | 0 | 0 | 0 | 0 |
| 0F4 | 491 | -19495200027 | 03249200027 | 00000077327 | 010000000000 | 000100000100 | 1 | 0 | 0 | 0 | 0 |
| 0F5 | 0F2 | -19495200027 | 03249200027 | 00000077327 | 010000000000 | 000100000100 | 1 | 0 | 0 | 0 | 0 |
| 0F2 | 4EF | -19495200027 | 03249200027 | 00000077227 | 010000000000 | 000100000100 | 1 | 0 | 0 | 0 | 0 |
| 0F3 | 2EF | -19495200027 | 03249200027 | 00000077227 | 010000000000 | 000100000100 | 1 | 0 | 0 | 0 | 0 |
| 0F4 | 491 | -22744400027 | 03249200027 | 00000077227 | 010000000000 | 000100000100 | 1 | 0 | 0 | 0 | 0 |
| 0F5 | 0F2 | -22744400027 | 03249200027 | 00000077227 | 010000000000 | 000100000100 | 1 | 0 | 0 | 0 | 0 |
| 0F2 | 4EF | -22744400027 | 03249200027 | 00000077127 | 010000000000 | 000100000100 | 1 | 0 | 0 | 0 | 0 |
| 0F3 | 2EF | -22744400027 | 03249200027 | 00000077127 | 010000000000 | 000100000100 | 1 | 0 | 0 | 0 | 0 |
| 0F4 | 491 | -25993600027 | 03249200027 | 00000077127 | 010000000000 | 000100000100 | 1 | 0 | 0 | 0 | 0 |
| 0F5 | 0F2 | -25993600027 | 03249200027 | 00000077127 | 010000000000 | 000100000100 | 1 | 0 | 0 | 0 | 0 |
| 0F2 | 4EF | -25993600027 | 03249200027 | 00000077027 | 010000000000 | 000100000100 | 1 | 0 | 0 | 0 | 0 |
| 0F3 | 2EF | -25993600027 | 03249200027 | 00000077027 | 010000000000 | 000100000100 | 1 | 0 | 0 | 0 | 0 |
| 0F4 | 431 | -29242800027 | 03249200027 | 00000077027 | 010000000000 | 000100000100 | 1 | 0 | 0 | 0 | 0 |
| 0F5 | 0F2 | -29242800027 | 03249200027 | 00000077027 | 010000000000 | 000100000100 | 1 | 0 | 0 | 0 | 0 |
| 0F2 | 4EF | -29242800027 | 03249200027 | 00000077027 | 010000000000 | 000100000100 | 1 | 0 | 0 | 0 | 0 |
| 0F3 | 2EF | -29242800027 | 03249200027 | 00000077027 | 010000000000 | 000100000100 | 1 | 0 | 0 | 0 | 0 |
| 0EE | 4AE | -29242800027 | 03249200027 | 00000007727 | 010000000000 | 000100000100 | 1 | 0 | 0 | 0 | 0 |
| 0EF | 52C | -29242800027 | 03249200027 | 00000007727 | 010000000000 | 000100000100 | 1 | 0 | 0 | 0 | 0 |
| 0F0 | 2F6 | -29242800027 | 03249200027 | 00000007727 | 010000000000 | 000100000100 | 1 | 0 | 0 | 0 | 0 |
| 0F1 | 4A5 | -02924280027 | 03249200027 | 00000007727 | 010000000000 | 000100000100 | 1 | 0 | 0 | 0 | 0 |
| 0F2 | 4EF | -02924280027 | 03249200027 | 00000007627 | 010000000000 | 000100000100 | 1 | 0 | 0 | 0 | 0 |
| 0F3 | 2EF | -02924280027 | 03249200027 | 00000007627 | 010000000000 | 000100000100 | 1 | 0 | 0 | 0 | 0 |
| 0F4 | 491 | -06173640027 | 03249200027 | 00000007627 | 010000000000 | 000100000100 | 1 | 0 | 0 | 0 | 0 |
| 0F5 | 0F2 | -06173640027 | 03249200027 | 00000007627 | 010000000000 | 000100000100 | 1 | 0 | 0 | 0 | 0 |
| 0F2 | 4EF | -06173640027 | 03249200027 | 00000007527 | 010000000000 | 000100000100 | 1 | 0 | 0 | 0 | 0 |
| 0F3 | 2EF | -06173640027 | 03249200027 | 00000007527 | 010000000000 | 000100000100 | 1 | 0 | 0 | 0 | 0 |
| 0F4 | 491 | -09422580027 | 03249200027 | 00000007527 | 010000000000 | 000100000100 | 1 | 0 | 0 | 0 | 0 |
| 0F5 | 0F2 | -09422580027 | 03249200027 | 00000007527 | 010000000000 | 000100000100 | 1 | 0 | 0 | 0 | 0 |
| 0F2 | 4EF | [illegible] | [illegible] | [illegible] | [illegible] | 000100000100 | 1 | 0 | 0 | 0 | 0 |

| PC | I-REG | A-REG | B-REG | C-REG | FLAGS (A) | FLAGS (B) | C | KP | KN | KO | KQ |
|---|---|---|---|---|---|---|---|---|---|---|---|
| 0F3 | 2FF | -10472240027 | 03249000027 | 00000007427 | 01000000000000 | 0001000000100 | 1 | 0 | 0 | 0 | 0 |
| 0F4 | 491 | -12471260027 | 03249000027 | 00000007427 | 01000000000000 | 0001000000100 | 1 | 0 | 0 | 0 | 0 |
| 0F5 | 0F2 | -12571340027 | 03249000027 | 00000007427 | 01000000000000 | 0001000000100 | 1 | 0 | 0 | 0 | 0 |
| 0F2 | 4FF | -12571330027 | 03249000027 | 00000007327 | 01000000000000 | 0001000000100 | 1 | 0 | 0 | 0 | 0 |
| 0F3 | 2FF | -12571900027 | 03249000027 | 00000007327 | 01000000000000 | 0001000000100 | 1 | 0 | 0 | 0 | 0 |
| 0F4 | 491 | -15221380027 | 03249000027 | 00000007327 | 01000000000000 | 0001000000100 | 1 | 0 | 0 | 0 | 0 |
| 0F5 | 0F2 | -15221380027 | 03249000027 | 00000007327 | 01000000000000 | 0001000000100 | 1 | 0 | 0 | 0 | 0 |
| 0F2 | 4FF | -15221380027 | 03249000027 | 00000007227 | 01000000000000 | 0001000000100 | 1 | 0 | 0 | 0 | 0 |
| 0F3 | 2FF | -15221300027 | 03249000027 | 00000007227 | 01000000000000 | 0001000000100 | 1 | 0 | 0 | 0 | 0 |
| 0F4 | 491 | -13172290027 | 03249000027 | 00000007227 | 01000000000000 | 0001000000100 | 1 | 0 | 0 | 0 | 0 |
| 0F5 | 0F2 | -13172290027 | 03249000027 | 00000007227 | 01000000000000 | 0001000000100 | 1 | 0 | 0 | 0 | 0 |
| 0F2 | 4FF | -13172290027 | 03249000027 | 00000007127 | 01000000000000 | 0001000000100 | 1 | 0 | 0 | 0 | 0 |
| 0F3 | 2FF | -13172290027 | 03249000027 | 00000007127 | 01000000000000 | 0001000000100 | 1 | 0 | 0 | 0 | 0 |
| 0F4 | 491 | -22411640027 | 03249000027 | 00000007127 | 01000000000000 | 0001000000100 | 1 | 0 | 0 | 0 | 0 |
| 0F5 | 0F2 | -22411640027 | 03249000027 | 00000007127 | 01000000000000 | 0001000000100 | 1 | 0 | 0 | 0 | 0 |
| 0F2 | 4FF | -22411640027 | 03249000027 | 00000007027 | 01000000000000 | 0001000000100 | 1 | 0 | 0 | 0 | 0 |
| 0F3 | 2FF | -22411640027 | 03249000027 | 00000007027 | 01000000000000 | 0001000000100 | 1 | 0 | 0 | 0 | 0 |
| 0F4 | 491 | -25463540027 | 03249000027 | 00000007027 | 01000000000000 | 0001000000100 | 1 | 0 | 0 | 0 | 0 |
| 0F5 | 0F2 | -25564630027 | 03249000027 | 00000007027 | 01000000000000 | 0001000000100 | 1 | 0 | 0 | 0 | 0 |
| 0F2 | 4FF | -25564640027 | 03249000027 | 00000007027 | 01000000000000 | 0001000000100 | 1 | 0 | 0 | 0 | 0 |
| 0F3 | 2FF | -25564630027 | 03249000027 | 00000007027 | 01000000000000 | 0001000000100 | 1 | 0 | 0 | 0 | 0 |
| 0FE | 44F | -25554480027 | 03249000027 | 00000000727 | 01000000000000 | 0001000000100 | 1 | 0 | 0 | 0 | 0 |
| 0FF | 52C | -25563590027 | 03249000027 | 00000000727 | 01000000000000 | 0001000000100 | 1 | 0 | 0 | 0 | 0 |
| 0F0 | 2F6 | -25563540027 | 03249000027 | 00000000727 | 01000000000000 | 0001000000100 | 1 | 0 | 0 | 0 | 0 |
| 0F1 | 445 | -25564640027 | 03249000027 | 00000000727 | 01000000000000 | 0001000000100 | 1 | 0 | 0 | 0 | 0 |
| 0F2 | 4FF | -25563580027 | 03249000027 | 00000000627 | 01000000000000 | 0001000000100 | 1 | 0 | 0 | 0 | 0 |
| 0F3 | 2FF | -25563640027 | 03249000027 | 00000000627 | 01000000000000 | 0001000000100 | 1 | 0 | 0 | 0 | 0 |
| 0F4 | 491 | -25916630027 | 03249000027 | 00000000627 | 01000000000000 | 0001000000100 | 1 | 0 | 0 | 0 | 0 |
| 0F5 | 0F2 | -25915690027 | 03249000027 | 00000000627 | 01000000000000 | 0001000000100 | 1 | 0 | 0 | 0 | 0 |
| 0F2 | 4FF | -25915690027 | 03249000027 | 00000000527 | 01000000000000 | 0001000000100 | 1 | 0 | 0 | 0 | 0 |
| 0F3 | 2FF | -25915690027 | 03249000027 | 00000000527 | 01000000000000 | 0001000000100 | 1 | 0 | 0 | 0 | 0 |
| 0F4 | 491 | -29065269027 | 03249000027 | 00000000527 | 01000000000000 | 0001000000100 | 1 | 0 | 0 | 0 | 0 |
| 0F5 | 0F2 | -29065269027 | 03249000027 | 00000000527 | 01000000000000 | 0001000000100 | 1 | 0 | 0 | 0 | 0 |
| 0F2 | 4FF | -29055720027 | 03249000027 | 00000000427 | 01000000000000 | 0001000000100 | 1 | 0 | 0 | 0 | 0 |
| 0F3 | 2FF | -29065269027 | 03249000027 | 00000000427 | 01000000000000 | 0001000000100 | 1 | 0 | 0 | 0 | 0 |
| 0F4 | 491 | -12314440027 | 03249000027 | 00000000427 | 01000000000000 | 0001000000100 | 1 | 0 | 0 | 0 | 0 |
| 0F5 | 0F2 | -12314460027 | 03249000027 | 00000000427 | 01000000000000 | 0001000000100 | 1 | 0 | 0 | 0 | 0 |
| 0F2 | 4FF | -12314460027 | 03249000027 | 00000000327 | 01000000000000 | 0001000000100 | 1 | 0 | 0 | 0 | 0 |
| 0F3 | 2FF | -12314460027 | 03249000027 | 00000000327 | 01000000000000 | 0001000000100 | 1 | 0 | 0 | 0 | 0 |
| 0F4 | 491 | -15563568027 | 03249000027 | 00000000327 | 01000000000000 | 0001000000100 | 1 | 0 | 0 | 0 | 0 |
| 0F5 | 0F2 | -15563668027 | 03249000027 | 00000000327 | 01000000000000 | 0001000000100 | 1 | 0 | 0 | 0 | 0 |
| 0F2 | 4FF | -15563658027 | 03249000027 | 00000000227 | 01000000000000 | 0001000000100 | 1 | 0 | 0 | 0 | 0 |
| 0F3 | 2FF | -15563668027 | 03249000027 | 00000000227 | 01000000000000 | 0001000000100 | 1 | 0 | 0 | 0 | 0 |
| 0F4 | 491 | -18812868027 | 03249000027 | 00000000227 | 01000000000000 | 0001000000100 | 1 | 0 | 0 | 0 | 0 |
| 0F5 | 0F2 | -18812868027 | 03249000027 | 00000000227 | 01000000000000 | 0001000000100 | 1 | 0 | 0 | 0 | 0 |
| 0F2 | 4FF | -19212344027 | 03249000027 | 00000000127 | 01000000000000 | 0001000000100 | 1 | 0 | 0 | 0 | 0 |
| 0F3 | 2FF | -19412344027 | 03249000027 | 00000000127 | 01000000000000 | 0001000000100 | 1 | 0 | 0 | 0 | 0 |
| 0F4 | 491 | -22064064027 | 03249000027 | 00000000127 | 01000000000000 | 0001000000100 | 1 | 0 | 0 | 0 | 0 |
| 0F5 | 0F2 | -22064064027 | 03249000027 | 00000000127 | 01000000000000 | 0001000000100 | 1 | 0 | 0 | 0 | 0 |
| 0F2 | 4FF | -22064064027 | 03249000027 | 00000000027 | 01000000000000 | 0001000000100 | 1 | 0 | 0 | 0 | 0 |
| 0F3 | 2FF | -22102063027 | 03249000027 | 00000000027 | 01000000000000 | 0001000000100 | 1 | 0 | 0 | 0 | 0 |
| 0F4 | 491 | -25311260027 | 03249000027 | 00000000027 | 01000000000000 | 0001000000100 | 1 | 0 | 0 | 0 | 0 |
| 0F5 | 0F2 | -25311261027 | 03249000027 | 00000000027 | 01000000000000 | 0001000000100 | 1 | 0 | 0 | 0 | 0 |
| 0F2 | 4FF | -25311261027 | 03249000027 | 00000000027 | 01000000000000 | 0001000000100 | 1 | 0 | 0 | 0 | 0 |
| 0F3 | 2FF | -25311261027 | 03249000027 | 00000000027 | 01000000000000 | 0001000000100 | 1 | 0 | 0 | 0 | 0 |
| 0FE | 4AF | -25311263027 | 03249000027 | 00000000027 | 01000000000000 | 0001000000100 | 1 | 0 | 0 | 0 | 0 |
| 0FF | 52C | -25311263027 | 03249000027 | 00000000027 | 01000000000000 | 0001000000100 | 1 | 0 | 0 | 0 | 0 |
| 0FC | 2F4 | -25311260027 | 03249000027 | 00000000027 | 01000000000000 | 0001000000100 | 1 | 0 | 0 | 0 | 0 |
| 0F6 | 404 | -25311262027 | 03249000027 | 03249000027 | 01000000000000 | 0001000000100 | 1 | 0 | 0 | 0 | 0 |
| 0F7 | 7F1 | -25311260027 | 03249000027 | 03249000027 | 01000000000000 | 0001000000100 | 1 | 0 | 0 | 0 | 0 |
| 0F9 | 0F4 | -25311261027 | 03249000027 | 03249000027 | 01000000000000 | 0001000000100 | 1 | 0 | 0 | 0 | 0 |
| 0FA | 707 | -25311260027 | 03249000027 | 03249000027 | 01000000000000 | 0001000000100 | 1 | 0 | 0 | 0 | 0 |
| 0FB | 279 | -25311269027 | 03249000027 | 03249000027 | 01000000000000 | 0001000000100 | 1 | 0 | 0 | 0 | 0 |
| 0FC | 741 | -25311260027 | 03249000027 | 03249000027 | 00000000000000 | 0001000000100 | 1 | 0 | 0 | 0 | 0 |
| 0F0 | 742 | -25311263027 | 03249000027 | 03249000027 | 00000000000000 | 0001000000100 | 1 | 0 | 0 | 0 | 0 |
| 0FE | 079 | -25311268027 | 03249000027 | 03249000027 | 00000000000000 | 0001000000100 | 1 | 0 | 0 | 0 | 0 |
| 079 | 524 | -25311263027 | 03249000027 | 03249000027 | 00000000000000 | 0001000000100 | 1 | 0 | 0 | 0 | 0 |
| 07A | 29F | -25311263027 | 03249000027 | 03249000027 | 00000000000000 | 0001000000100 | 1 | 0 | 0 | 0 | 0 |
| 07B | 542 | -25311264027 | 01000000027 | 03249000027 | 00000000000000 | 0001000000100 | 1 | 0 | 0 | 0 | 0 |
| 07C | 483 | -25311263027 | 10000000027 | 03249000027 | 00000000000000 | 0001000000100 | 1 | 0 | 0 | 0 | 0 |
| 07D | 480 | -25311263027 | 10000000027 | 03249000027 | 00000000000000 | 0001000000100 | 1 | 0 | 0 | 0 | 0 |
| 07E | 283 | -25311263027 | 10000000027 | 03249000027 | 00000000000000 | 0001000000100 | 1 | 0 | 0 | 0 | 0 |
| 07F | 435 | -02531126327 | 10000000027 | 03249000027 | 00000000000000 | 0001000000100 | 1 | 0 | 0 | 0 | 0 |
| 080 | 7F8 | -02531126327 | 10000000027 | 03249000027 | 00000000000000 | 0001000000100 | 1 | 0 | 0 | 0 | 0 |
| 081 | 23E | -02531126327 | 10000000027 | 03249000027 | 00000000000000 | 0001000000100 | 1 | 0 | 0 | 0 | 0 |
| 082 | 585 | -02531126327 | 10000000027 | 03249000027 | 00000000000000 | 0001000000100 | 1 | 0 | 0 | 0 | 0 |
| 083 | 624 | -02531126327 | 10000000027 | 03249000027 | 00000000000000 | 0001000000100 | 1 | 0 | 0 | 0 | 0 |
| 084 | 200 | -02531126327 | 10000000027 | 03249000027 | 00000000000000 | 0001000000100 | 1 | 0 | 0 | 0 | 0 |
| 085 | 564 | -02531126327 | 10000000027 | 03249000027 | 00000000000000 | 0001000000100 | 1 | 0 | 0 | 0 | 0 |
| 086 | 040 | -02531126327 | 10000000027 | 03249000027 | 00000000000000 | 0001000000100 | 1 | 0 | 0 | 0 | 0 |
| 0A0 | 7C0 | -02531126327 | 10000000027 | 03249000027 | 00000000000000 | 0001000000100 | 1 | 0 | 0 | 0 | 0 |
| 0A1 | 100 | -02531126327 | 10000000027 | 03249000027 | 00000000000000 | 0001000000100 | 1 | 0 | 0 | 0 | 0 |
| 100 | 534 | -02531126327 | 10000000027 | 03249000027 | 00000000000000 | 0001000000100 | 1 | 0 | 0 | 0 | 0 |
| 101 | 30C | -02531126327 | 10000000027 | 03249000027 | 00000000000000 | 0001000000100 | 1 | 0 | 0 | 0 | 0 |
| 102 | 545 | -02531126327 | 10000000027 | 03249000027 | 00000000000000 | 0001000000100 | 1 | 0 | 0 | 0 | 0 |
| 103 | 7F8 | -02531126327 | 10000000027 | 03249000027 | 00000000000000 | 0001000000100 | 1 | 0 | 0 | 0 | 0 |
| 104 | 2FF | -02531126327 | 10000000027 | 03249000027 | 00000000000000 | 0001000000100 | 1 | 0 | 0 | 0 | 0 |
| 105 | 664 | -02531126327 | 10000000027 | 03249000027 | 00000000000000 | 0001000000100 | 1 | 0 | 0 | 0 | 0 |
| 106 | 304 | -02531126327 | 10000000027 | 03249000027 | 00000000000000 | 0001000000100 | 1 | 0 | 0 | 0 | 0 |

TABLE VII... EXAMPLE INSTRUCTION TRACE ... DATA CARD 157 ($7.79 -= $) ...

| PC | I-REG | A-REG | B-REG | C-REG | FLAGS (A) | FLAGS (B) | C | KP | KN | KO | KQ |
|---|---|---|---|---|---|---|---|---|---|---|---|
| 10A | 5E5 | -02531126826 | 10000000027 | 03249200027 | 00000000000000 | 00010000000100 | 1 | 0 | 0 | 0 | 0 |
| 10B | 100 | -02531126826 | 10000000027 | 03249200027 | 00000000000000 | 00010000000100 | 1 | 0 | 0 | 0 | 0 |
| 100 | 5A6 | -02531126326 | 10000000027 | 03249200027 | 00000000000000 | 00010000000100 | 1 | 0 | 0 | 0 | 0 |
| 101 | 30C | -02531126326 | 10000000027 | 03249200027 | 00000000000000 | 00010000000100 | 1 | 0 | 0 | 0 | 1 |
| 102 | 5A5 | -02531126816 | 10000000027 | 03249200027 | 00000000000000 | 00010000000100 | 1 | 0 | 0 | 0 | 1 |
| 103 | 7E9 | -02531126316 | 10000000027 | 03249200027 | 00000000000000 | 00010000000100 | 1 | 0 | 0 | 0 | 0 |
| 104 | 2FF | -02531126915 | 10000000027 | 03249200027 | 00000000000000 | 00010000000100 | 1 | 0 | 1 | 0 | 0 |
| 105 | 464 | -02531126316 | 10000000027 | 03249200027 | 00000000000000 | 00010000000100 | 0 | 0 | 0 | 0 | 0 |
| 106 | 30A | -02531126316 | 10000000027 | 03249200027 | 00000000000000 | 00010000000100 | 1 | 0 | 0 | 0 | 0 |
| 10A | 5E5 | -02531126413 | 10000000027 | 03249200027 | 00000000000000 | 00010000000100 | 1 | 0 | 0 | 0 | 1 |
| 10B | 100 | -02531126315 | 10000000027 | 03249200027 | 00000000000000 | 00010000000100 | 1 | 0 | 1 | 0 | 0 |
| 10C | 556 | -02531126915 | 10000000027 | 03249200027 | 00000000000000 | 00010000000100 | 1 | 0 | 0 | 0 | 0 |
| 101 | 30C | -02531126315 | 10000000027 | 03249200027 | 00000000000000 | 00010000000100 | 1 | 0 | 0 | 0 | 0 |
| 102 | 535 | -02531126306 | 10000000027 | 03249200027 | 00000000000000 | 00010000000100 | 1 | 1 | 1 | 0 | 1 |
| 103 | 7E3 | -02531126406 | 10000000027 | 03249200027 | 00000000000000 | 00010000000100 | 1 | 0 | 0 | 0 | 0 |
| 104 | 2FF | -02531126906 | 10000000027 | 03249200027 | 00000000000000 | 00010000000100 | 1 | 0 | 0 | 0 | 0 |
| 105 | 664 | -02531126406 | 10000000027 | 03249200027 | 00000000000000 | 00010000000100 | 0 | 0 | 0 | 0 | 0 |
| 106 | 30A | -02531126306 | 10000000027 | 03249200027 | 00000000000000 | 00010000000100 | 1 | 0 | 0 | 0 | 0 |
| 10A | 5E5 | -02531126306 | 10000000027 | 03249200027 | 00000000000000 | 00010000000100 | 1 | 0 | 0 | 0 | 0 |
| 10B | 100 | -02531126806 | 10000000027 | 03249200027 | 00000000000000 | 00010000000100 | 1 | 0 | 0 | 0 | 0 |
| 10C | 556 | -02531126806 | 10000000027 | 03249200027 | 00000000000000 | 00010000000100 | 0 | 0 | 0 | 0 | 1 |
| 101 | 30C | -02531126306 | 10000000027 | 03249200027 | 00000000000000 | 00010000000100 | 1 | 0 | 0 | 0 | 0 |
| 10C | 768 | -02531126606 | 10000000027 | 03249200027 | 00000000000000 | 00010000000100 | 1 | 0 | 1 | 0 | 0 |
| 10D | 7E3 | -02531126306 | 10000000027 | 03249200027 | 00000000000000 | 00010000000100 | 1 | 0 | 0 | 0 | 0 |
| 10E | 31E | -02531126806 | 10000000027 | 03249200027 | 00000000000000 | 00010000000100 | 1 | 0 | 1 | 0 | 1 |
| 10F | 4F4 | -02531126306 | 10000000027 | 03249200027 | 00000000000000 | 00010000000100 | 1 | 0 | 0 | 0 | 0 |
| 110 | 114 | -02531126406 | 10000000027 | 03249200027 | 00000000000000 | 00010000000100 | 1 | 0 | 1 | 0 | 0 |
| 116 | 7F1 | -02531126306 | 10000000027 | 03249200027 | 00000000000000 | 00010000000100 | 1 | 0 | 0 | 0 | 1 |
| 117 | 31E | -02531126606 | 10000000027 | 03249200027 | 00000000000000 | 00010000000100 | 1 | 0 | 0 | 0 | 0 |
| 118 | 41F | -10000000027 | 02531126306 | 03249200027 | 00000000000000 | 00010000000100 | 1 | 0 | 0 | 0 | 0 |
| 119 | 401 | -00000000000 | 02531126906 | 03249200027 | 00000000000000 | 00010000000100 | 1 | 1 | 0 | 1 | 0 |
| 11A | 410 | -00000000000 | 02531126406 | 03249200027 | 00000000000000 | 00010000000100 | 1 | 1 | 0 | 0 | 0 |
| 11B | 420 | -00000000000 | 02531126306 | 03249200027 | 00000000000000 | 00010000000100 | 1 | 0 | 0 | 0 | 0 |
| 11C | 301 | -00000000000 | 02531126306 | 03249200027 | 00000000000000 | 00010000000100 | 1 | 0 | 0 | 0 | 0 |
| 11D | 418 | -02531126306 | 00000000000 | 03249200027 | 00000000000000 | 00010000000100 | 1 | 0 | 0 | 0 | 0 |
| 11E | 7C7 | -02531126406 | 00000000000 | 03249200027 | 00000000000000 | 00010000000100 | 1 | 0 | 0 | 0 | 0 |
| 11F | 250 | -02531126906 | 00000000000 | 03249200027 | 00000000000000 | 00010000000100 | 1 | 1 | 0 | 0 | 0 |
| 120 | 049 | -02531126306 | 00000000000 | 03249200027 | 00000000000000 | 00010000000100 | 1 | 0 | 0 | 0 | 0 |
| 249 | 407 | -02531126306 | 00000000000 | 02531126306 | 00000000000000 | 00010000000100 | 1 | 0 | 0 | 0 | 0 |
| 24A | 748 | -02531126806 | 00000000000 | 02531126806 | 00000000000000 | 00010000000100 | 1 | 0 | 0 | 0 | 0 |
| 24B | 7EA | -02531126306 | 00000000000 | 02531126406 | 00000000000000 | 00010000000100 | 0 | 1 | 1 | 0 | 0 |
| 24C | 04E | -02531126806 | 00000000000 | 02531126806 | 00000000000000 | 00010000000100 | 1 | 0 | 0 | 1 | 0 |
| 24D | 70A | -02531126906 | 00000000000 | 02531126906 | 00000000000100 | 00010000000100 | 1 | 0 | 0 | 0 | 0 |
| 24E | 601 | -02531126306 | 00000000000 | 02531126906 | 00000000000100 | 00010000000100 | 1 | 0 | 0 | 0 | 0 |
| 24F | 602 | -02531126306 | 00000000000 | 02531126806 | 00000000000100 | 00010000000100 | 1 | 0 | 0 | 0 | 0 |
| 250 | 763 | -02531126306 | 00000000000 | 02531126306 | 00000000000100 | 00010000000100 | 1 | 0 | 1 | 0 | 0 |
| 251 | 724 | -02531126806 | 00000000000 | 02531126906 | 00000000000100 | 00010000000100 | 1 | 0 | 1 | 0 | 0 |
| 252 | 004 | -02531126806 | 00000000000 | 02531126806 | 00000000000100 | 00010000000100 | 1 | 0 | 0 | 0 | 0 |
| 204 | 400 | -02531126806 | 00000000000 | 02531126806 | 00000000000100 | 00010000000100 | 1 | 0 | 0 | 1 | 0 |
| 205 | 752 | -02531126306 | 00000000000 | 02531126306 | 00000000000100 | 00010000000100 | 1 | 0 | 0 | 0 | 0 |
| 206 | 400 | -02531126806 | 00000000000 | 02531126306 | 00000000000100 | 00010000000100 | 1 | 0 | 0 | 0 | 0 |
| 207 | 450 | -02531126306 | 00000000000 | 02531126906 | 00000000000100 | 00010000000100 | 1 | 0 | 0 | 0 | 0 |
| 209 | 204 | -02531126606 | 00000000000 | 02531126906 | 00000000000100 | 00010000000100 | 1 | 0 | 1 | 0 | 1 |
| 20? | 400 | -02531126806 | 00000000000 | 02531126306 | 00000000000100 | 00010000000100 | 1 | 0 | 0 | 0 | 0 |
| 20A | 460 | -02531126906 | 00000000000 | 02531126906 | 00000000000100 | 00010000000100 | 0 | 0 | 1 | 1 | 0 |
| 20B | 400 | -02531126806 | 00000000000 | 02531126306 | 00000000000100 | 00010000000100 | 0 | 0 | 0 | | 0 |
| 20C | 000 | -02531126306 | 00000000000 | 02531126306 | 00000000000100 | 00010000000100 | 1 | 0 | | 0 | 0 |
| 20D | 400 | -02531126806 | 00000000000 | 02531126806 | 00000000000100 | 00010000000100 | 1 | 0 | 0 | 0 | 0 |
| 20F | 400 | -02531126306 | 00000000000 | 02531126306 | 00000000000100 | 00010000000100 | 1 | 0 | 0 | 0 | 0 |

TABLE VIII

Problems with the  [+] [−] [=]  Keyboard Configuration

| Problem | Key | Display |
|---|---|---|
| $-a-b+c=$ | [C] | 0 |
| | [−] | 0 |
| | a | $-a$ |
| | [−] | $-a$ |
| | b | $-b$ |
| | [+] | $(-a-b)$ |
| | c | c |
| | [=] | $(-a-b+c)$ |

| Problem | Key | Display |
|---|---|---|
| $a \div b^3 =$ | [C] | 0 |
| | [K] ↓ | 0 |
| | a | a |
| | [÷] | a |
| | b | b |
| | [=] | $(a/b)$ |
| | [=] | $(a/b^2)$ |
| | [=] | $(a/b^3)$ |
| $a^4 =$ | [C] | 0 |
| | [K] ↓ | 0 |
| | a | a |
| | [×] | a |
| | [=] | $(a^2)$ |
| | [=] | $(a^3)$ |
| | [=] | $(a^4)$ |

| Problem | Key | Display |
|---|---|---|
| a ÷ b = | [C] | 0 |
| c ÷ b = | [K] ↓ | 0 |
| d ÷ b = | a | a |
|  | [÷] | a |
|  | b | b |
|  | [=] | (a/b) |
|  | c | c |
|  | [=] | (c/b) |
|  | d | d |
|  | [=] | (d/b) |
| $a^4 \times b =$ | [C] | 0 |
|  | [K] ↓ | 0 |
|  | a | a |
|  | [×] | a |
|  | b | b |
|  | [=] | (ab) |
|  | [=] | $(a^2 b)$ |
|  | [=] | $(a^3 b)$ |
|  | [=] | $(a^4 b)$ |
| (−a) × b = | [C] | 0 |
|  | [−] | 0 |
|  | a | −a |
|  | [×] | −a |
|  | b | b |
|  | [=] | −(ab) |
| a ÷ (−b) = | [C] | 0 |
|  | a | a |
|  | [÷] | a |
|  | b | b |
|  | [+/−] | −b |
|  | [=] | −(a/b) |

| Problem | Key | Display |
|---|---|---|
| a × (−b) ÷ (−c) = | [C] | 0 |
| | a | a |
| | [×] | a |
| | b | b |
| | [+/−] | −b |
| | [÷] | −(ab) |
| | c | c |
| | [+/−] | −c |
| | [=] | (ab/c) |
| $\frac{(a+b-c) \times d}{e} - f =$ | [C] | 0 |
| | a | a |
| | [+] | a |
| | b | b |
| | [−] | (a + b) |
| | c | −c |
| | [×] | (a + b − c) |
| | d | d |
| | [÷] | (a + b − c) d |
| | e | e |
| | [−] | (a + b − c) d/e |
| | f | −f |
| | [=] | (a + b − c) d/e − f |
| a × b = | [C] | 0 |
| a × c = | [K] ↓ | 0 |
| a × d = | a | a |
| | [×] | a |
| | b | b |
| | [=] | (ab) |
| | c | c |
| | [=] | (ac) |
| | d | d |
| | [=] | (ad) |

FIG. 22A gives a key to the flowchart notation; the shape of the box is used to distinguish the various classes of instructions, and the inscriptions in the box are used to specify the particular instruction within the indicated class.

The circular symbol is used for labels, as for example, the GO and CONT labels on FIG. 22A. Rectangles symbolize assignments. For register operations arrow notation is used with subscripts indicative of the Digit Mask. For flag operations, with the extra-lined rectangle, the instruction is given, along with either mnemonic or alpha numeric identification of the flag(s) to be so modified. The oval symbol is used for all test operations, including Test Flag, Compare Flag, and Compare Register instructions. The diamond symbol is used for Branch Conditional instructions, where the indicated conditions relate to the preceding test or register (carry/borrow) operation. The hexagonal symbol is used for WAIT operations. In addition to the WAIT condition, for example, D11 or KN, associated operations, for example Add One, are also indicated.

Referring to FIGS. 22B through T, the program flowcharts can be corresponded to the linear program Table VI as follows:

In Table VI the first three-digit column counts the ROM locations (PC values) in hexadecimal code from $000_{16}$ ($0_{10}$) through $13F_{16}$ ($319_{10}$). The next eleven-bit column reflect the binary-code contents of the ROM which is programmed at each of the PC locations, that is the IR code which would be detected and executed if the PC value became equivalent to that indicated, row by row. The next column gives programming labels by which some routines are known. The next column gives the instruction mnemonic, as described in the functional description section above. The remainder of the table is devoted to comments relating to the operational meaning of the instructions, as appropriate. The ROM locations of individual instructions on the flowcharts FIG. 22 are indicated by the three-digit hexadecimal codes in proximity of the instruction symbol.

Referring to FIG. 22B, the basic control routine is shown which connects the four basic operation (+, −, ×, ÷) routines and determines the current operation and previous operation status by means of the flag test and update decision tree shown. The linear program is given in Table VI beginning at location 040, label MIN (corresponding to −) and continuing through location 057, with an "always branch" to LOCK.

Referring to FIG. 22C, the routines for Clear Entry (CE), Decimal Point (DPT), Clear (C), and Data Entry are shown. Clear is located at 000 through 003 and provides means to clear all flags and the A and C registers, returning to LOCK. Clear Entry is at location 058 and branches to the D2 routine at 021 to clear the A register and related flags. Data Entry is the control routine for input of number key and decimal point switch routines, beginning at location 01E.

Referring to FIG. 22D, all operating routines terminate in LOCK which provides means for suppression of double-key entry and multiple execution of single operation entries by testing for quiescence (open-circuit) of all momentary keyboard inputs. LOCK resides at locations 004 through 008, branching to IDLE on confirmation of quiescence. In two WAIT loops at locations 009 through 010, IDLE provides means for defeating leading-edge key bounce and transient noise.

Referring to FIG. 22E, OPN provides means for polling of keyboard operation inputs (KO keys) to determine which operation is being requested. This is accomplished with a list of Branch Conditional instructions, where the sequence of their execution corresponds to the order of key connections to the Digit scanning outputs, and by means of the WAIT D11 instruction to synchronize the polling to the scan cycle, and by association of KO→Cond with the WAIT instruction to permit conditional branching on the state of the keyboard inputs. OPN is located between 011 and 01D on the ROM and terminates with a jump to Data Entry for numeric inputs, if no previous jump is executed.

Referring to FIG. 22F, NBR provides means for polling and scan-encoding the numeric keyboard inputs, for example number keys and Point Position Switches. This is done by the single instruction WAIT(D11+KN) at location 03A by means of association of (A−1 A) to subtract "one" from the mantissa of A for each instruction cycle of the wait.

Referring to FIGS. 22G, H, I, J, K, L, and M, the Add/Subtract (AS) and Prenormalize (PRE) are shown. These routines involve a variety of testing and formating procedures in addition to the actual performance of ADD or SUBTRACT.

Referring to FIGS. 22N, O,P,Q,R,S, and T, the Multiply/Divide (MD) and Postnormalize (POST) routines are shown. These routines employ repetitive additions and substractions in combination with shift, test, and counting procedures in order to accomplish the desired function.

FIG. 23 illustrates the physical relationship between the above described signals and functions of the present embodiment and the packaging techniques of contemporary integrated circuit technology. For example, the input/output terminals of the present embodiment can be connected to a ceramic or plastic package lead frame using wire conductors and thermal compression bonding to provide means for allowing the system to become more accessible to conventional DIP/printed circuit board handling and usage.

In the described MOS embodiment of the calculator system of the invention, $V_{SS}-V_{DD}$ and $V_{DD}-V_{GG}$ are for example, nominally 7.2 volts under normal operating conditions (8.1 volts maximum; 6.6 volts minimum). The clock ($\phi$) frequency is nominally 250 KHz, minimum 200 KHz and maximum 330 KHz.

PROGRAMMING OF THE CALCULATOR SYSTEM FOR NON-CALCULATOR FUNCTIONS

The calculator system of the present invention is a variable function calculator system in that it may be programmed to perform functions other than the desk top calculator functions previously described. The variable functionability of the system is essentially provided by the programmability of various subsystems such as the programmable read-only-memory and the programmable logic arrays utilized in the system. As previously stated, these programmable subsystems are programmed during the fabrication of MOS or MIS embodiments by merely modifying the gate-insulator mask.

In further calculator embodiments, a large number of diverse functions utilizing additional keys on a keyboard and/or additional programs stored in the ROM could provide a system including, for example, right shift, exchange operand, square root, exponential operations, logarithmic operations, double and triple zero operation, and key sequence recognition.

Being that the calculator system of the invention includes program control, data control arithmetic and logic means and input/output subsystems in various embodiments the system may be programmed to perform non-calculator functions. For example, the calculator system may be programmed to perform meter functions such as for a digital volt meter, event counting, meter smoothing, taxi-fare meter, an odometer, scale meter to measure weight, etc. The system may also be programmed to perform cash register operations, act as a controller, arithmetic teaching unit, clock, display decoder, automobile rally computer, etc.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

I claim:

1. A calculator system comprising:

(a) a plurality of key switches for entering information into said calculator system, the switches being connected in an array of rows and columns;

(b) a plurality of display elements arranged in sequence to represent multiple digits or characters, the display element having first input terminals coupled to receive coded display outputs of the calculator system;

(c) means for generating keyboard/display timing signals for simultaneously energizing individual columns in the switch array and second input terminals of the display elements; and (d) programmed scanner means provided in the calculator system responsive to inputs from rows of key switches in correlation with the keyboard/display timing signals for entering information into the calculator system.

2. A system according to claim 1 wherein the programmed scanner means first polls the rows of key switches to determine whether or not any key is down in each row and then if any key is down such row in which a key is down is polled to determine which of the keys in such row is down.

3. A system according to claim 1 wherein the timing signals are in sequence running from the most significant digit to the least significant digit and means are provided in association with the display outputs in the calculator system for suppressing loading zeros.

4. A system according to claim 3 wherein a sequentially addressed random access memory array is provided in the calculator system to function as the data registers, and such array is addressed in sequence running from least significant to most significant digit.

5. An electronic calculator comprising:

(a) clock pulse generating means;

(b) computing circuit means having first, second and third groups of computing circuit terminals, and a clock pulse terminal coupled to said clock pulse generating means, said computer circuit means generating a repeating sequential series of pulses at said first group of computing circuit terminals in timed relation with the pulses generated by said clock pulse generating means;

(c) keyboard means including character and function keys and respective switches operated thereby, said switches being connected in controlling relation to the first and second groups of computing circuit terminals of said computing circuit means, said keyboard means selectively coupling computing circuit terminals within said first group to computing circuit terminals within said second group in accordance with the positions of said switches; and (d) display circuit means comprising light emitting elements and having first and second groups of display input terminals coupled to the first and third groups of computing circuit terminals, respectively, of said computing circuit means, said computing circuit means generating pulses at selected terminals of said third group of computing circuit terminals simultaneously with the generation of each pulse at a terminal of said first group of computing circuit terminals, said light emitting elements being selectively energized in accordance with the pulses applied by said computing circuit means to the first and second groups of display input terminals.

6. An electronic calculator according to claim 5 in which the pulses supplied to said display input terminals occur at such a frequency as to prevent optically perceptible flickering of the light emitted by said light emitting devices.

7. An electronic calculator according to claim 5 in which the pulses at said first group of computing circuit terminals are supplied sequentially to the said switches actuated by said character keys at a frequency such that an entire series of said pulses is generated during the period of actuating of any said character key.

8. An electronic calculator according to claim 5 in which each light emitting element has an anode side and a cathode side, the pulses at said first group of computing circuit terminals being supplied to one of said sides and the pulses at said third group of computing circuit terminals being supplied to the other of said sides, and amplifier drivers connected to the respective sides of said light emitting elements and through which said pulses are supplied to said light emitting elements.

9. An electronic calculator according to claim 8 in which the side of each light emitting element to which the pulses at said third group of computing circuit terminals is supplied comprises a plurality of segments, the segments of each said light emitting element being electrically connected to the corresponding segment of the others of said light emitting elements, a respective amplifier driver for each group of interconnected segments, and means for supplying respective pulses from the pulses at said third group of computing circuit terminals to respective ones of the amplifier drivers for said segments.

10. An electronic calculator according to claim 5 in which each light emitting element has an anode side and a cathode side, the pulses at said first group of computing circuit terminals being supplied to one of said sides and the pulses at said third group of computing circuit terminals being supplied to the other of said sides.

11. An electronic calculator according to claim 10 in which the side of each light emitting element to which the pulses at said third group of computing circuit terminals are supplied comprising a plurality of segments, the segments of each said light emitting element being electrically connected to the corresponding segment of the others of said light emitting elements, and means for supplying respective pulses from the pulses at said third group of computing circuit terminals to respective ones of said groups of interconnected segments.

12. An electronic calculator according to claim 11 which includes amplifier drivers interposed between the opposite sides of said light emitting elements and the sources of pulses therefor.

13. An electronic calculator according to claim 10 which includes amplifier drivers interposed between the opposite sides of said light emitting elements and the sources of pulses therefor.

14. An electronic calculator comprising:

(a) computing circuit means having an input, said means generating a repeating series of first pulses and a group of second pulses simultaneously with each of said first pulses;

(b) switching means coupled to said computing circuit means for receiving said repeating series of first pulses and selectively coupling said first pulses to the input of said computing circuit means;

(c) display circuit means comprising light emitting elements, each having a common element and a plurality of segment elements; and (d) means coupling said light emitting elements to said computing circuit means, the common elements of said light emitting elements receiving said series of first pulses and said segment elements receiving said group of second pulses.

15. The method of operating an electronic calculator including a computing circuit means having first, second and third groups of terminals, keyboard means having key actuated control switches, and display circuit means comprising electrically actuated light emitting elements each having a common element and a plurality of segment elements, said method comprising the steps of:

(a) generating a repeating series of first sequential pulses at the first group of terminals of said computing circuit means;

(b) generating a group of second pulses at the third group of terminals of said computing circuit means simultaneously with each of said first pulses;

(c) supplying said first sequential pulses to the second group of terminals of said computing circuit means through said keyboard means for the control of said computing circuit means, said first sequential pulses being generated at a rate such that an entire series of first sequential pulses is generated during the interval of actuation of a single one of said switches;

(d) supplying said first sequential pulses to the common elements of said light emitting elements; and (e) supplying said second pulses to selected segment elements of said light emitting elements, said first and second pulses energizing segment elements of said light emitting elements in accordance with said group of second pulses.

16. An electronic calculator comprising:

(a) clock pulse generating means;

(b) computing circuit means having first, second and third groups of computing circuit terminals, and a clock pulse terminal coupled to said clock pulse generating means, said computer circuit means generating a repeating sequential series of pulses at said first group of computing circuit terminals in timed relation with some of the pulses generated by said clock pulse generating means;

(c) keyboard means including character and function keys and respective switches operated thereby, said switches being connected to the first and second groups of computing circuit terminals of said computing circuit means, said keyboard means selectively coupling computing circuit terminals within said first group to computing circuit terminals within said second group in accordance with the positions of said switches; and (d) display circuit means comprising light emitting elements and having first and second groups of display input terminals coupled to the first and third groups of computing circuit terminals, respectively, of said computing circuit means, said computing circuit means generating pulses at selected terminals of said third group of computing circuit terminals simultaneously with the generation of some of the pulses at a terminal of said first group of computing circuit terminals, said light emitting elements being selectively energized in accordance with the pulses applied by said computing circuit means to the first and second groups of display input terminals.

17. An electronic calculator according to claim 16 in which the pulses supplied to said display input terminals occur at such a frequency as to prevent optically perceptible flickering of the light emitted by said light emitting devices.

18. An electronic calculator according to claim 16 in which the pulses at said first group of computing circuit terminals are supplied sequentially to the said switches actuated by said character keys at a frequency such that an entire series of said pulses is generated during the period of acutating of any said character key.

19. An electronic calculator according to claim 16 in whih each light emitting element has an anode side and a cathode side, the pulses at said first group of computing circuit terminals being supplied to one of said sides and the pulses at said third group of computing terminals being supplied to the other of said sides, and amplifier drivers connected to the respective sides of said light emitting elements and through which said pulses are supplied to said light emitting elements.

20. An electronic calculator according to claim 19 in which the side of each light emitting element to which the pulses at said third group of computing circuit terminals is supplied comprises a plurality of segments, the segments of each said light emitting element being electrically connected to the corresponding segment of the others of said light emitting elements, a respective amplifier driver for each group of interconnected segments, and means for supplying respective pulses from the pulses at said third group of computing circuit terminals to respective one of the amplifier drivers for said segments.

21. An electronic calculator according to claim 16 in which each light emitting element has an anode side and a cathode side, the pulses at said first group of computing circuit terminals being supplied to one of said sides and the pulses at said third group of computing circuit terminals being supplied to the other of said sides.

22. An electronic calculator according to claim 21 in which the side of each light emitting element to which the pulses at said third group of computing circuit terminals are supplied comprises a plurality of segments, the segments of each said light emitting element being electrically connected to the corresponding segment of the others of said light emitting elements, and means for supplying respective pulses from the pulses at said third group of computing circuit terminals to respective ones of said groups of interconnected segments.

23. An electronic calculator according to claim 22 which includes amplifier drivers interposed between the opposite sides of said light emitting elements and the sources of pulses therefor.

24. An electronic calculator according to claim 21 which includes amplifier drivers interposed between the opposite sides of said light emitting elements and the sources of pulses therefor.

25. An electronic apparatus comprising:

(a) computing circuit means including a single-chip semiconductor integrated circuit device having an input, said device generating a repeating series of pulses including groups of first pulses and groups of second pulses correlated with some of said first pulses;

(b) switching means including an array of rows and columns of key switches coupled to said computing circuit means for receiving some of said repeating series of pulses and selectively coupling said pulses to the input of said computing circuit means;

(c) display circuit means comprising visual display elements having common elements and a plurality of segment elements for each common element; and (d) means coupling said visual display elements to said computing circuit means, the common elements of said visual display elements receiving said groups of first pulses and said segment elements receiving said groups of second pulses.

26. The method of operating an electronic apparatus of the type having visual display means and a keyboard means and including a computing device comprising a single-chip semiconductor integrated circuit having a plurality of terminals including first, second and third groups of terminals, said keyboard means having an array of rows and columns of key actuated control switches, and said visual display means comprising electrically actuated visual display elements having common elements and a plurality of segment elements for each common element, the common elements and segment elements having input terminals, said method comprising the steps of:

(a) generating a repeating series of first sequential pulses at the first group of terminals of said computing device;

(b) generating a group of second pulses at the third group of terminals of said computing device simultaneously with some of said first pulses;

(c) supplying said first sequential pulses to said columns and through said control switches of the keyboard means to the second group of terminals for the control of said computing device, said first sequential pulses being generated at a rate such that an entire series of first sequential pulses is generated during an interval of manual actuation of a single one of said switches;

(d) supplying said first sequential pulses to input terminals of said light emitting elements; and (e) supplying said second pulses to input terminals of light emitting elements, said first and second pulses energizing segment elements of said light emitting elements in accordance with said group of second pulses.

27. An electronic system comprising:

(a) a single-chip semiconductor integrated circuit device for performing digital data processing functions, said device having a plurality of input/output terminals;

(b) a plurality of key switches for entering information into said electronic system, the switches being connected in an array of rows and columsn;

(c) a plurality of display elements arranged in sequence to represent multiple digits or characters, the display elements having a plurality of input terminals coupled to said input/output terminals to receive coded display outputs of the electronic system;

(d) means in said integrated circuit device for generating keyboard/display timing signals for simultaneous connection to individual columns in the switch array and certain ones of said input terminals of the display elements via said input/output terminals; and (e) programmed means provided in the integrated circuit device responsive to inputs from rows of key switches in correlation with the keyboard/display timing signals for entering information into the electronic system.

* * * * *